US007205988B2

(12) United States Patent
Nakamura et al.

(10) Patent No.: US 7,205,988 B2
(45) Date of Patent: Apr. 17, 2007

(54) DISPLAY DEVICE

(75) Inventors: Takashi Nakamura, Kumagawa (JP); Hirotaka Hayashi, Fukaya (JP); Masahiro Yoshida, Fukaya (JP); Tomonobu Motai, Yokohama (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 250 days.

(21) Appl. No.: 10/616,979

(22) Filed: Jul. 11, 2003

(65) Prior Publication Data

US 2004/0008172 A1 Jan. 15, 2004

(30) Foreign Application Priority Data

| | | |
|---|---|---|
| Jul. 12, 2002 | (JP) | 2002-204511 |
| Jul. 12, 2002 | (JP) | 2002-204559 |
| Jul. 26, 2002 | (JP) | 2002-218687 |
| Sep. 13, 2002 | (JP) | 2002-267972 |
| Oct. 28, 2002 | (JP) | 2002-313255 |
| Oct. 28, 2002 | (JP) | 2002-313273 |
| Oct. 28, 2002 | (JP) | 2002-313309 |
| Dec. 27, 2002 | (JP) | 2002-381775 |

(51) Int. Cl.
*G09G 5/00* (2006.01)

(52) U.S. Cl. ........................................ 345/207; 345/100

(58) Field of Classification Search .................. 345/76, 345/87, 89, 207, 100; 315/169.1; 358/513, 358/514; 257/440, 443

See application file for complete search history.

(56) References Cited

U.S. PATENT DOCUMENTS

| | | | | |
|---|---|---|---|---|
| 5,355,164 | A * | 10/1994 | Shimoyama et al. | 348/243 |
| 5,712,652 | A | 1/1998 | Sato et al. | |
| 6,034,406 | A * | 3/2000 | Kobayashi et al. | 257/435 |
| 6,243,069 | B1 * | 6/2001 | Ogawa et al. | 345/102 |
| 6,424,326 | B2 | 7/2002 | Yamazaki et al. | |
| 6,940,142 | B2 * | 9/2005 | Street et al. | 257/443 |
| 2002/0041404 | A1 | 4/2002 | Shinotsuka et al. | |

FOREIGN PATENT DOCUMENTS

| | | |
|---|---|---|
| CN | 1348304 A | 5/2002 |
| JP | 11-27585 | 1/1999 |
| KR | 1995-002087 | 1/1995 |

* cited by examiner

*Primary Examiner*—Amr A. Awad
*Assistant Examiner*—Tom Sheng
(74) *Attorney, Agent, or Firm*—Oblon, Spivak, McClelland, Maier & Neustadt, P.C.

(57) ABSTRACT

A display device, comprising: display elements formed in vicinity of intersections of signal lines and scan lines aligned vertically and horizontally; image pickup units provided corresponding to each of the display elements by at least one piece, each converting incident radiation at predetermined range into an electric signal; electric charge accumulators which accumulate the electric charge in accordance with the electric signal converted by the image pickup units; and signal processing unit which generates digital image data corresponding to image picked up by the image pickup unit, based on accumulated electric charge of the electric charge accumulator for each of a plurality of image pickup conditions.

3 Claims, 57 Drawing Sheets

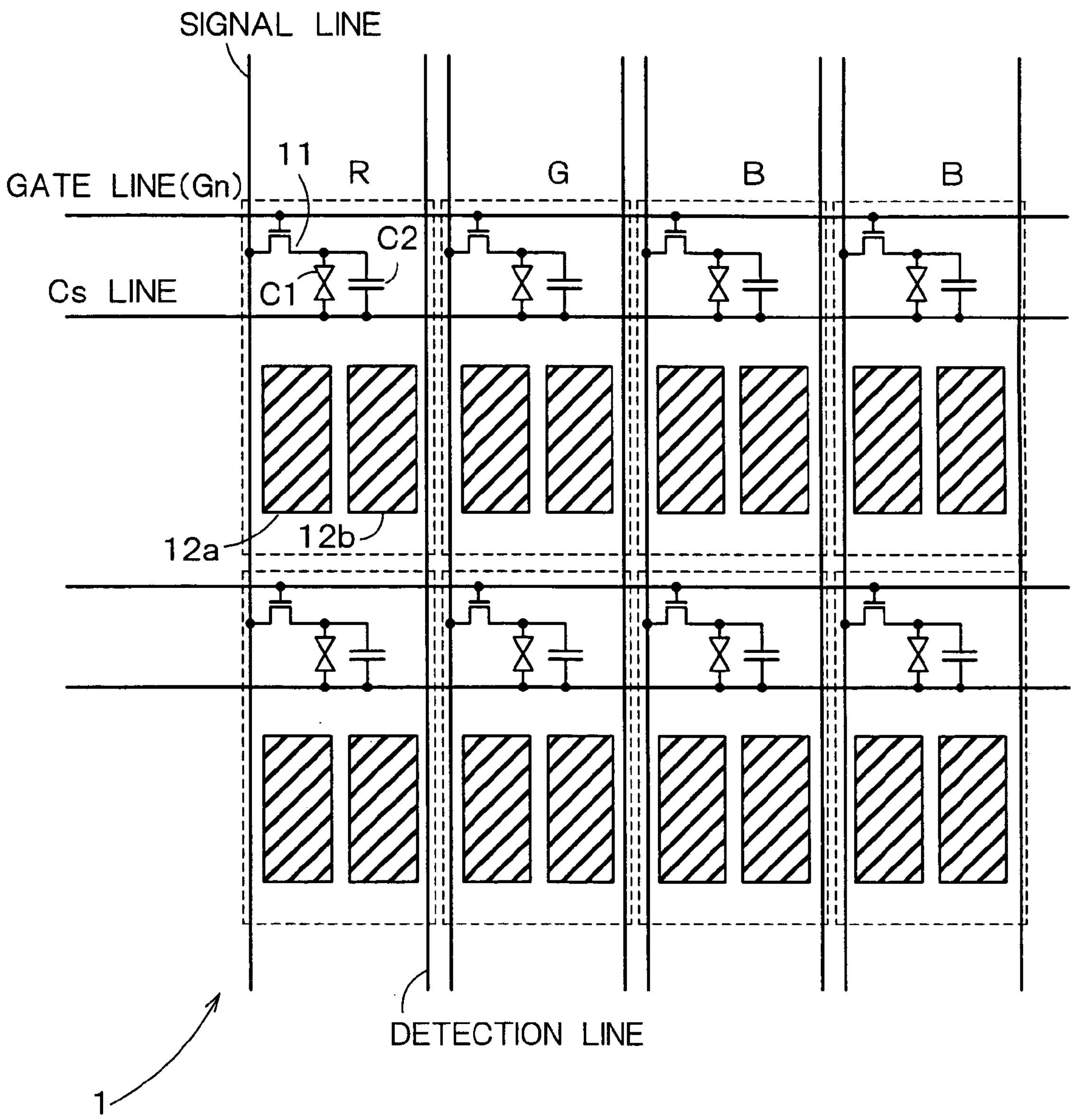
F I G. 2

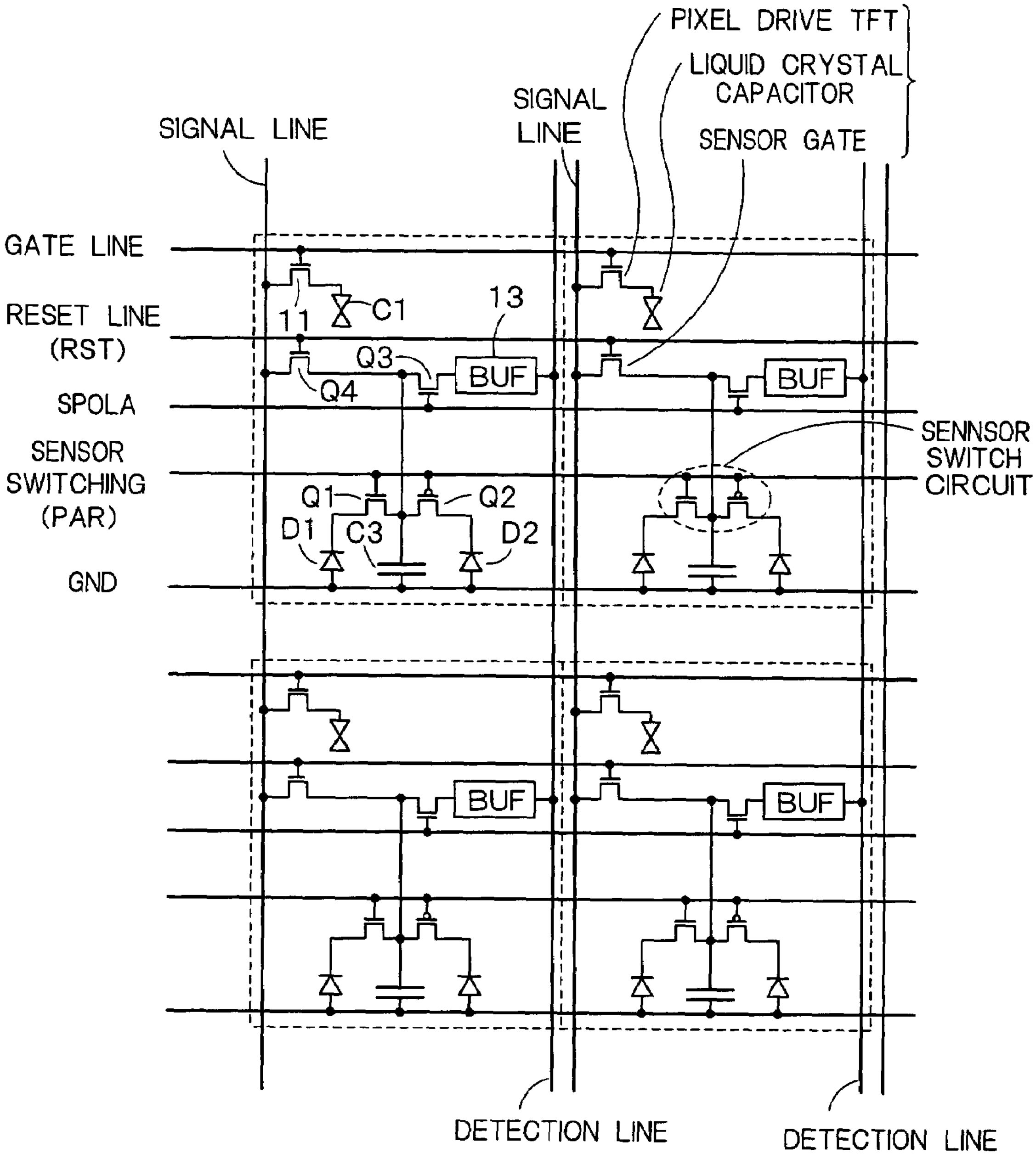
F I G. 3

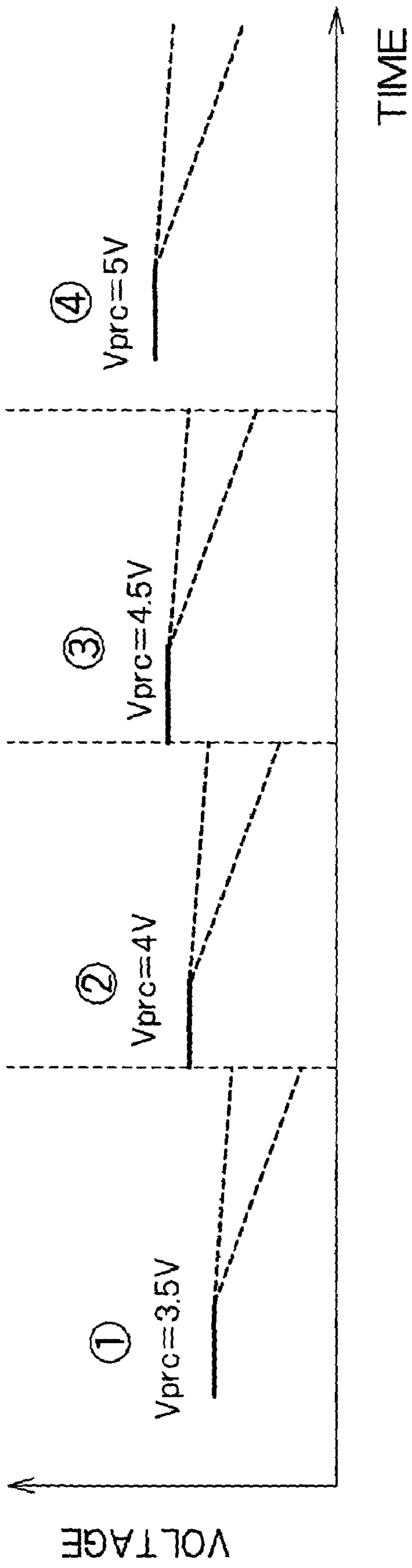
F I G. 7

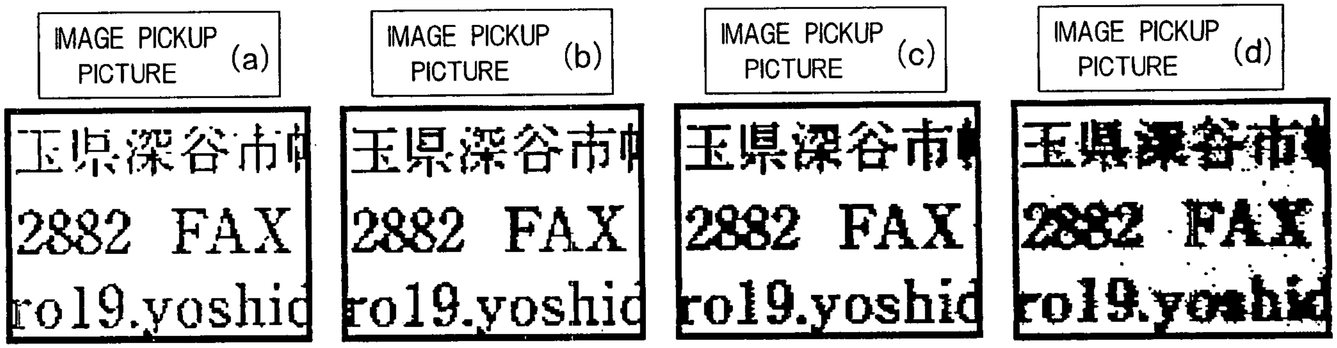
| CHANGING PARAMETER | CONDITION (a) | CONDITION (b) | CONDITION (c) | CONDITION (d) |
|---|---|---|---|---|
| PRECHARGE VOLTAGE(V) OF CAPACITOR | 3.5 | 4.0 | 4.5 | 5.0 |
| IMAGE PICKUP TIME (ms) | 100 | 75 | 50 | 25 |
| TRANSMITTANCE (%) OF LIQUID CRYSTAL | 100 | 75 | 50 | 25 |
| SUMMARY | CONDITION THAT ONLY PORTIONS NEAR TO CONSIDERABLY BLACK ARE DITERMINED AS BLACK | | | CONDITION THAT ONLY PORTIONS NEAR TO CONSIDERABLY WHITE ARE DITERMINED AS WHITE |
F I G. 9

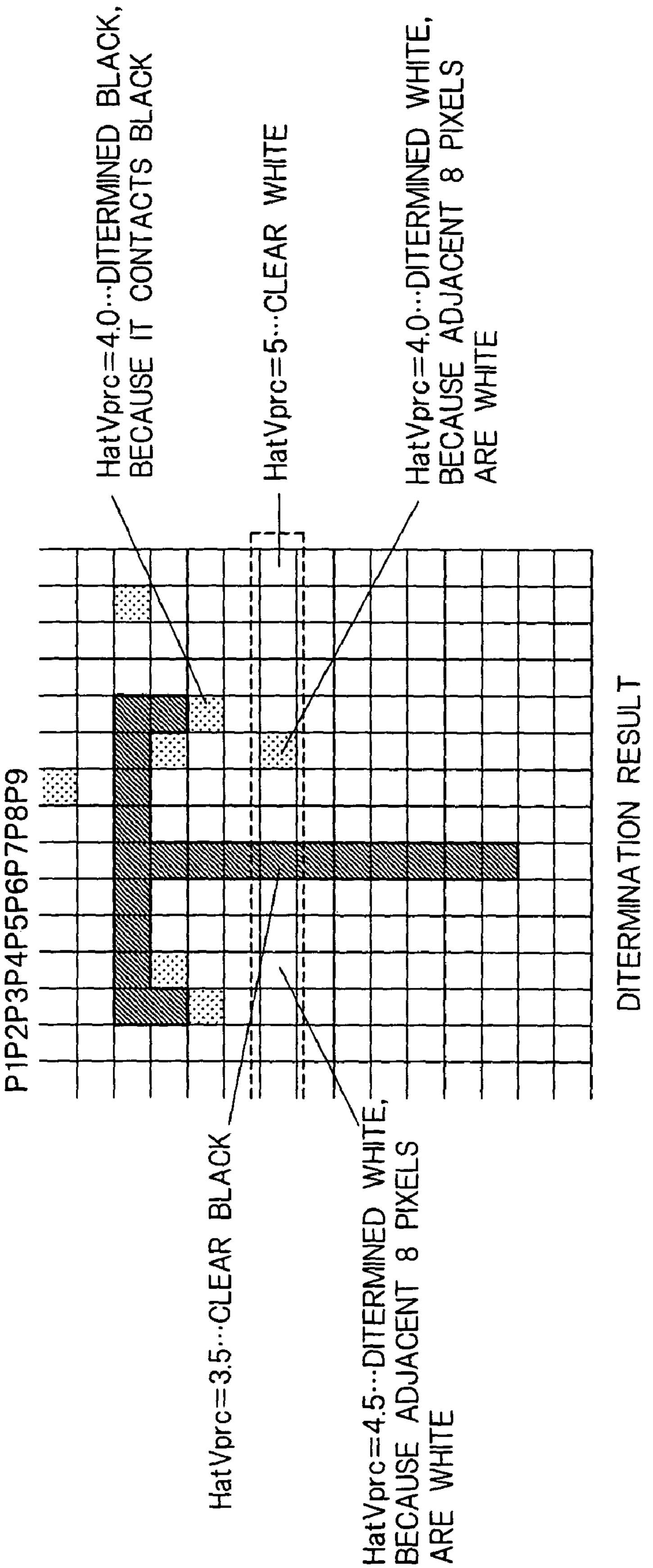
F I G. 12

| | Vprc(V) | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|---|
| (a) | 3.5 | L | L | L | L | L | L | H | L | L | L | L | L | L | L | L |
| (b) | 4.0 | L | L | L | L | L | L | H | L | L | H | L | L | L | L | L |
| (c) | 4.5 | L | L | L | H | L | L | H | L | L | H | L | L | L | L | L |
| (d) | 5.0 | H | H | H | H | H | H | H | H | H | H | H | H | H | H | H |

F I G. 13

REPRODUCED IMAGE ON DISPLAY DEVICE

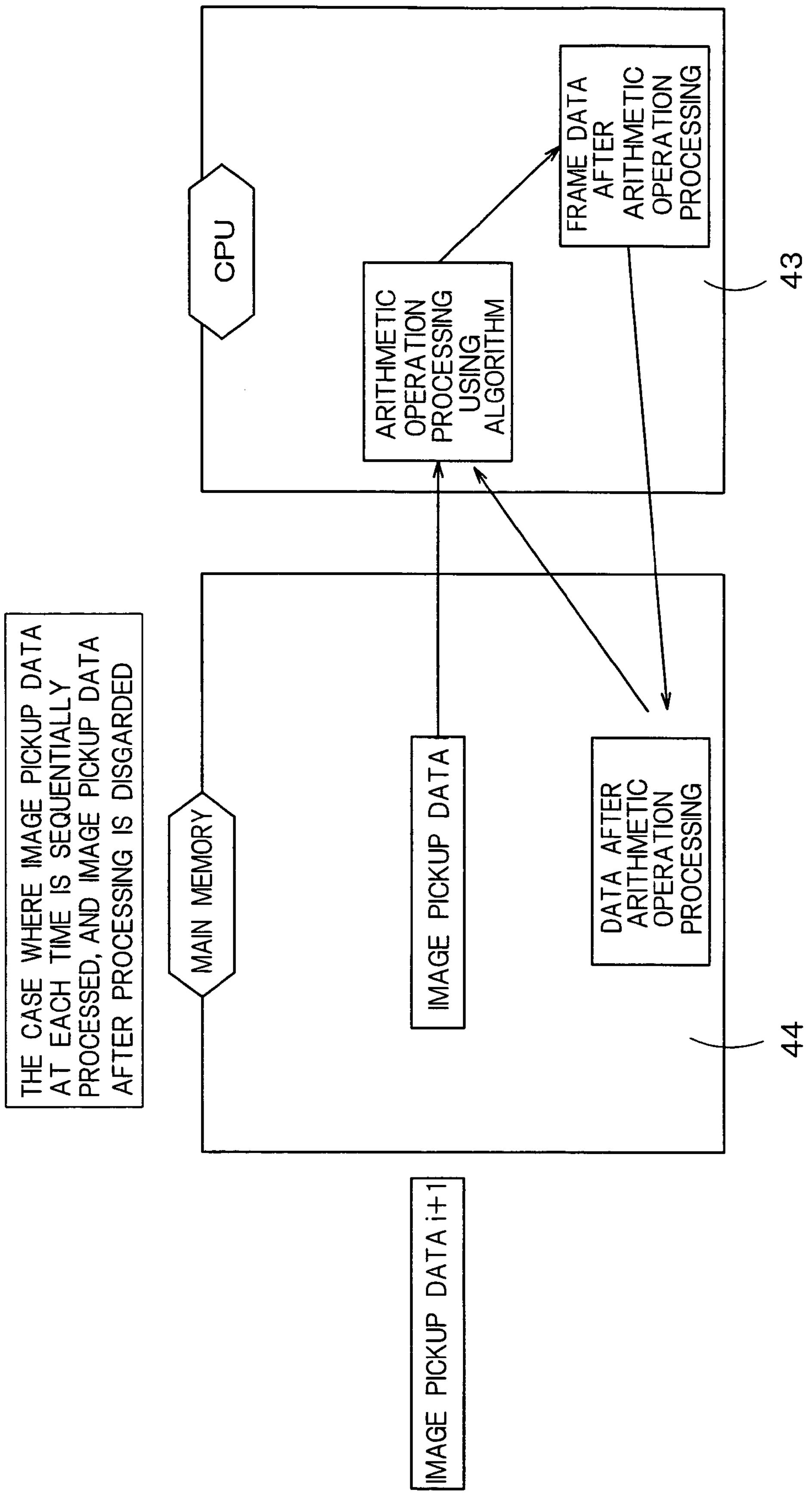
F I G. 16

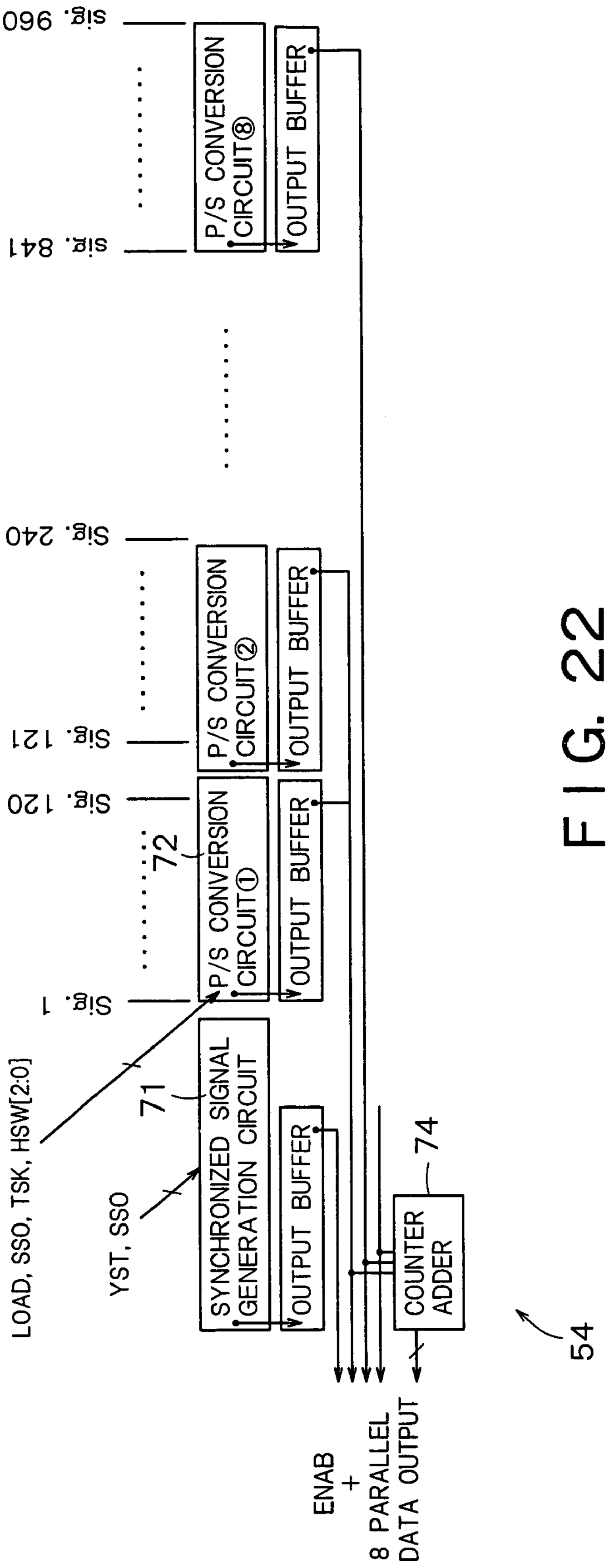
F I G. 22

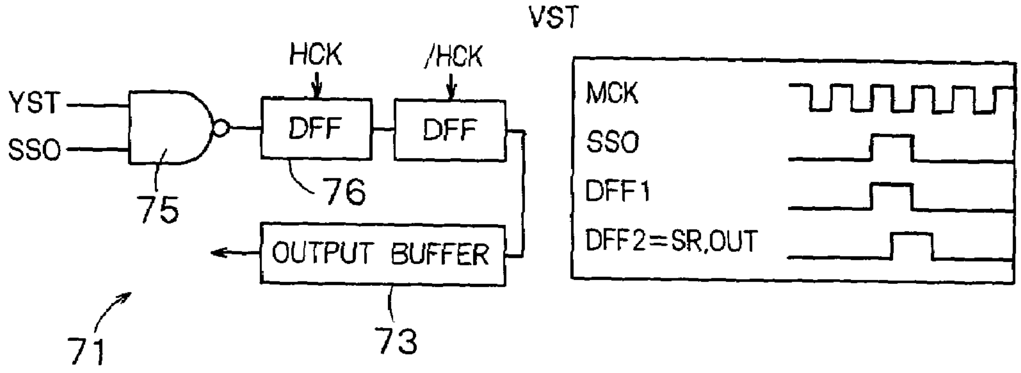
F I G. 23
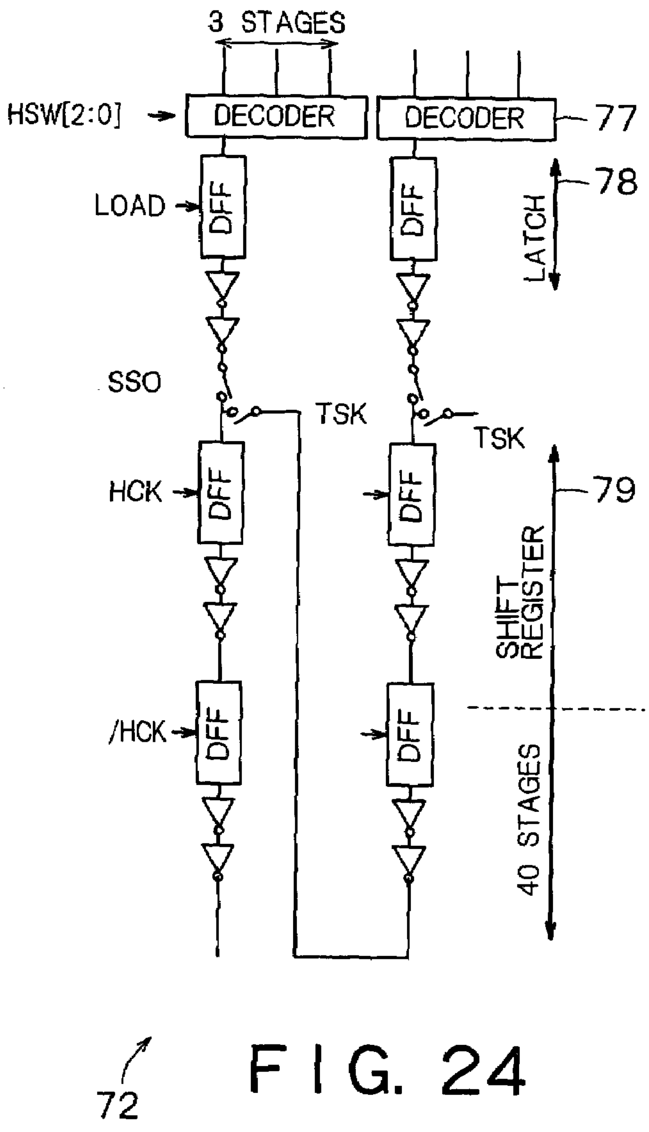
F I G. 24

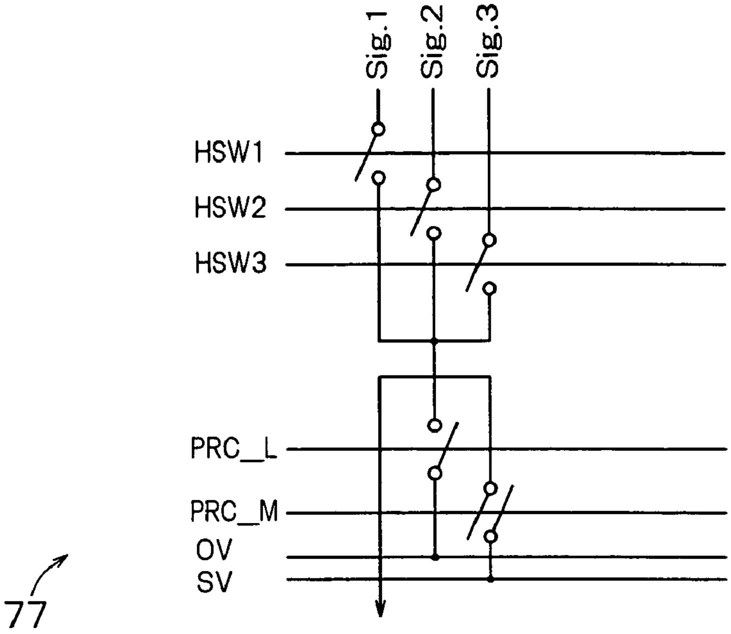
F I G. 25
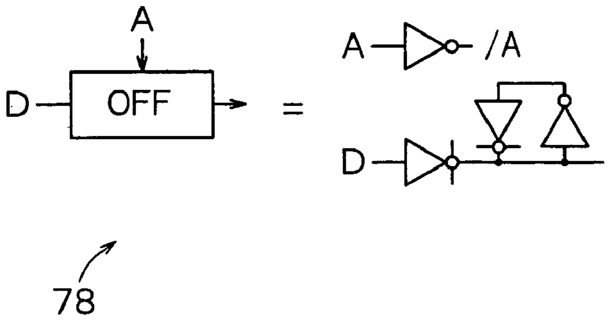
F I G. 26
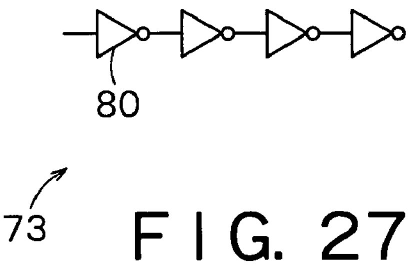
F I G. 27

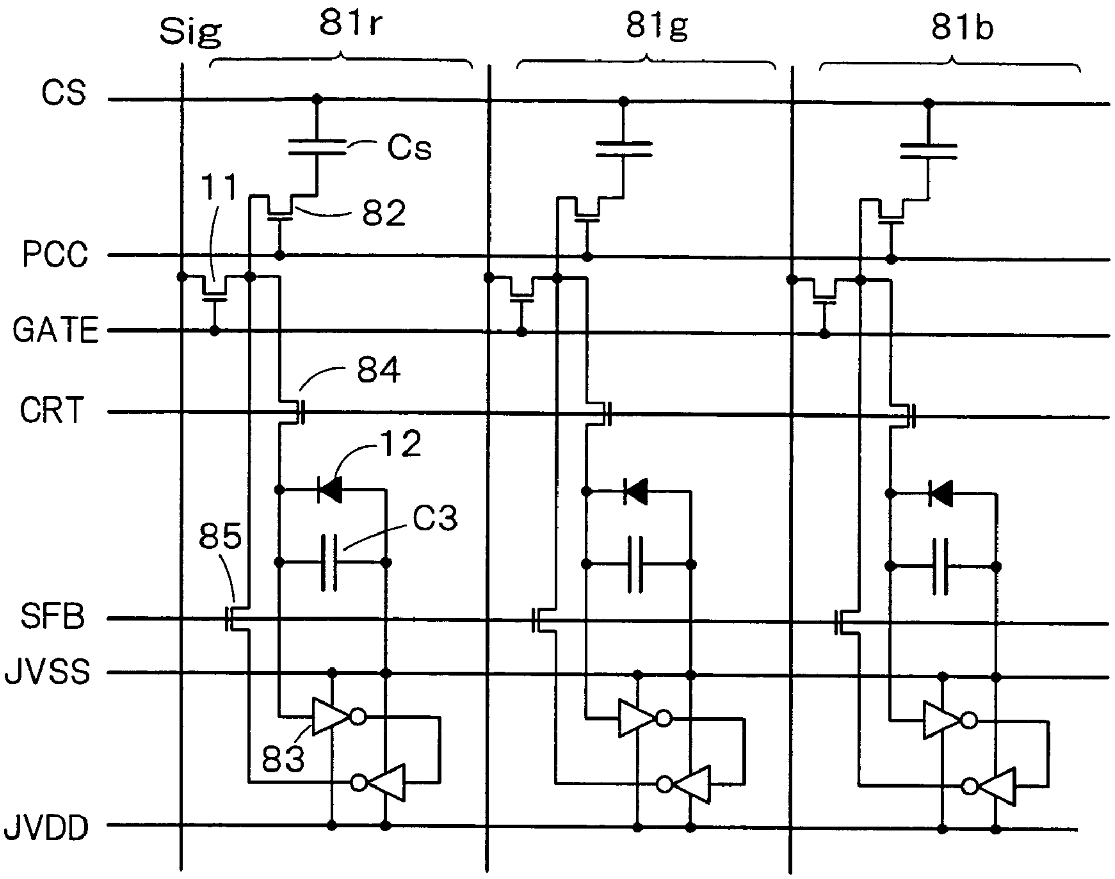
PCC···PIXEL Cs CONNECTION
SFB···SRAM FEED BACK
CRT···CAPACITOR RESET TRANSISTOR
F I G. 28

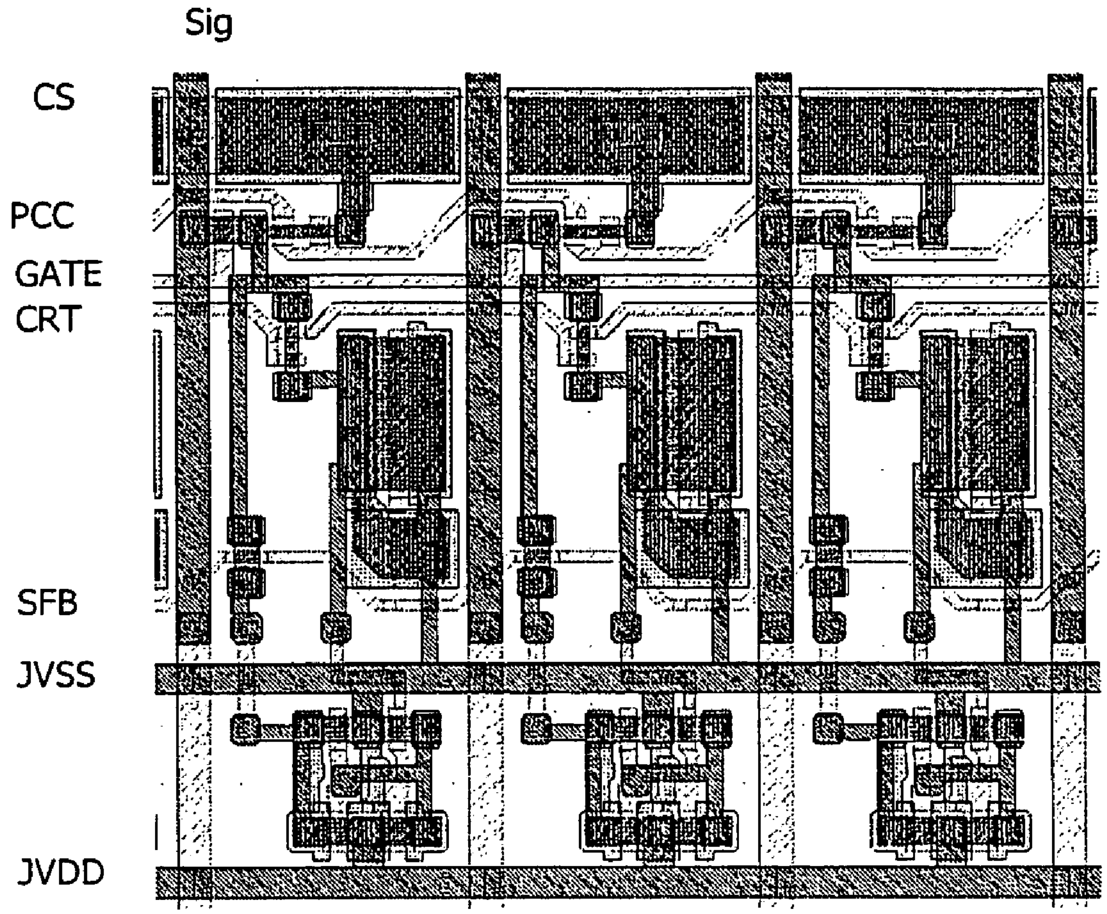
F I G. 29

1 BLOCK = 40×30
(HORIZONTAL 8, VERTICAL 8)

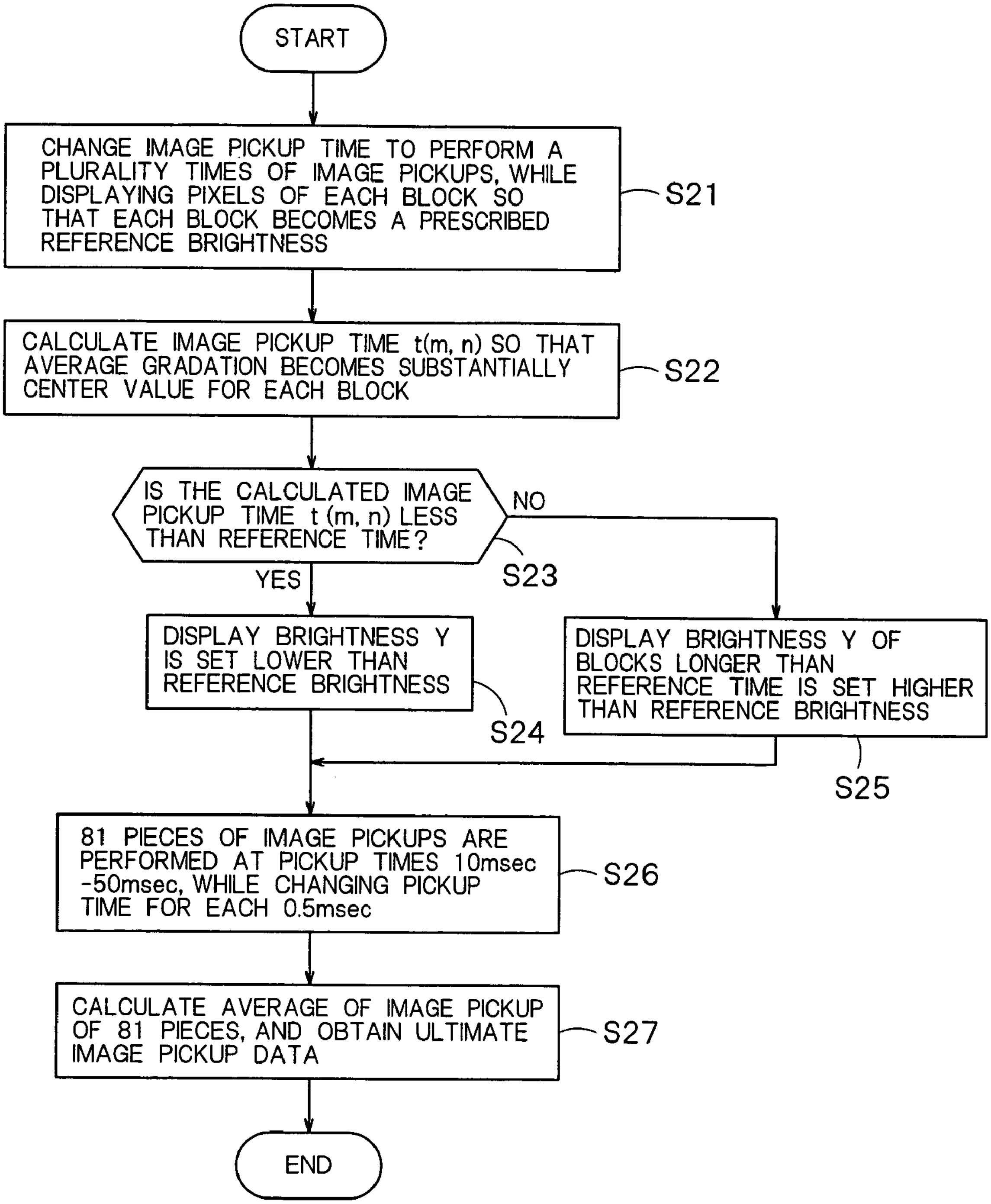
F I G. 35

IMAGE PICKUP OBJECT

IMAGE PICKUP RESULT

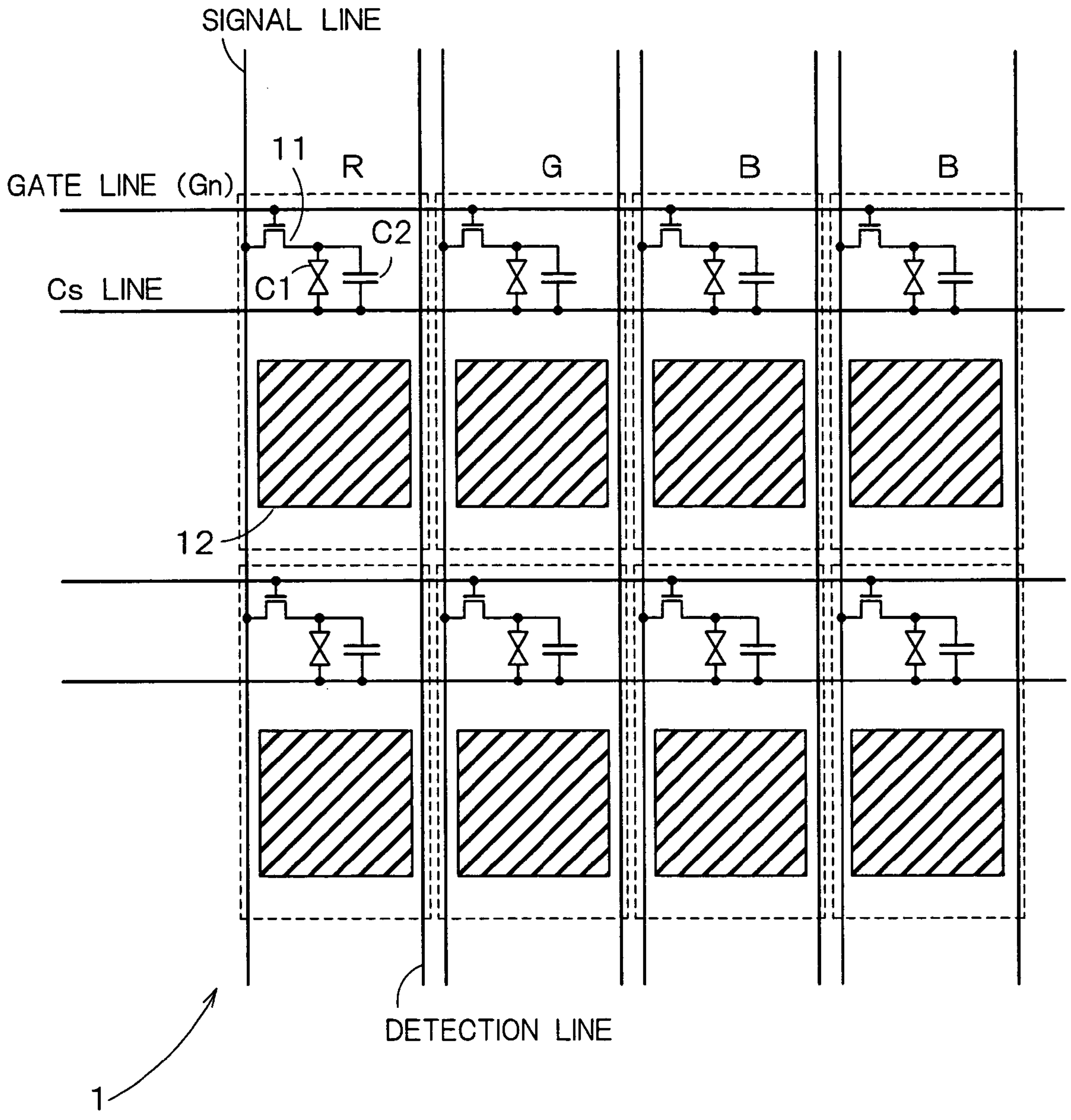
F I G. 52

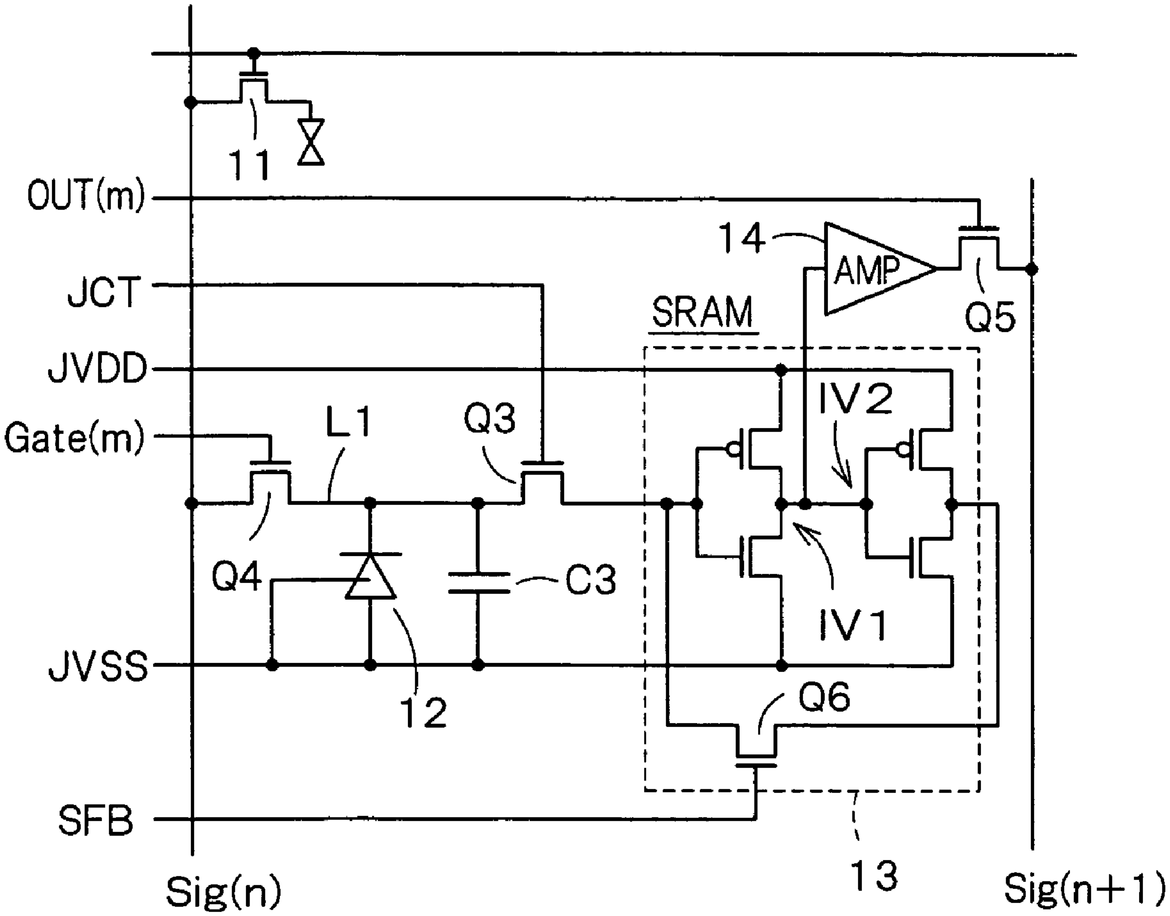
F I G. 53

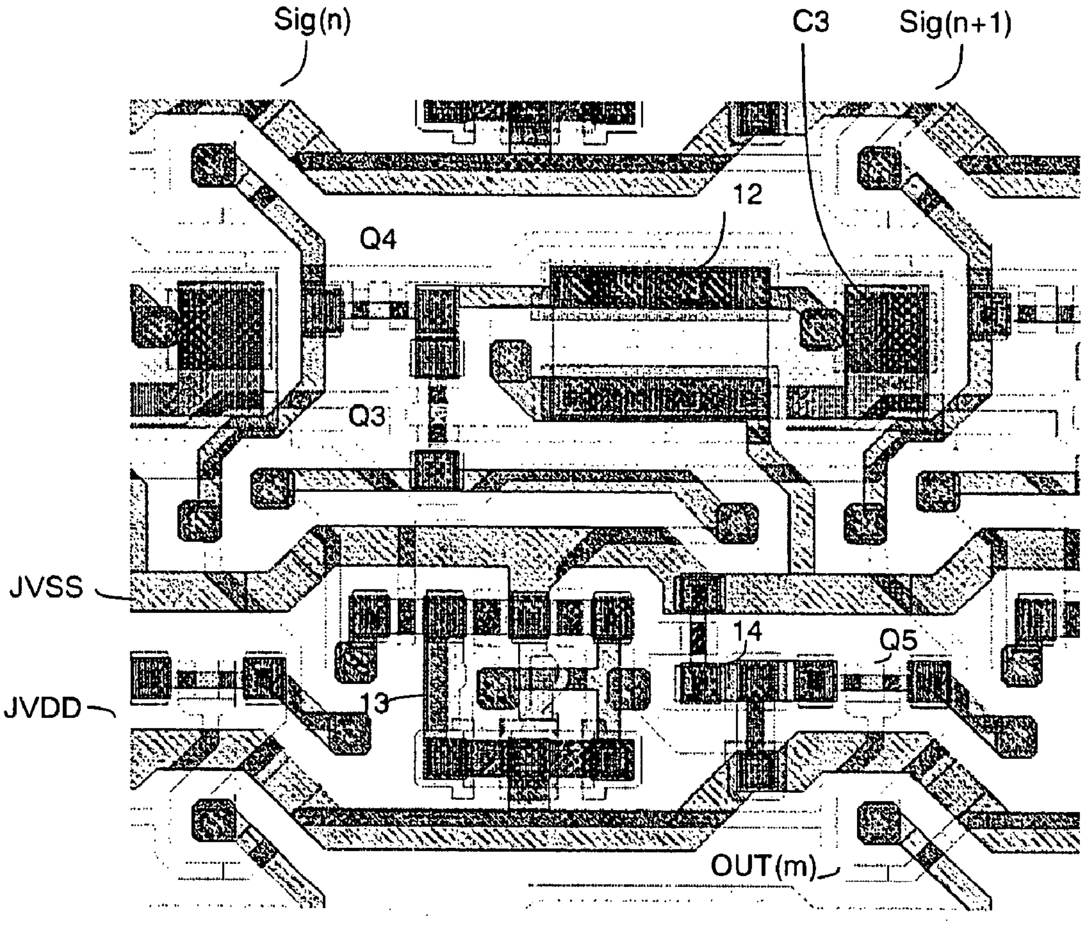
JVDD, JVSS···PATTERNED BY ONLY FIRST METAL
Sig(n)···PATTERNED BY CONNECTING FIRST AND SECOND METALS TO EACH OTHER
F I G. 55

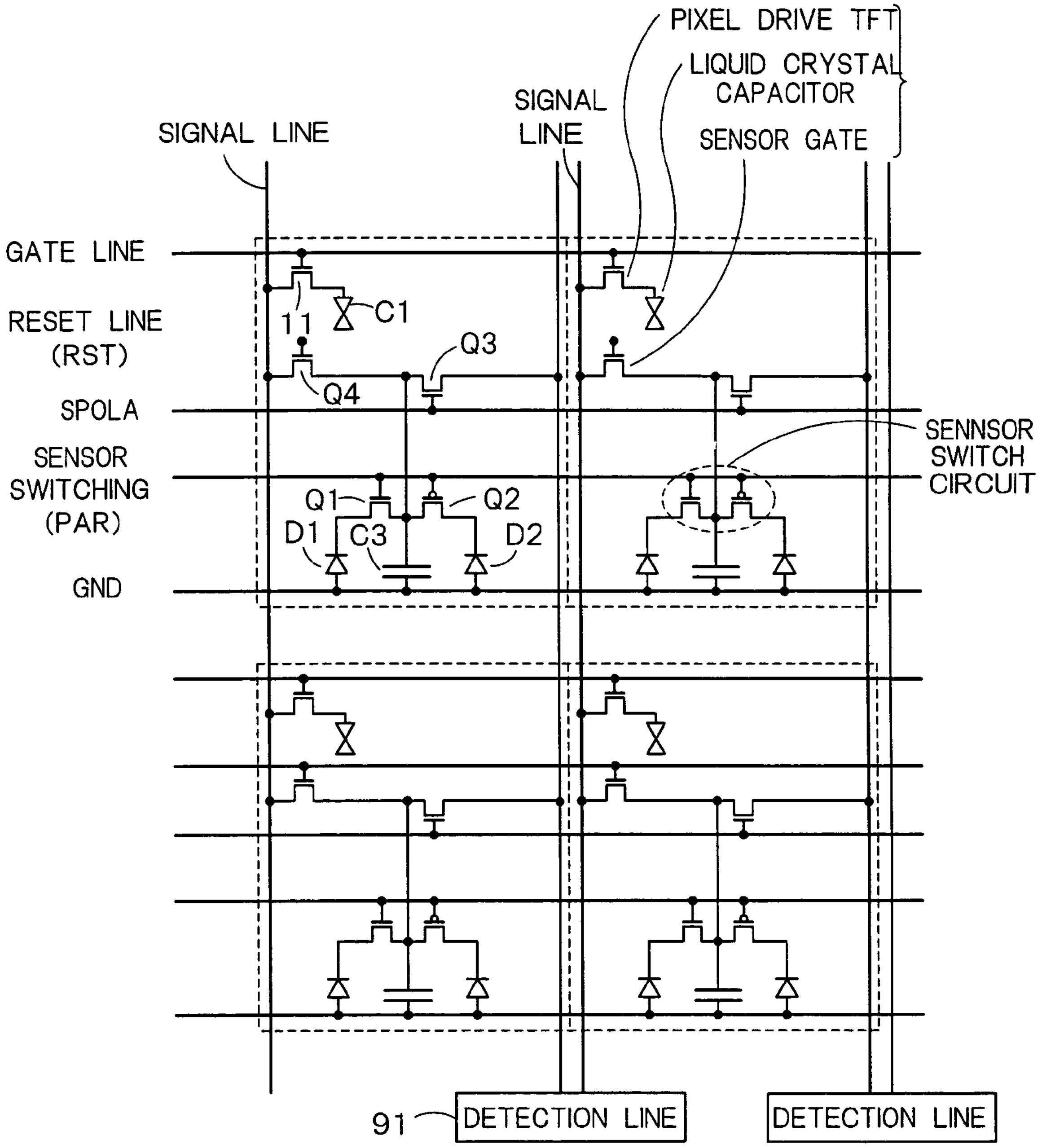
F I G. 56

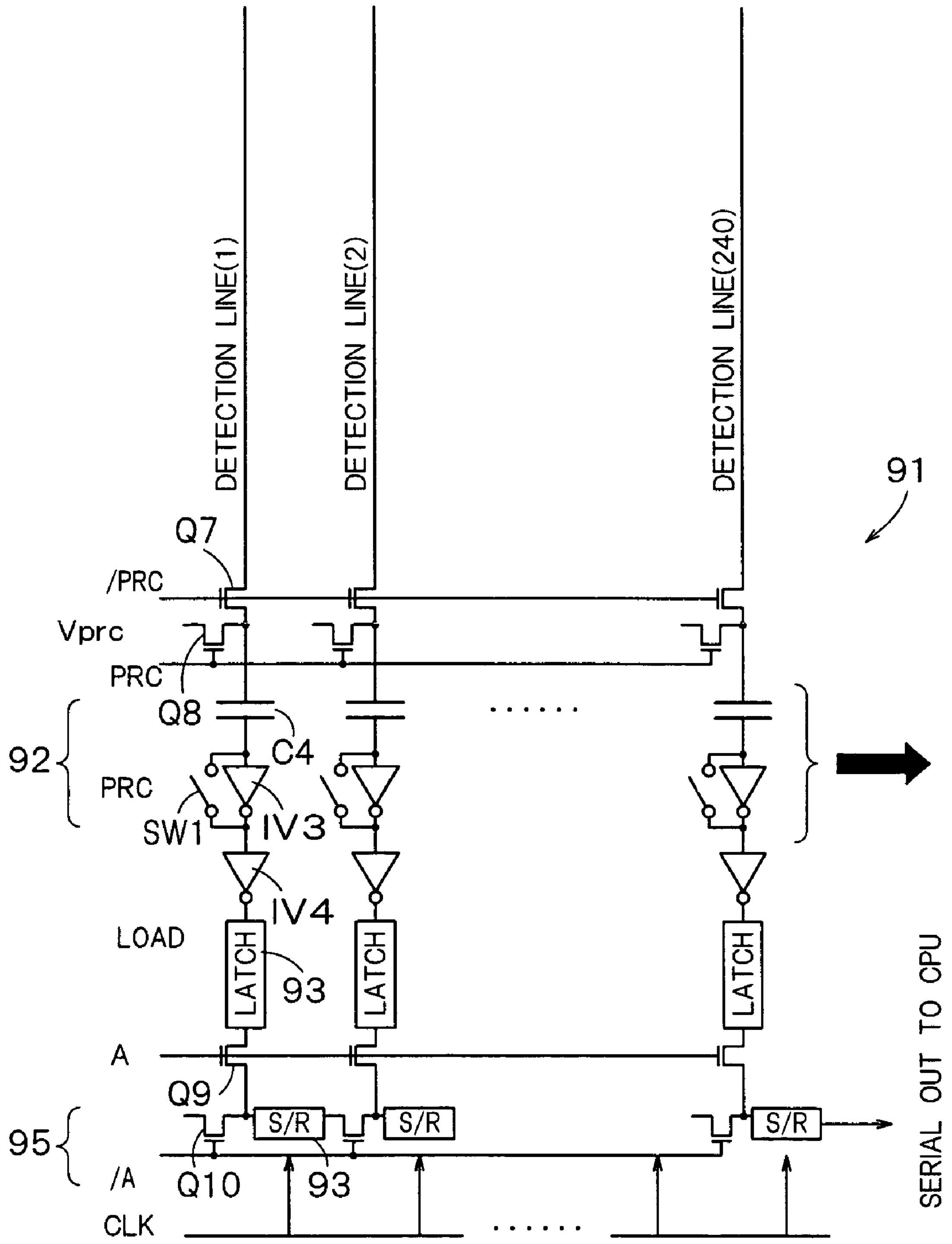
F I G. 57

DISPLAY DEVICE

CROSS REFERENCE TO RELATED APPLICATIONS

This application claims benefit of priority under 35 USC § 119 to Japanese Patent Applications No. 2002-204511 filed on Jul. 12, 2002, No. 2002-204559 filed on Jul. 12, 2002, No. 2002-218687 filed on Jul. 26, 2002, No. 2002-267972 filed on Sep. 13, 2002, No. 2002-313255 filed on Oct. 28, 2002, No. 2002-313273 filed on Oct. 28, 2002, No. 2002-323309 filed on Oct. 28, 2002 and No. 2002-381775 filed on December 27, the entire contents of which are incorporated by reference herein.

BACKGROUND OF THE INVENTION

1. Field of the Invention

The present invention relates to a display device having an image capture function.

2. Related Art

A liquid crystal display device includes an array substrate on which signal lines, scan lines, and pixel TFTs are disposed in horizontal and vertical directions and a drive circuit for driving the signal lines and the scan lines. A processing technology for forming a part of the drive circuit on the array substrate has been commercialized by the recent advance and development of integrated circuit technologies. Accordingly, liquid crystal display devices can be made light, small and thin in their entirety, which permits the liquid crystal display devices to be widely used as a display device for various mobile equipment such as mobile phones, notebook type computers, and the like.

Incidentally, there has been proposed a display device provided with an image capture function by disposing an intimate contact type area sensor for capturing an image on an array substrate (for example, Japanese Laid-Open Patent Application Publications Nos. 2001-292276 and 2001-339640).

Conventional display devices having this type of the image capture function capture an image by changing the amount of charge of a capacitor connected to a sensor according to a quantity of light received by the sensor and by detecting a voltage at both the ends of the capacitor.

However, since a current flowing through the sensor is weak, it is difficult to accurately detect the change of the voltages at both the ends of the capacitor caused by the current, which results in a significant error in measurement. Accordingly, there is a likelihood in which noise appear in a captured image.

Further, when an SRAM and a buffer circuit are connected to the capacitor to detect the voltage at both the ends of the capacitor, whether a logic level is at "0" or at "1" is determined depending upon whether the voltage exceeds the threshold value voltage of a transistor constituting the SRAM and the buffer circuit. However, since the threshold value voltage of the transistor is varied, there is a possibility that a determination criterion of "0" and "1" is varied. Further, since the current flowing through the sensor is also varied, there is a possibility that the determination criterion of "0" and "1" is also varied.

SUMMARY OF THE INVENTION

An object of the present invention, which was made in view of the above problems, is to provide a display device capable of capturing an image without being affected by a fluctuation of optical leak and a fluctuation of the electric characteristics of transistors and the like.

In order to achieve the foregoing object, a display device, comprising:

pixel display holding circuits, sensors, and binary data output circuits which output binary data corresponding to outputs of said sensors, each being provided for each pixel formed on an insulation substrate in matrix form;

a serial output circuit which outputs serial data corresponding to outputs of pixels, said serial output circuit being formed on an outside frame of said insulation substrate; and an external circuit provided on an outside frame of said insulation substrate, said external circuit having a circuit which generates multi-gradation image based on a plurality of binary image.

Furthermore, a display device, comprising:

pixel display holding circuits, sensors and sensor output circuits which output outputs of said sensors, each being provided for each pixel formed on an insulation substrate in matrix form;

an A/D conversion circuit formed on outside frame of said insulation substrate, which converts a signal from pixels into digital data;

a serial output circuit formed on outside frame of said insulation substrate, which converts the digital data after A/D conversion into serial data and outputs the serial data;

image capture indication unit which indicates image capture at a plurality of conditions; and an external circuit provided outside of said insulation substrate, said external circuit having a multi-gradation image synthesizer unit which synthesizes a multi-gradation image based on image consisted of a plurality of few bits.

Furthermore, a display device, comprising:

pixel display holding circuits, sensors and binary data output circuits which output binary data corresponding to outputs of said sensors, each being provided for each pixel formed on an insulation substrate in matrix form;

an A/D conversion circuit formed on an outside frame of said insulation substrate, which converts a signal from pixels into digital data;

a serial output circuit formed on the outside frame of said insulation substrate, which outputs serial data corresponding to digital data after A/D conversion;

an image capture indication unit which indicates image pickup at a plurality of conditions; and an external circuit provided outside of said insulation substrate, said external circuit having a synthesizer unit which synthesizes a multi-gradation image based on a plurality of binary image.

Furthermore, a display device, comprising:

display elements formed in vicinity of intersections of signal lines and scan lines aligned vertically and horizontally;

image pickup units provided corresponding to each of said display elements by at least one piece, each converting incident radiation at predetermined range into an electric signal;

electric charge accumulators which accumulate the electric charge in accordance with the electric signal converted by said image pickup units; and signal processing unit which generates digital image data corresponding to image picked up by said image pickup unit, based on accumulated electric charge of said electric charge accumulator for each of a plurality of image pickup conditions.

Furthermore, a display device, comprising:

display elements formed in vicinity of intersections of signal lines and scanning lines aligned vertically and horizontally;

image pickup units provided corresponding to each of said display elements by at least one piece, each converting incident radiation at predetermined range into an electric signal;

electric charge accumulators which accumulate the electric charge in accordance with the electric signal converted by said image pickup units;

image pickup data amplifier which amplifies binary data in accordance with accumulated electric charge of said electric charge accumulation unit;

an average gradation detection unit which detects average gradation of an image pickup object based on the binary data amplified by said image pickup data amplifier;

a brightness setting unit which sets display brightness of said display element in the case where said image pickup unit performs image pickup, based on detection result of said average gradation detection unit;

an image pickup time controller which controls switching of a plurality of image pickup times of said image pickup unit; and an image data generation means which generates digital image data corresponding to pickup image based on image pickup result of said image pickup unit at each pickup time controlled by said image pickup time controller at a state of display brightness set by said brightness setting unit.

Furthermore, a display apparatus, comprising:

display elements formed in vicinity of intersections of signal lines and scan lines aligned vertically and horizontally;

image pickup units provided corresponding to each of said display elements by at least one piece, each converting incident radiation at predetermined range into an electric signal;

electric charge accumulators which accumulate the electric charge in accordance with the electric signal converted by said image pickup units;

image pickup data amplifiers which amplify binary data in accordance with the accumulated electric charge of said electric charge accumulator;

a reference pattern storing unit which stores a plurality of reference patterns indicating display format of blocks consisted of a plurality of display elements;

a reference pattern selector which selects a plurality of reference patterns approximate to image pickup result of said image pickup unit; and an image data generation means which generates digital image corresponding to pickup image based on the result repeatedly picked up by said image pickup unit while displaying the reference patterns inverting brightness of the reference pattern selected by said reference pattern selector.

Furthermore, a display device, comprising:

display elements formed in vicinity of intersections of signal lines and scan lines aligned vertically and horizontally;

image pickup units provided corresponding to each of said display elements by at least one pieces, each converting incident radiation at predetermined range into an electric signal;

electric charge accumulators which accumulate in accordance with an electric signal converted by said image pickup unit;

image pickup result storing units which temporarily store a signal in accordance with the electric charge accumulated in said electric charge accumulator; and output switching controllers which switches whether or not to output the signals stored in said image pickup storing unit, in accordance with logic of a control signal line, wherein at least portion of said control signal line is arranged so as to be overlapped with a power supply line of said image pickup result storing unit.

Furthermore, a display device, comprising:

display elements formed in vicinity of intersections of signal lines and scan lines aligned vertically and horizontally;

image pickup units provided corresponding to each of said display elements by at least one pieces, each converting incident radiation at predetermined range into an electric signal;

electric charge accumulators which accumulate in accordance with an electric signal converted by said image pickup unit;

image pickup result storing units which temporarily store a signal in accordance with the electric charge accumulated in said electric charge accumulator; and output switching controllers which switches whether or not to output the signals stored in said image pickup storing unit, in accordance with logic of a control signal line, wherein resistances of power supply lines of said image pickup result storing units are set to be lower than that of output lines of said output switching controllers.

Furthermore, a display device, comprising:

display elements formed in vicinity of intersections of signal lines and scan lines aligned vertically and horizontally; and sensors provided corresponding to each of said display elements by a plurality of pieces, which receive incident radiation at ranges different from each other and accumulate electric charges in accordance with the received light, wherein each of said sensors has:

a photoelectric converter which outputs an electric signal in accordance with received light;

an electric charge accumulator which accumulates the electric charge in accordance with said electric signal;

an initial controller which switches whether or not to accumulate an initial electric charge in said electric accumulator; and an output controller which switches whether or not to output the signal in accordance with the accumulated electric charge of said electric charge accumulator.

Furthermore, a display device, comprising:

display elements formed in vicinity of intersections of signal lines and scan lines aligned vertically and horizontally, said display elements constituting a display screen;

sensors provided in said display screen; and

A/D converters which convert output signals of said sensors into digital signals, said A/D converters being formed an outside frame portion of an insulation substrate on which said signal lines, said scan lines, said display elements and said sensors are formed.

Furthermore, a display device, comprising:

display elements formed in vicinity of intersections of signal lines and scan lines aligned vertically and horizontally;

sensors provided corresponding to said display elements;

A/D converters which convert output signals of said sensors into digital signals; and a shift register which converts said digital signals into serial signals and outputs the serial signals, wherein said shift register has:

a first shift register which converts said digital signal of m (m is an integer equal to or more than 2) bits into a first serial signal and outputs the first serial signal;

a second shift register which converts said digital signal of n (n is an integer equal to or more than 2) bits into a second serial signal and outputs the second serial signal; and a serial signal selector which selects either of said first or second serial signal and outputs the selected signal.

Furthermore, a display device, comprising:

display elements formed in vicinity of intersections of signal lines and scan lines aligned vertically and horizontally on an insulation substrate;

sensors provided on said insulation substrate, said sensors corresponding to said display elements;

A/D converters formed on said insulation substrate which converts output signals of said sensors into digital signals;

a plurality of shift registers formed on said insulation substrate which converts said digital signals into a first serial signal and output the first serial signal;

a serial signal selector formed on a substrate different from said insulation substrate which selects either one of a plurality of first serial signals outputted from said plurality of first shift registers and outputs the selected signal; and an S/P converter formed on a substrate different from said insulation substrate which converts the output signal of said serial signal into a plurality of second serial signals corresponding to said first serial signals.

BRIEF DESCRIPTION OF THE DRAWINGS

FIG. 2 is a block diagram showing a part of a pixel array unit 1 in detail;

FIG. 3 is a circuit diagram showing a part of the pixel array unit 1 in FIG. 2 in detail;

FIG. 7 is a view showing an example of switching a voltage applied to a capacitor;

FIGS. 9A to 9D are views showing an example in which a name card is captured;

FIG. 12 is a view showing an example of an image including a latter "T";

FIG. 13 is a view showing a result obtained by capturing an image of a row surrounded by a dotted line shown in FIG. 12;

FIG. 16 is a view showing an example of reducing the capacity of the main memory;

FIG. 22 is a block diagram showing an example of a detailed arrangement of a signal processing/output circuit 54;

FIG. 23 is a block diagram showing an example of a detailed arrangement of a synchronous signal generation circuit 71;

FIG. 24 is a block diagram showing an example of a detailed arrangement of a P/S conversion circuit 72;

FIG. 25 is a circuit diagram showing an example of an internal arrangement of a decoder;

FIG. 26 is a circuit diagram showing an example of an internal arrangement of a latch;

FIG. 27 is a block diagram showing a detailed arrangement of an output buffer 73;

FIG. 28 is a detailed circuit diagram of one pixel of the pixel array unit 1;

FIG. 29 is a layout view of one pixel on the glass substrate 31;

FIG. 35 is a flowchart showing an example of a processing operation executed by a control IC 55 of FIG. 18;

FIG. 52 is a block diagram showing a part of a pixel array unit 3 in detail;

FIG. 53 is a circuit diagram showing an arrangement of one pixel in detail;

FIG. 55 is a plan view of a layout of one pixel in a sixth embodiment of the display device;

FIG. 56 is a circuit diagram showing a part the pixel array unit 3 of FIG. 52 in detail;

FIG. 57 is a circuit diagram showing a detailed arrangement of a detection circuit 91;

DESCRIPTION OF THE PREFERRED EMBODIMENTS

A display device according to the present invention will be specifically described below with reference to the figures.

Figure 1:
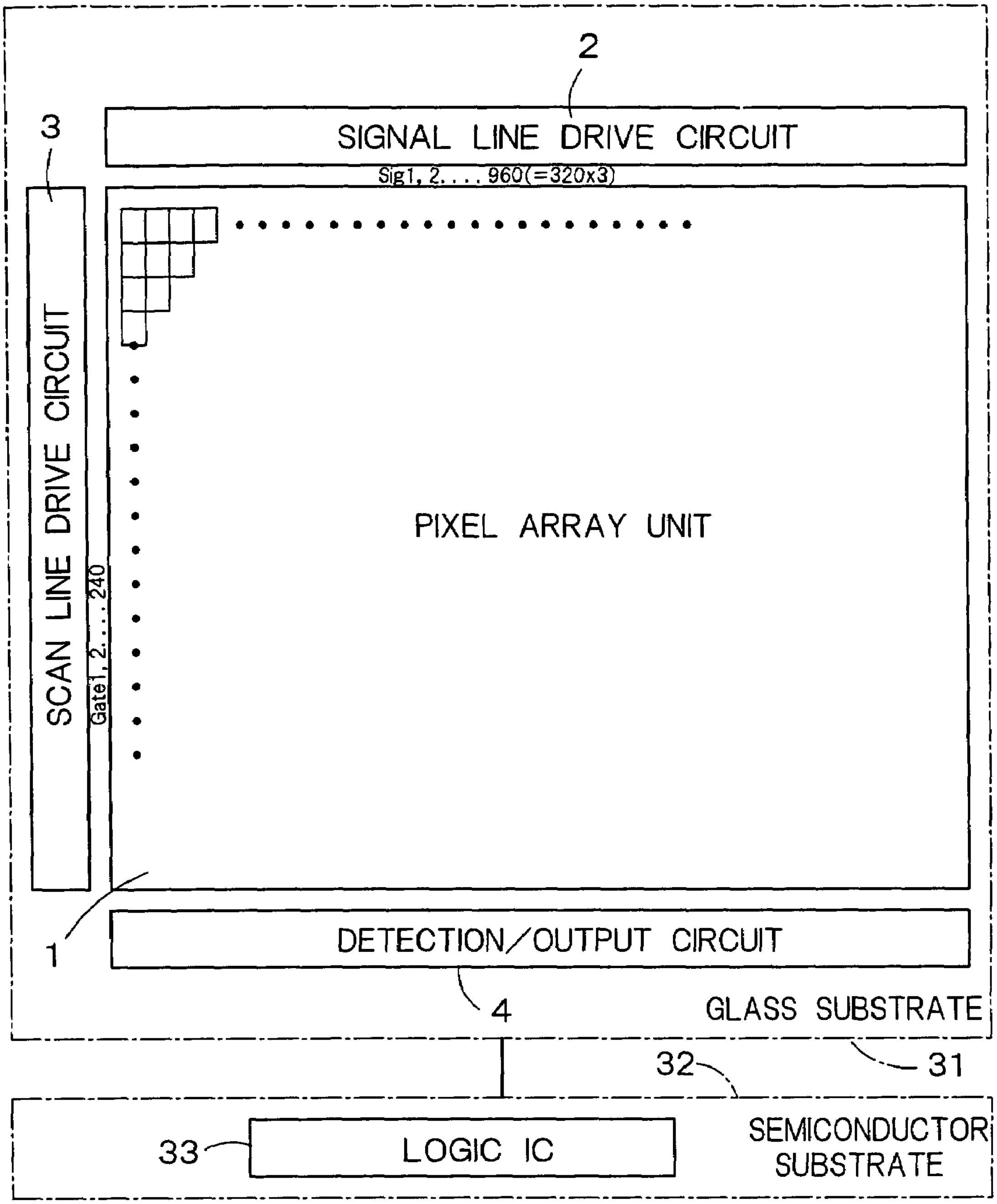
FIG. 1 is a schematic view showing an arrangement of a first embodiment of a display device according to the present invention.

FIG. 1 is a schematic view showing an arrangement of a first embodiment of the display device having an image capture function according to the present invention. The display device shown in FIG. 1 is composed of a glass substrate 31 and a semiconductor substrate 32. Disposed on the glass substrate 31 are a pixel array unit 1 having signal lines and scan lines formed thereon in horizontal and vertical directions, a signal line drive circuit 2 for driving the signal lines, a scan line drive circuit 3 for driving the scan lines, and a detection/output circuit 4 for capturing and outputting an image. These circuits are formed of, for example, polysilicon TFTs. The signal line drive circuit 2 has a D/A conversion circuit (not shown) for converting digital image data into an analog voltage suitable to drive the display elements. The D/A conversion circuit may be arranged in a known manner. A logic IC 33 is mounted on the semiconductor substrate 32 to control display and image capture. Various signals are transmitted and received between the glass substrate 31 and the semiconductor substrate 32 through, for example, an FPC.

FIG. 2 is a block diagram showing a part of the pixel array unit 1. The pixel array unit 1 shown in FIG. 2 includes pixel TFTs 11, which are formed in vicinity of the respective intersections of the signal lines and the scan lines disposed in the horizontal and vertical directions, a liquid crystal capacitor C1 and an auxiliary capacitor C2 each connected between an end of each corresponding pixel TFT 11 and each corresponding Cs line and image capture sensors 12*a* and 12*b* provided with each pixel TFT 11 in twos. The sensors 12*a* and 12*b* are connected to a power supply line and a control line (both not shown).

Although FIG. 2 shows an example in which the two sensors 12*a* and 12*b* are provided for each pixel to enhance resolution of image capture, the number of the sensors is not particularly limited.

FIG. 3 is a circuit diagram showing a part of the pixel array unit 1 in FIG. 2 in detail. As shown in FIG. 3, each of the sensors 12*a* and 12*b* includes photodiodes D1 and D2 and sensor switch transistors Q1 and Q2. The photodiodes D1 and D2 output electric signals according to the quantities of light received thereby. The sensor switch transistors Q1 and Q2 alternately select any one of the plurality of photodiodes D1 and D2 in a pixel.

Each pixel includes two sensors 12*a* and 12*b*, a capacitor C3 commonly used by the two corresponding sensors 12*a* and 12*b* in each pixel, a buffer (BUF) 13 for outputting binary data according to electric charge accumulated in the capacitor C3 to a detection line, a transistor Q3 for controlling write to the buffer 13, and a reset transistor Q4 for initializing the buffer 13 and the capacitor C3.

Figure 4:
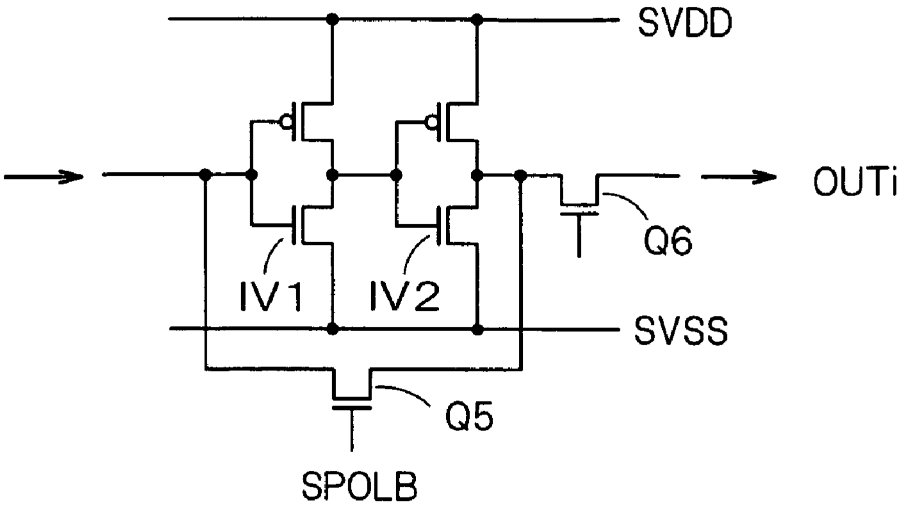
FIG. 4 is a circuit diagram showing an internal arrangement of an SRAM.

The buffer 13 is composed of a static RAM (SRAM) and includes two inverters IV1 and IV2 connected in series, a transistor Q5 interposed between the output terminal of the latter stage inverter IV2 and the input terminal of the former stage inverter IV1, and an output transistor Q6 connected to the output terminal of the latter stage inverter IV2 as shown in for example, FIG. 4.

When a signal SPOLB is at a high level, the transistor Q5 is turned on, and the two inverters IV1 and IV2 execute a holding operation. When a signal OUTi is at a high level, the held data is output to a detection line.

The display device of this embodiment can execute an ordinary display operation and also can capture an image similarly to a scanner. When the ordinary display operation is executed, the transistor Q3 is turned off, and no effective data is stored in the buffer 13. In this case, a signal line voltage is supplied from the signal line drive circuit 2 to the signal lines, and an image is displayed according to the signal line voltage.

Figure 5:
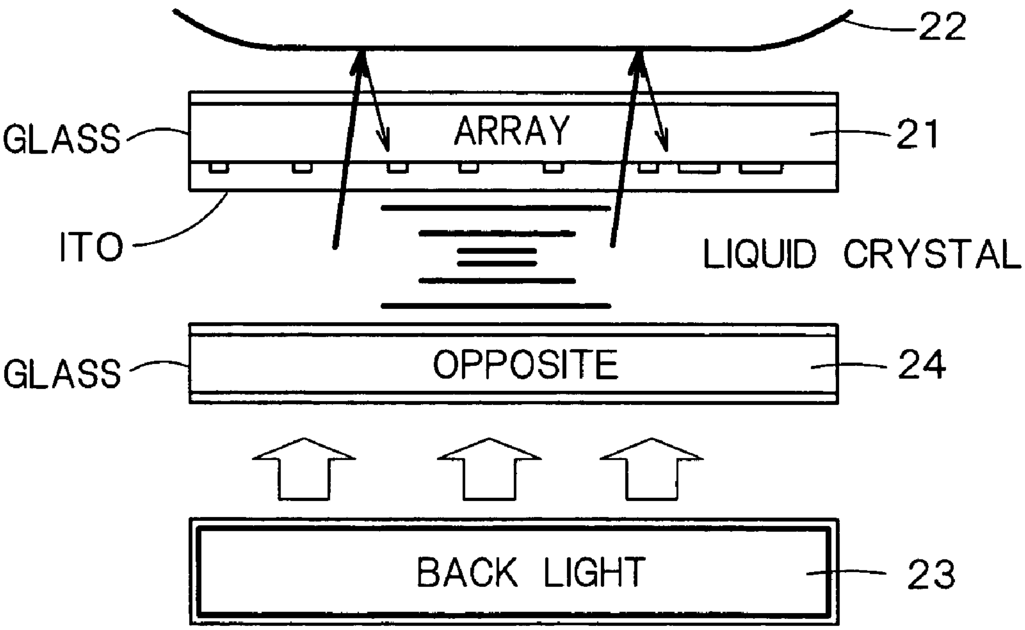
FIG. 5 is a sectional view of the display device.

In contrast, when an image is captured, an image capturing object (for example, a “sheet”) 22 is placed on the upper surface of an array substrate 21, and light from a back light 23 is irradiated onto the sheet 22 through a confronting substrate 24 and the array substrate 21 as shown in FIG. 5. The light reflected by the sheet 22 is received by the sensors 12*a* and 12*b* on the array substrate 21, thereby the image is captured. At this time, a display is not affected by the image capture operation.

The captured image data is stored in the buffer 13 as shown in FIG. 3 and then supplied to a logic IC 33 shown in FIG. 1 through the detection lines. The logic IC 33 receives a digital signal output from the display device of this embodiment and executes arithmetic operation processing such as the rearrangement of data, removal of noise in the data, and the like.

Figure 6:
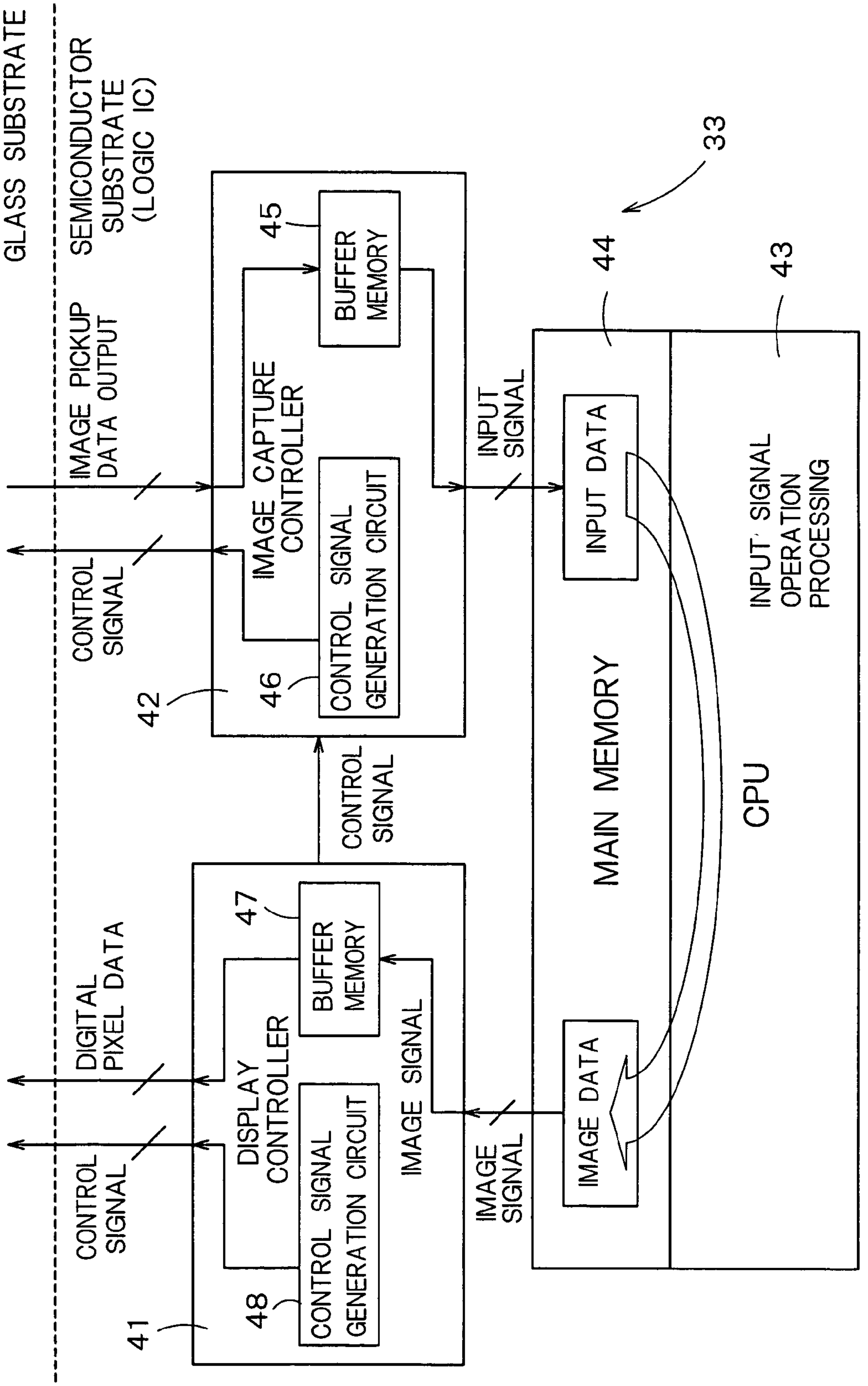
FIG. 6 is a block diagram showing an internal arrangement of a logic IC shown in FIG. 1.

FIG. 6 is a block diagram showing an internal arrangement of the logic IC 33 shown in FIG. 1. As shown in FIG. 6, the logic IC 33 includes a display controller 41 for controlling a display on the pixel array unit 1, an image capture controller 42 for controlling the sensors 12*a* and 12*b* that capture an image, a CPU 43 for controlling the logic IC 33 in its entirety, and a main memory 44 used by the CPU 43 when it executes tasks.

The image capture controller 42 includes a buffer memory 45 for temporarily storing image pickup data on the detection lines of FIG. 3 and a control signal generation circuit 46 for generating an image capture control signal. The CPU 43 performs image processing of a captured image based on the image pickup data stored in the buffer memory 45 and generates display image data.

The display controller 41 includes a buffer memory 47 for temporarily storing the display image data created by the CPU 43 and a control signal generation circuit 48 for generating a control signal for controlling the operation timing of the signal line drive circuit 2 and the scan line drive circuit 3 shown in FIG. 1.

When an image is captured, an initial charge is previously accumulated in the capacitors C3 of the respective pixels. The accumulated charge is set to a voltage higher than the threshold value voltage of the inverter at the initial stage of the SRAM. When the sensors 12*a* and 12*b* capture a whitish image, a current is caused to flow in sensors 12*a* and 12*b* in response to the light reflected by the sheet, the charge of the capacitors C3 corresponding to the sensors 12*a* and 12*b* is discharged and the voltage at both the ends of the capacitors C3 is lowered. In contrast, when sensors 12*a* and 12*b* capture a blackish image, almost no current flows in the sensors 12*a* and 12*b*, and thus the voltage at both the ends of the capacitors C3 is not almost changed.

Accordingly, the tint of the captured image can be determined by detecting the voltage at both the ends of the capacitors C3. In this embodiment, the voltage of the capacitors C3 at both the ends thereof is temporarily stored in the buffer 13 composed of the SRAM. When the voltage at both the ends of the capacitors C3 is equal to or larger than the threshold value voltage of the inverter at the initial stage of the SRAM, it is determined that the buffer 13 is at "1" (high level), and when the voltage is less than the threshold value voltage, it is determined that the buffer 13 is at "0" (low level).

However, since a light leak current caused by the sensors 12*a* and 12*b* is largely varied and weak, the voltage at both the ends of the capacitors C3 is liable to be varied. Further, since the threshold value voltages of the transistors constituting the SRAM is also varied, even if the same image is captured, it is determined that the SRAM 13 is at "1" or at "0" according to circumstances. Such a variation appears as the noise of the captured image. The current of a photoelectric conversion element, which is formed on an insulation substrate such as the glass substrate used as the array substrate of the display device, varies more than the current of a photoelectric conversion element formed on a silicon wafer often used in a commercially available scanner and the like. It is difficult to uniformly form the latter photoelectric conversion element because it has a large area and is processed at a low temperature (which is restricted by the heat resistance temperature of the substrate). Accordingly, any means for compensating the variation characteristic to the display device must be provided. Furthermore, although it is desirable for the display device to reproduce a delicate gradation of an image pickup object, this becomes ostracized by the above variation. A means and its arrangement, which can reduce noise or can reproduce a gradation display regardless of that the means is a sensor circuit composed of a transistor whose characteristics have a large variation and a photoelectric conversion element whose leak current fluctuates largely, will be explained below.

The CPU 43 shown in FIG. 6 captures an image a plurality of times by changing the image pickup conditions of the sensors 12*a* and 12*b* and generates final image data based on a result of the image captured the plurality of times. Specifically, as shown in FIG. 7, a voltages Vprc applied to the capacitors C3 is changed to four levels, and a control signal for capturing the image is supplied to the glass substrate while applying the voltage Vprc of each level to the capacitors C3. Further, the CPU 43 executes an arithmetic operation to obtain digital data from a result of the captured image output from the glass substrate. Since both the signals (the digital image data, control clock, and control signal) input to the glass substrate and the signals output therefrom are digital signals (digital signals based on a picked-up result), the display controller 41 and the image capture controller 42 shown in FIG. 6 can be easily formed on one chip. When it is assumed that the glass substrate has no D/A conversion circuit thereon, the display controller 41 requires an amplifier circuit (analog circuit), and thus it is difficult to arrange them on one chip. In this embodiment, however, they can be arranged on the one chip without additional cost.

Further, since semiconductors are more miniaturized and integrated in a higher level by a recent semiconductor manufacturing process, it is easy to arrange the CPU 43 and the main memory 44 shown in FIG. 6 on the one chip together with the display controller 41 and the image capture controller 42.

Figure 8:
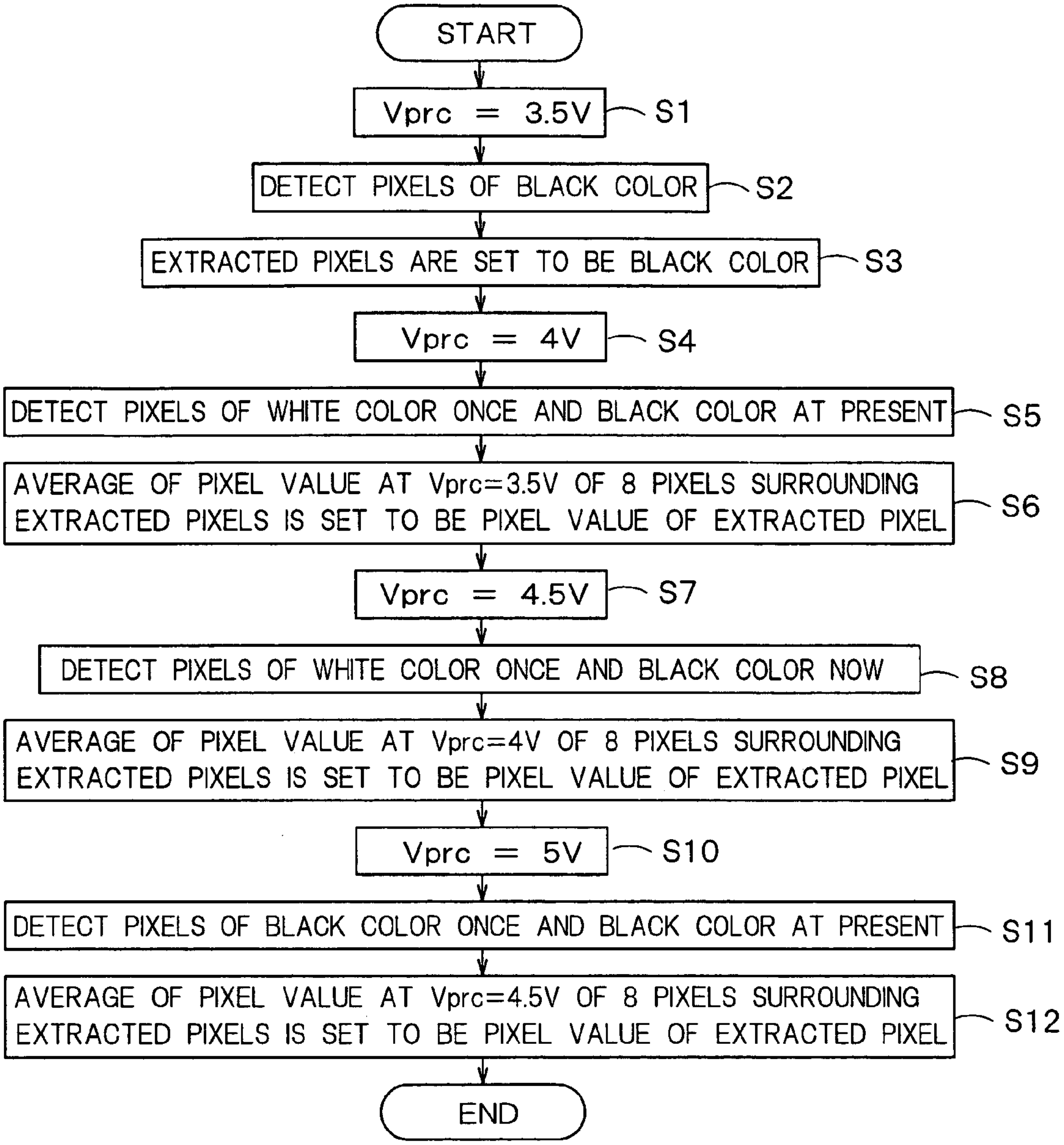
FIG. 8 is a flowchart showing an example of processing operations executed by a CPU.

FIG. 8 is a flowchart showing an example of processing operations executed by the CPU 43. First, the CPU 43 applies the voltage Vprc=3.5 V (which is a value relatively near to the threshold value of the inverter of the SRAM at the initial stage thereof, the threshold value of the inverter being varied around about 2.5 V that is half a power supply voltage (5 V))) to an end of the capacitor C3 of FIG. 3 provided with each pixel and accumulates an initial voltage in the capacitor C3 (step 1).

Next, the image is captured at a first time (step S2). In this case, a current flows through the sensors 12*a* and 12*b* that read the white portion or the gray portion near to white of the image, thereby the initial charge of the capacitors C3 corresponding to the above sensors 12*a* and 12*b* is discharged and the voltage at both the ends of the capacitors C3 is reduced. In contrast, since no current flows through the sensors 12*a* and 12*b* that read the black portion of the image, the voltage at both the ends of the capacitors C3 corresponding thereto is not almost changed.

At step S2, when the voltage at both the ends of the capacitors C3 is higher than the threshold value voltage of the initial stage inverter of the SRAM, it is determined that the pixels corresponding to the capacitors C3 is black. That is, first, only the black portion of the captured image is extracted at step S2, and a black pixel value is set to the pixels corresponding to the extracted black portion and a white pixel value is set to the other pixels, and these black and white pixel values are stored in the main memory 44 (step S3). The precharge voltage of the capacitors C3 is set to a voltage relatively near to the threshold value voltage of the initial stage inverter of the SRAM. Accordingly, when the portion of the image facing the sensors is somewhat near to white, a slight leak voltage is generated, thereby a possibility that the voltage of the capacitors C3 is lower than the threshold value voltage of the initial stage inverter of the SRAM is increased. Conversely, when the voltage of the capacitors C3 is continuously higher than the threshold value voltage of the inverter, it can be determined that the corresponding portion of the image is black almost without fail.

For example, FIGS. 9A to 9D show an example in which the image of a name card (having black characters on a white background) is captured, and FIG. 9A shows a captured image that can be obtained at steps S1 to S3. At step S3, since only considerably blackish pixels are detected as black, an image, which is whitish in its entirety with letters somewhat faint, can be obtained as shown in FIG. 9A.

Next, the voltage Vprc=4V is applied to an end of each capacitor C3 and the initial charge is accumulate therein (step S4), and the image is captured at a second time (step S5). In this case, there is a possibility that pixels that are slightly more whitish than those at the first time are determined as black.

On the completion of the image capture at the second time, each pixel which is determined as white at the first time and determined as black at the second time is extracted, and the average value of the first time pixel value of the eight pixels around the extracted pixel is calculated and set as the pixel value of the extracted pixel (step S6).

FIG. 9B shows a captured image obtained at steps S4 to S6. Since an image slightly more whitish than that of FIG. 9A is determined as black, an image more blackish in its entirety than that of FIG. 9A is obtained.

Figure 10:
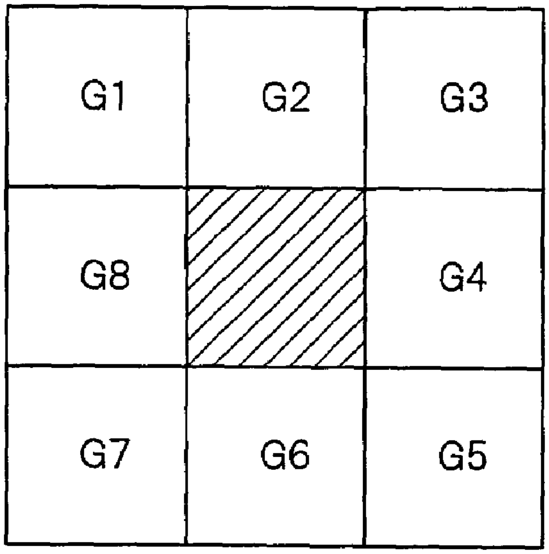
FIG. 10 is a view showing that eight peripheral pixels are averaged.

At step S6, when, for example, it is assumed that the pixel shown by a slanted portion of FIG. 10 is the extracted pixel, the average value (G1+ . . . +G8)/8 of the pixels values G1 to G8 of the eight pixels around the extracted pixel is set as the pixel value of the extracted pixel. When all of the pixels G1 to G8 are white, the pixel value thereof is white. However, if it includes some of white and some of black, the pixel value is set to halftone.

Next, the voltage Vprc=4.5 V is applied to an end of each capacitor C3 and the initial charge is accumulated therein (step S7), and the image is captured at a third time (step S8). In this case, there is a possibility that pixels that are slightly more whitish than those at the second time are determined as black.

FIG. 9C shows a captured image obtained at steps S7 to S9. Since an image slightly more whitish than that of FIG. 9B is determined as black, an image more blackish in its entirety than that of FIG. 9B is obtained.

On the completion of the image capture at the third time, each pixel which is determined as white at the second time and determined as black at the third time is extracted, the average value of the first pixel values of the eight pixels around the extracted pixel is calculated and set as the pixel value of the extracted pixel (step S9).

Next, the voltage Vprc=5 V is applied to an end of each capacitor C3 and the initial charge is accumulated therein (step S10), and the image is captured at a fourth time (step S11). In this case, there is a possibility that a pixel that is slightly more whitish than that at the third time is also determined as black.

FIG. 9D shows a captured image obtained at steps S10 to S12. Since an image slightly more whitish than that of FIG. 9C is determined as black, an image more blackish in its entirety than that of FIG. 9C is obtained.

On the completion of the image capture at the fourth time, each pixel which is determined as white at the third time and determined as black at fourth time is extracted, and the average value of the first time pixel values of the eight pixels around the extracted pixel is calculated and set as the pixel value of the extracted pixel (step S12).

Figure 11:
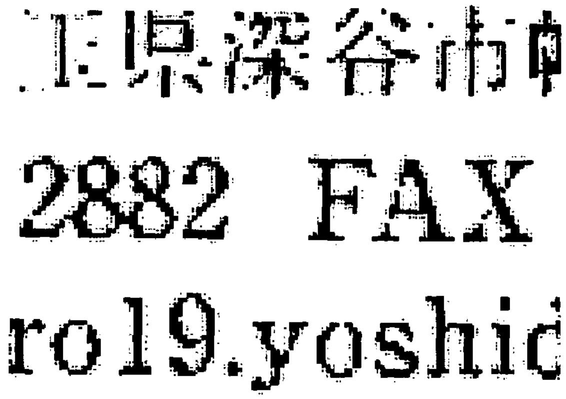
FIG. 11 is a view of an example of an image processed as shown FIG. 8.

The image obtained as a result of the processing executed at step S12 is as shown in FIG. 11, and it can be found that the image can express up to halftone and noise is removed therefrom.

FIG. 12 is a view showing an example of an image including a letter "T", and FIG. 13 is a view showing a result obtained by capturing the image surrounded by a dotted line of FIG. 12. As shown in the figures, when the image is capture at the first time, only the pixel P7 is at "H" (high level). Accordingly, at this time, it is determined that only the pixel P7 is black, and a black pixel value is allocated to the pixel P7.

Next, when the image is captured at a second time, a pixel P9 is newly set to "H". Accordingly, the average value of the previous pixel values (in this case, all the pixel values are a white pixel value) of the eight pixels around the pixel P9 is set as the pixel value of the pixel P9.

Next, when the image is captured at a third time, a pixel P4 is newly set to "H". Accordingly, the average value of the previous pixel values (in this case, all the pixel values are a white pixel value) of the eight pixels around the pixel P4 is set as the pixel value of the pixel P4.

Next, when the image is captured at a fourth time, all the pixels P1 to P15 are set to "H". Accordingly, the pixel values of all the remaining pixels P1 to P3, P5, P6, P8, P9, and P11 to P15 are determined based on the average value of the previous pixel values of the eight pixels around them.

Figure 14:
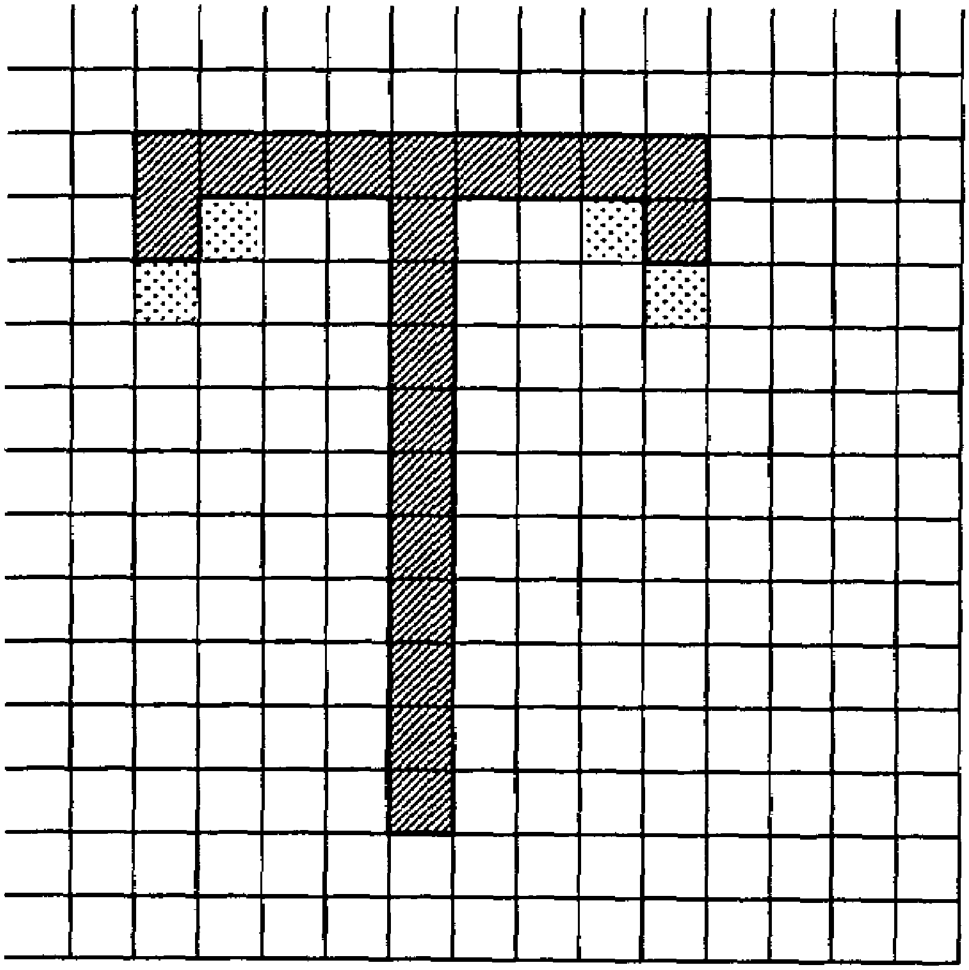
FIG. 14 is a view obtained finally as a result that an image of FIG. 13 is captured.

When all the lines shown in FIG. 12 are subjected to the processing steps shown in FIG. 8 using the above method, an image as shown in FIG. 14 can finally be obtained. As apparent from FIG. 14, noise caused when the image is captured can be removed, and a neutral color can be also expressed. The method of synthesizing a multi-gradation image based on a plurality of binary value images can be variously modified.

Figure 15:
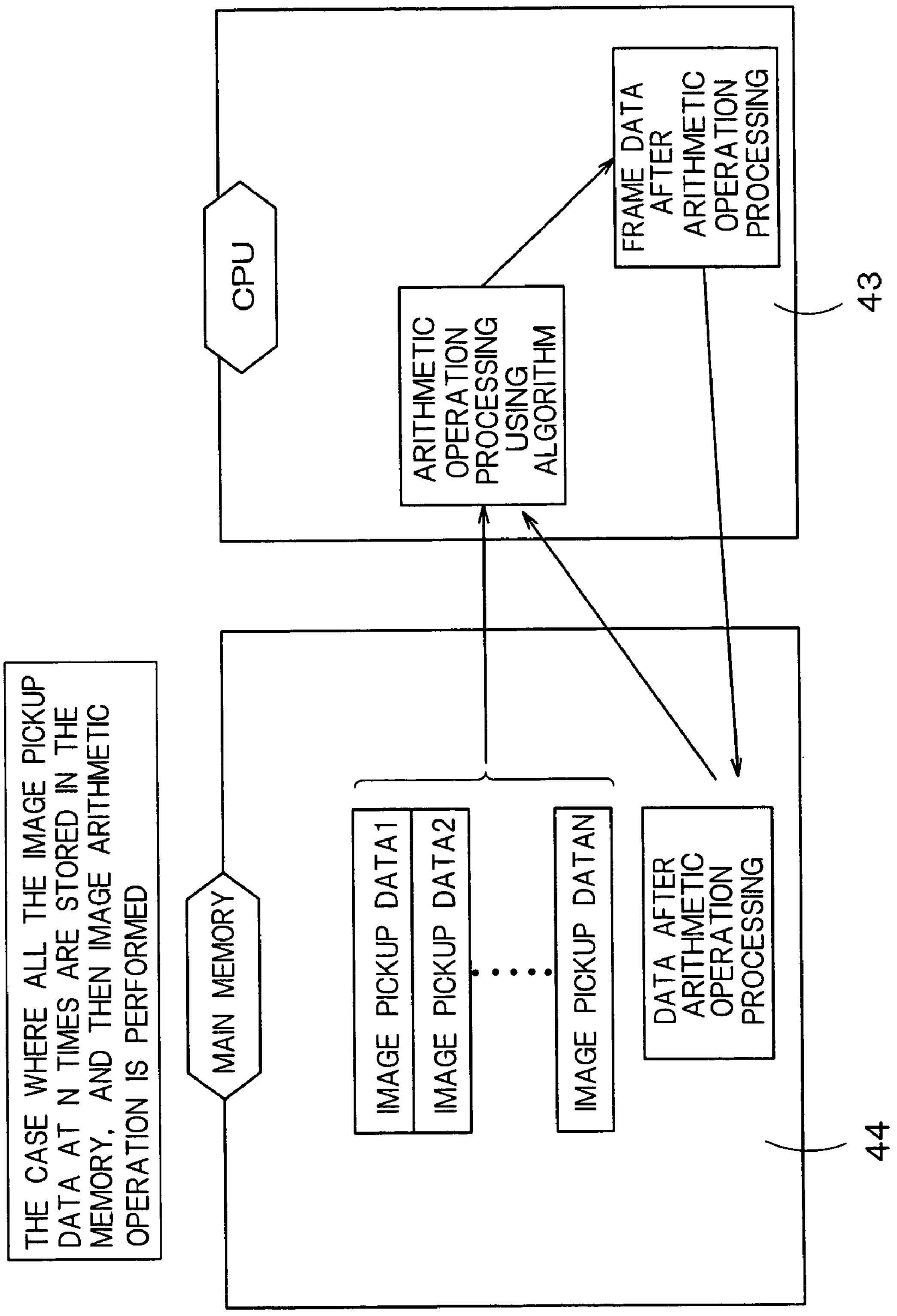
FIG. 15 is a view of an example showing that the results, which are obtained by capturing an image under respective image pickup conditions, are separately stored in a main memory.

As shown in the flowchart of FIG. 8, in this embodiment, an image is captured a plurality of times (an increase in the number of times increases the accuracy when the image is reproduced) by changing image pickup conditions, and a final capture image is determined based on a result of the images captured at the respective times. Therefore, the results of the image captured at the respective times must be stored. When the results of the image captured at the respective times are stored in the main memory 44 as shown in, for example, FIG. 15, a necessary image capacity is increased. When, however, it is intended to apply this method to a small information terminal such a mobile phone in which the reduction of overall size is strongly required, it is preferable to be able to execute arithmetic operation processing possible using limited calculation resources. One example of arithmetic operation resources is a memory, in which data used for the arithmetic operation by the CPU 43 is stored.

Accordingly, in this embodiment, the buffer memory 45 is disposed in the image capture controller 42, a result of the image captured at one time is stored therein, and the result of the captured image is transmitted to the main memory 44. The CPU 43 executes processing for one time using the data stored in the main memory 44 according to the flowchart shown in FIG. 8 and stores a result of the processing in other storing region of the main memory 44. While the above processing is executed, the buffer memory 45 stores a result of the image captured next. The final captured image can be obtained by repeating the same operation thereafter.

In this case, the capacity of the main memory 44 can be reduced because the main memory 44 stores only the result of the image captured at one time as shown in FIG. 16.

As described above, in this embodiment, since the final captured image is determined based on the result of the image being captured a plurality of times by changing the image pickup conditions, the image can be captured without being affected the variation of the characteristics of the sensors 12*a* and 12*b*, the variation of the threshold value voltage of the SRAM, and the like, thereby a captured image capable of reproducing up to halftone without much noise can be obtained.

The example, in which the voltage applied to t0 the capacitors C3 is changed as the plurality of image pickup conditions, has been explained in the embodiment described above. However, a period of time during which the image is captured may be changed in each of the image pickup conditions in place of changing the voltage applied to the capacitors C3. Alternatively, the transmittance of a liquid crystal may be changed. Although FIG. 9 shows a specific example of the variation of the image pickup conditions, other variations may be also employed for the same purpose.

Further, the voltage applied to the capacitors C3 and the period of time during which the image is captured may be simultaneously changed. In this case, the number of the image pickup conditions can be more increased.

Figure 69:
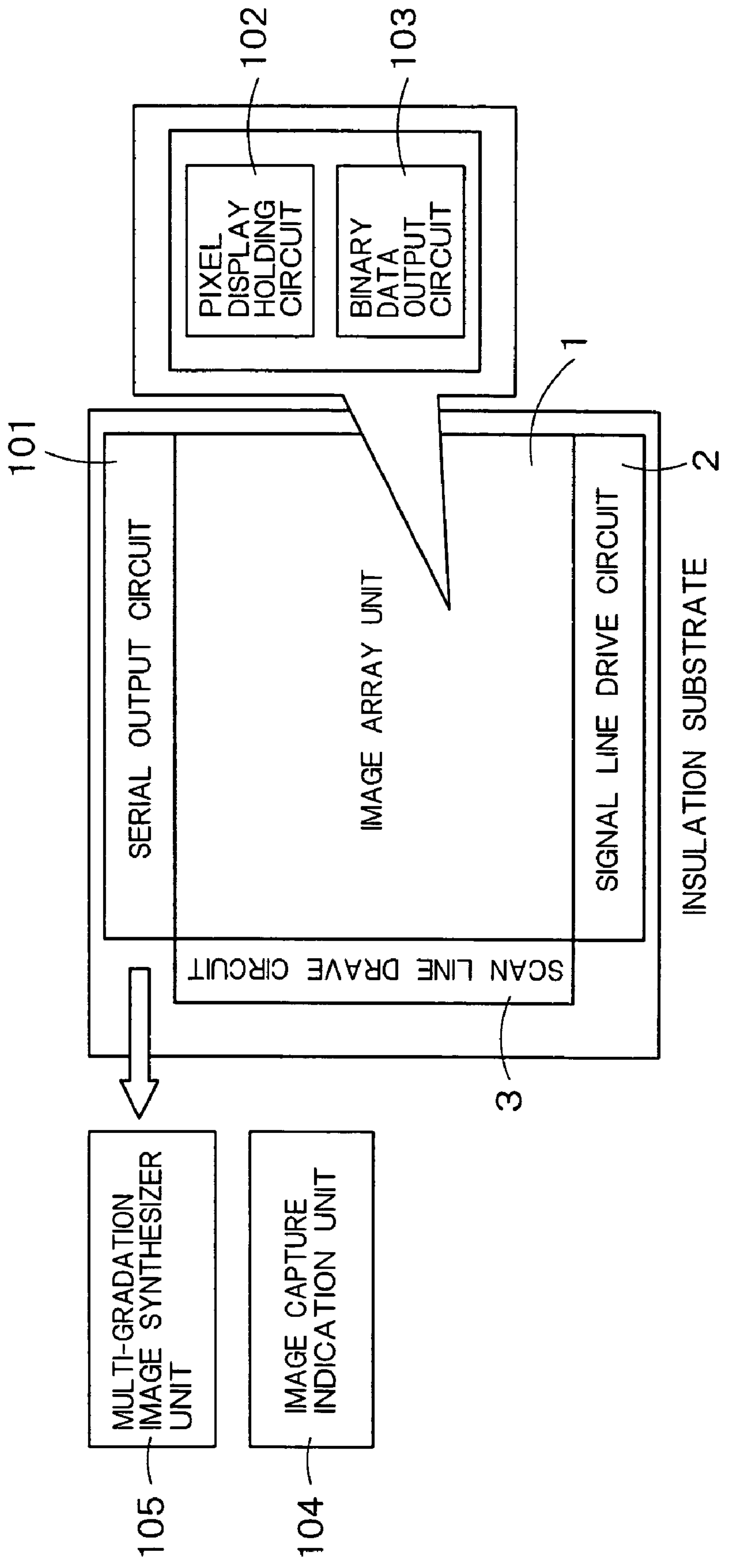
FIG. 69 is a block diagram of a display device composed of extracting characteristic portions of the first embodiment.

FIG. 69 is a block diagram which summarizes characteristic portions of the above-mentioned first embodiment. As shown in FIG. 69, the pixel array unit 1 for converting output of the sensor for each pixel, the signal line drive circuit 2, the scan line drive circuit 3 and a serial output circuit 101 for outputting the binary data outputted from pixels. A pixel display holding circuit 102 and a binary data output circuit 103 are provided for each pixel of the pixel array unit 1. An image capture indication unit 104 for indicating image capture at a plurality of conditions, and a multi-gradation image synthesizer unit 105 for synthesizing multi-gradation image based on a plurality of binary image are provided in outside logic IC of the insulation substrate.

With the above arrangement, it is possible to read a good multi-gradation image even if the in-plane variations of the sensor outputs and the characteristics of the TFTs are relatively large.

It should be noted that if the circuit for holding the display of the pixels is not used, a displayed luminance is abnormally changed in the read/output operations of the sensors and the quantity of light irradiated to an image pickup object is abnormally varied, thereby abnormal irregularities appear in a finally obtained multi-gradation image. Note that since binalization is also effective to the amplification of signal, the signals of the pixels can be reliably transmitted to the outside frame portion even in a device such as the display device having a large screen area and a large wiring driving load.

Further, it is effective to add an ordinary image processing unit to remove irregular portions from the multi-gradation image.

(Second Embodiment)

Figure 17A:
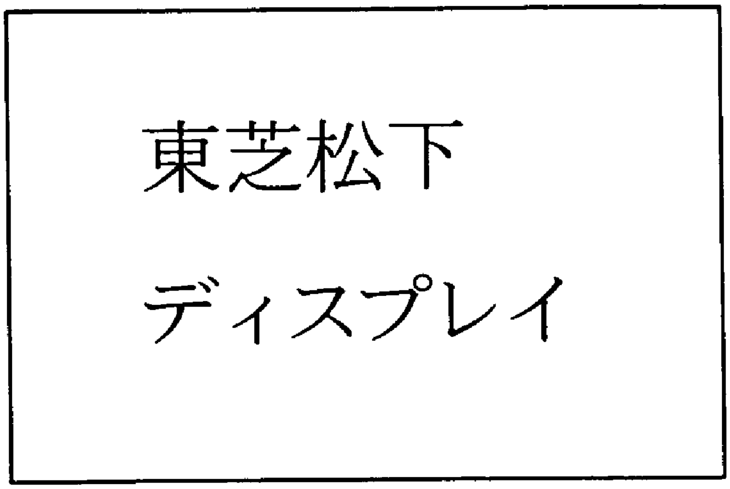
FIG. 17A is a view showing an example of an image pickup object.
Figure 17B:
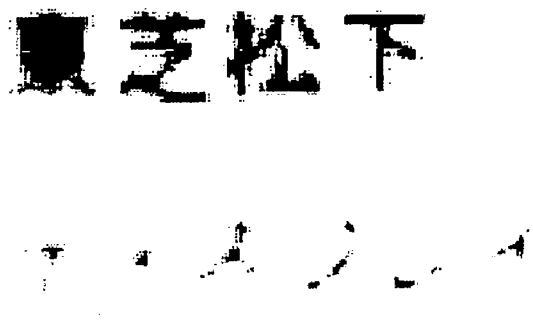
FIG. 17B is a view showing a picked-up result.

An image pickup object does not always have a uniform tint and has a different black density depending on locations. When, for example, letters "Toshiba Matsusita Display" shown in FIG. 17A is picked up with sensors, a picked-up result shown in FIG. 17B is obtained. As shown in the figure, since the first letter has a black density higher than that of the other letters, it appears very blackish in its entirety and becomes imperceptible. Inversely, since the ninth and the tenth letters have a low black density, the line of these letters almost disappear.

A reason why a letter having a high black density is made entirely black and becomes imperceptible resides in that the light, which is multi-reflected by a white sheet, a glass substrate boundary, and the like around the letter, is unlike to be incident on the letter. Inversely, a reason why a letter having a low black density almost disappears resides in that the multi-reflected light is excessively incident on the letter and makes the width of the black line of the letter thin.

In view of the above problems, a second embodiment of the present invention is characterized in that an image is captured taking the partial variation of a black density of an image pickup object into consideration. At this time, the variation of the characteristics of sensors is compensated by adjusting the luminance of respective pixels by positively making use of a sensor array arranged integrally with a display device different from a simple sensor array.

Figure 18:
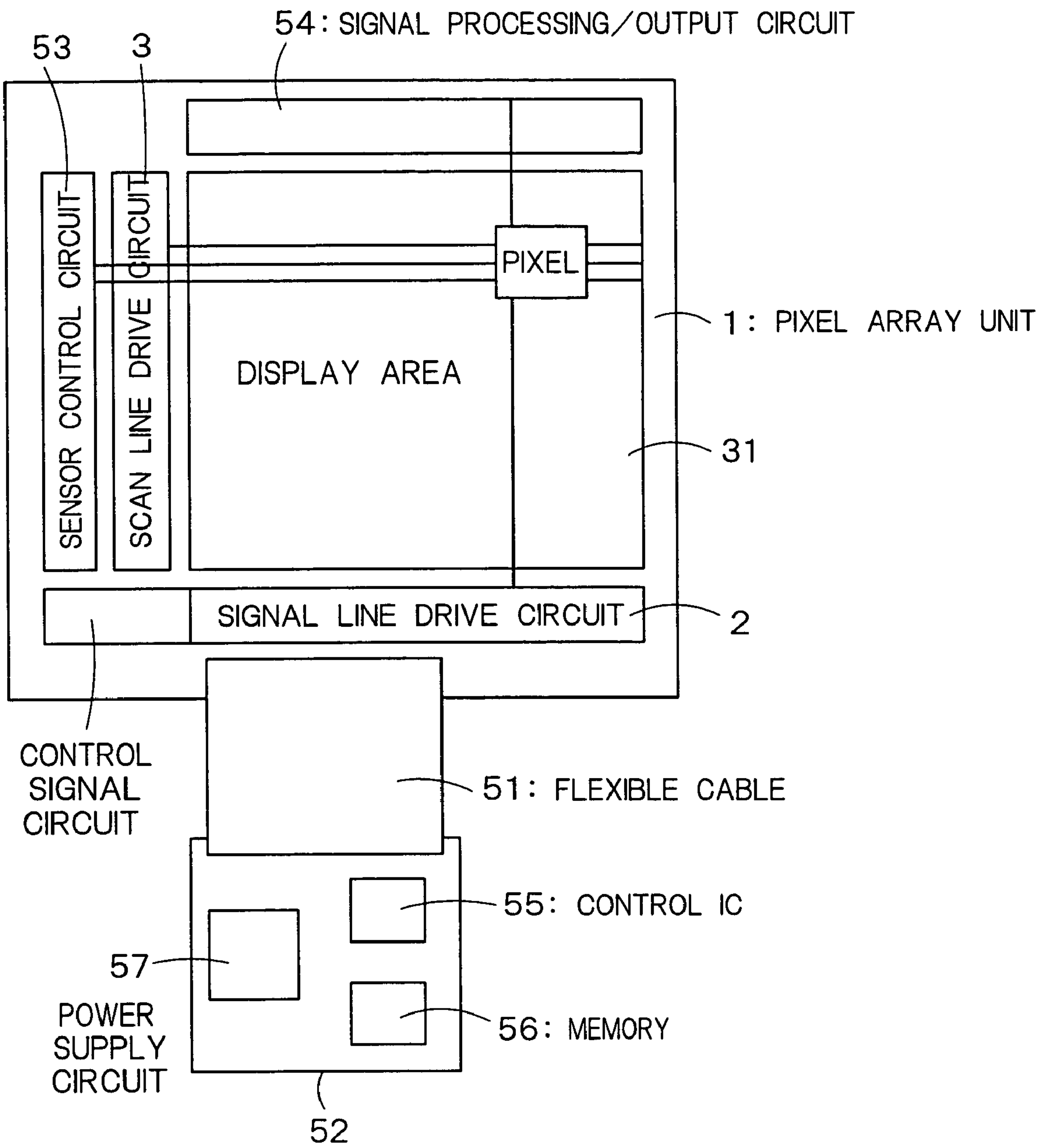
FIG. 18 is a block diagram showing an overall arrangement of a second embodiment of the display device according to the present invention.

FIG. 18 is a block diagram showing an overall arrangement of the second embodiment of the display device according to the present invention. The display device shown in FIG. 18 includes a glass substrate 31 on which a pixel array unit 1 and a part of drive circuits are formed, and a control circuit substrate 52 connected to the glass substrate 31 through a flexible cable (FPC) 51.

Formed on the glass substrate 31 are the pixel array unit 1, on which pixel TFTs 11 and image reading sensors 12 are disposed, a signal line drive circuit 2 for driving signal lines, a scan line drive circuit 3 for driving scan lines, a sensor control circuit 53 for controlling the sensors 12, and a signal processing/output circuit 54 for outputting a picked-up result of the sensors 12*a*. The respective circuits on the glass substrate 31 are formed of, for example, a polysilicon TFT.

Mounted on the control circuit substrate 52 are a control IC 55 for controlling the respective circuits on the glass substrate 31, a memory 56 for storing image data and the like, and a power supply circuit 57 for outputting various dc voltages used by the glass substrate 31 and the control circuit substrate 52. Note that a CPU may be provided separately from the control IC 55, the memory 56 and the power supply circuit 57 may be arranged integrally with the control IC 55, and discrete components may be mounted on the control circuit substrate 52.

Figure 19:
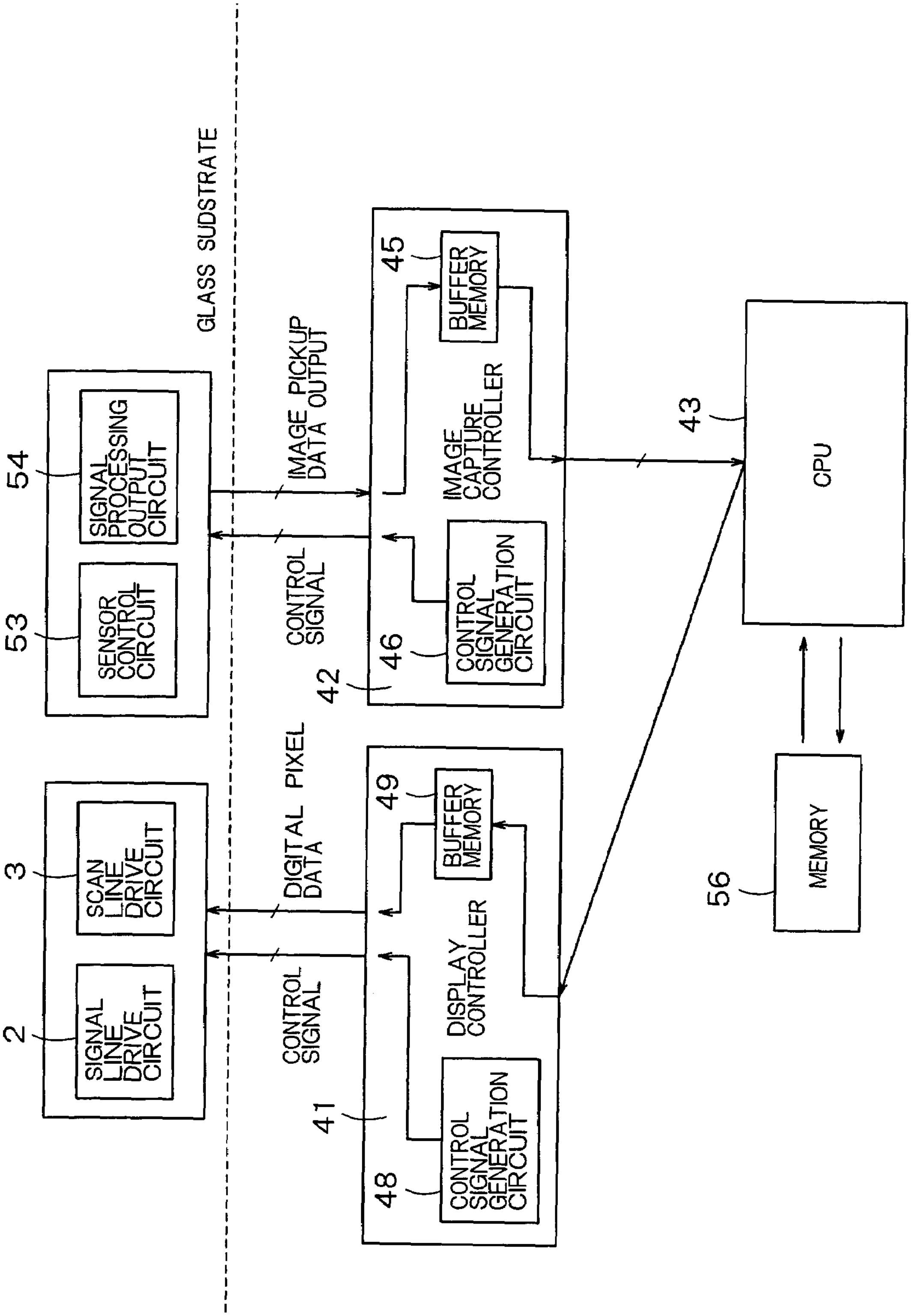
FIG. 19 is a block diagram showing the connecting relationship of a signal line drive circuit, a scan line drive circuit, a sensor control circuit, and a signal processing/output circuit each disposed on a glass substrate to a control IC, and a memory each disposed on a control circuit substrate.

FIG. 19 is a block diagram showing connections between the signal line drive circuit 2, the scan line drive circuit 3, the sensor control circuit 53, and the signal processing/output circuit 54 on the glass substrate 31 and the control IC 55 and the memory 56 on the control circuit substrate 52.

As shown in the figure, a display controller 41, an image capture controller 42 and a CPU are contained in the control IC 55. The display controller 41 transmits digital image data and control signals such as a synchronous signal, a clock signal and the like to the signal line drive circuit 2 and the scan line drive circuit 3. The image capture controller 42 transmits a control signal to the sensor control circuit 53 and the signal processing/output circuit 54, receives image pickup data from the signal processing/output circuit 54 and receives therefrom a synchronous signal for indicating the location of the image pickup data as necessary. A buffer memory 47 and a control signal generation circuit 48 are disposed in the display controller 41, and a buffer memory 45 and a control signal generation circuit 46 are also disposed in the image capture controller 42.

Figure 20:
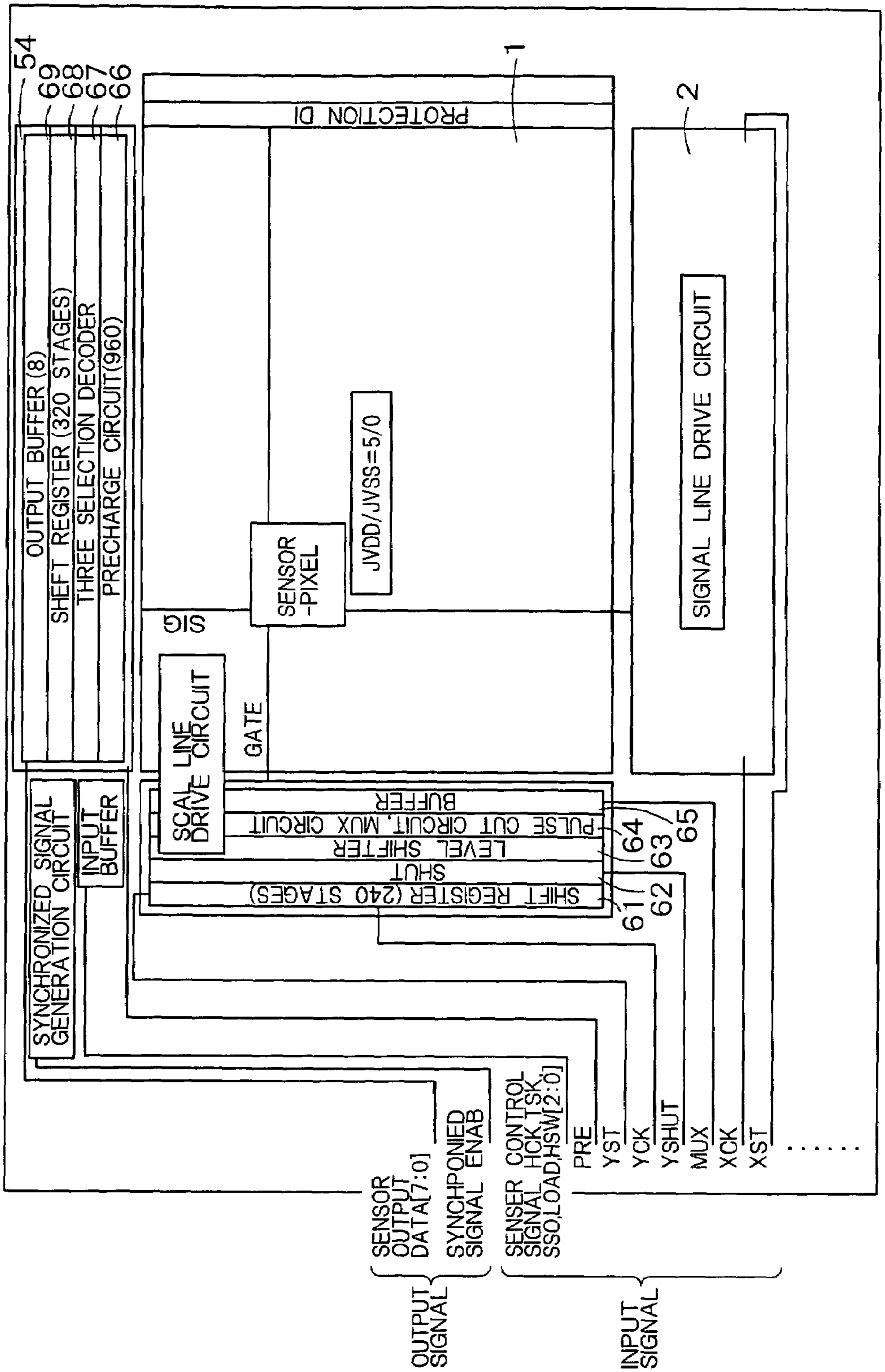
FIG. 20 is a block diagram showing an example of a detailed arrangement of a glass substrate 31.

FIG. 20 is a block diagram showing a detailed arrangement of the glass substrate 31. The pixel array unit 1 of this embodiment has display resolution of 320 pixels in a horizontal direction and 240 pixels in a vertical direction. Each of the pixels is divided into a red section, a blue section, and a green section in the horizontal direction, and a signal line is connected to each section. The total number of the signal lines is 320×3=960, and the total number of scan lines is 240.

The scan line drive circuit 3 has 240-stage shift resisters 61, malfunction prevention circuits (SHUT) 62, level shifters 63, multiplexers (MUX circuits) 64, and buffers 65.

The signal processing/output circuit 54 includes 960 precharge circuits 66, 3-selection decoders 67, 320-stage shift resisters 68, and eight output buffers 69.

Figure 21:
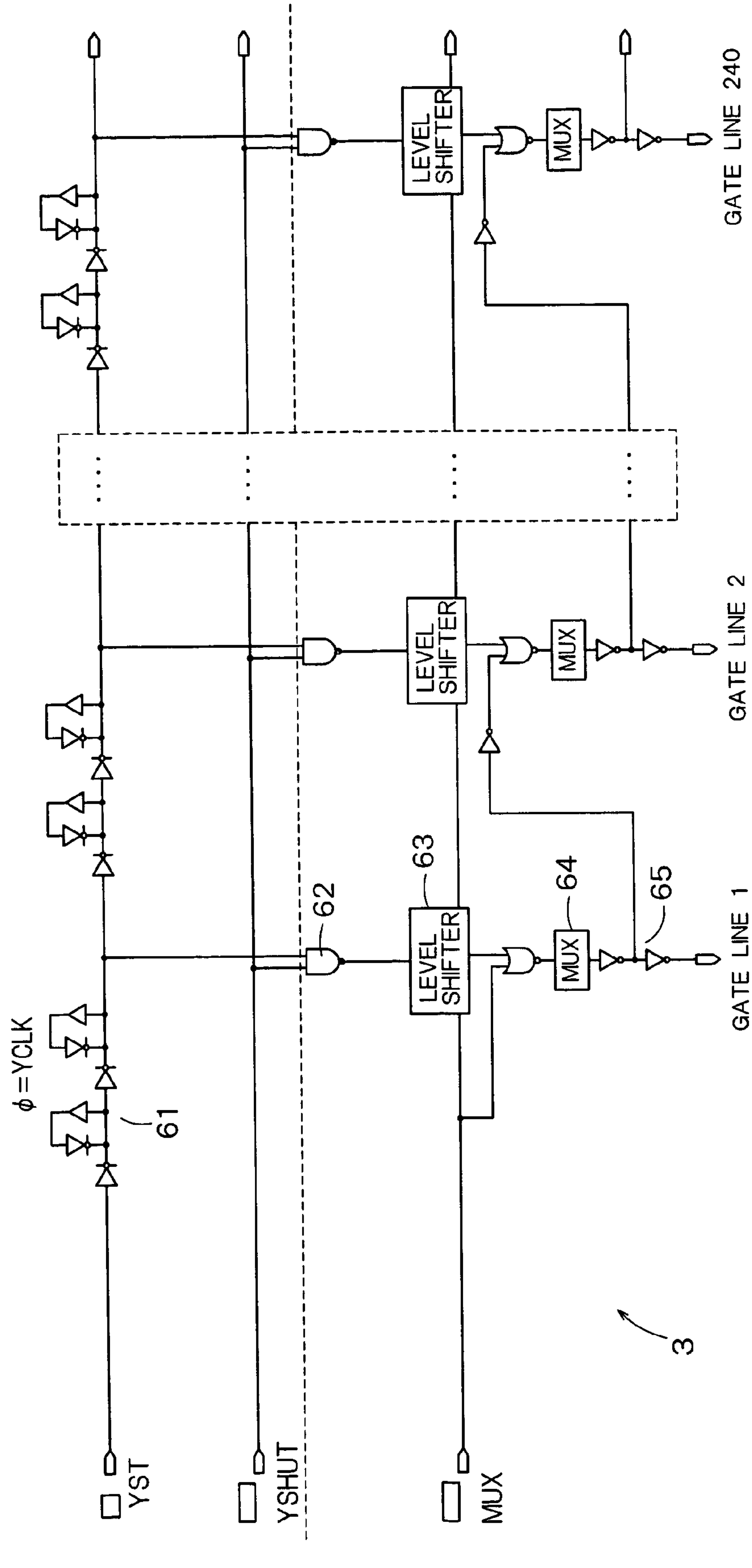
FIG. 21 is a circuit diagram showing an example of a detailed arrangement of a scan line drive circuit 3.

FIG. 21 is a circuit diagram showing a detailed arrangement of the scan line drive circuit 3. A characteristic arrangement in FIG. 21 resides in that each multiplexer 64 is disposed at the latter stage of each corresponding level shifter 63. Each multiplexer 64 is switched so as to turn on corresponding scan lines one by one or to turn on all the corresponding scan lines simultaneously. A reason why all the corresponding scan lines are turned on simultaneously is to accumulate an initial charge to the capacitor C3 for storing a result picked-up by the sensors 12.

The provision of the multiplexers 64 makes dedicated TFTs, which switch whether or not the initial charge is accumulated in the capacitors C3, unnecessary, thereby a circuit can be made small in size.

FIG. 22 is a block diagram showing a detailed arrangement of the signal processing/output circuit 54. The signal processing/output circuit 54 shown in FIG. 22 includes a synchronous signal generation circuit 71 for outputting a synchronous signal, eight P/S conversion circuits 72 for converting image pickup data supplied from the 120 signal lines into single serial data, output buffers 73 for buffering the serial data output from the respective P/S conversion circuits 72, and a counter 74 for detecting the average gradation of the image pickup data. The term "average gradation" used here means the gradation of output data averaged over a plurality of pixels. When it is intended to finally form an image having 256 gradations on the assumption that 5 pixels of 10 pixels are white data and the remaining 5 pixels are black data, the average gradation is 256 [gradations]×5 [pixels]/10 [pixels]=128 [gradations].

FIG. 23 is a block diagram showing a detailed arrangement of the synchronous signal generation circuit 71. The synchronous signal generation circuit 71 shown in FIG. 23 includes a NAND gate 75 and a D type flipflop 76 controlled by a clock, and each output buffer 73 is connected to the latter stage of corresponding D type flipflops 76. When the synchronous signal generation circuit 71 is arranged as a circuit composed of a NAND gate and the like formed on an insulation substrate, the phase of a synchronous signal generated thereby is greatly varied with respect to output data due to the variation of the characteristics of TFTs, and the synchronous signal may not fulfill a role as the synchronous signal. Accordingly, it is preferable to reduce a phase difference to a clock on the insulation substrate by forming the D type flipflop controlled by the clock on the insulation substrate.

FIG. 24 is a block diagram showing a detailed arrangement of each P/S conversion circuits 72. Each P/S conversion circuit 72 shown in FIG. 24 includes one-input/three-output decoders 77, latches 78 and 40-stage shift resisters 79. Each decoder 77 is arranged by a circuit as shown in FIG. 25. Each latch 78 is arranged by a circuit as shown in FIG. 26. A clock used to control the shift resisters 61 is commonly used to control the D type flipflops shown in FIG. 23, thereby the phase difference between the data and the synchronous signal can be reduced.

FIG. 27 is a block diagram showing a detailed arrangement of each output buffer 73. Each output buffer 73 is composed by a plurality of buffers (inverters) 80 connecting in series. A drive force necessary to an external load (the flexible cable (FPC) 51 and the like) is secured by increasing the channel width of a TFT constituting each inverter as each buffer is located at a more latter stage.

FIG. 28 is a detailed circuit diagram of one pixel of the pixel array unit 1, and FIG. 29 is a layout view of one pixel on the glass substrate 31. As shown in FIG. 28, one pixel is composed of three sub-pixels 81*r*, 81*g*, 81*b*, and each sub-pixel includes the pixel TFT 11, a display control TFT 82 for controlling whether or not a charge is accumulated in an auxiliary capacitor Cs, the sensor 12, the capacitor C3 for storing a picked-up result of the sensor 12, an SRAM 83 for storing binary data according to the charge accumulated in the capacitor C3, an initialization TFT 84 for accumulating the initial charge in the capacitor C3, and a data holding TFT 85 for holding the data of the SRAM 83. The gradation of the luminance of each pixel is controlled by the difference between the voltage of a pixel electrode determined based on the charge accumulated in the auxiliary capacitor Cs and the voltage of a common electrode formed on a confronting substrate.

When the capacitor C3 is initialized, the pixel TFT 11 and the initialization TFT 84 are turned on. When an analog voltage (analog pixel data) for setting the luminance of the display pixels is written to the auxiliary capacitor Cs, the pixel TFTs 11 and the display control TFT 82 are turned on. When the data of the SRAM 83 is held (refreshed), the initialization TFT 84 and the data holding TFT 85 are turned on. When the image pickup data stored in the SRAM 83 is supplied to the signal lines, the pixel TFT 11 and the data holding TFT 85 are turned on.

Figure 30:
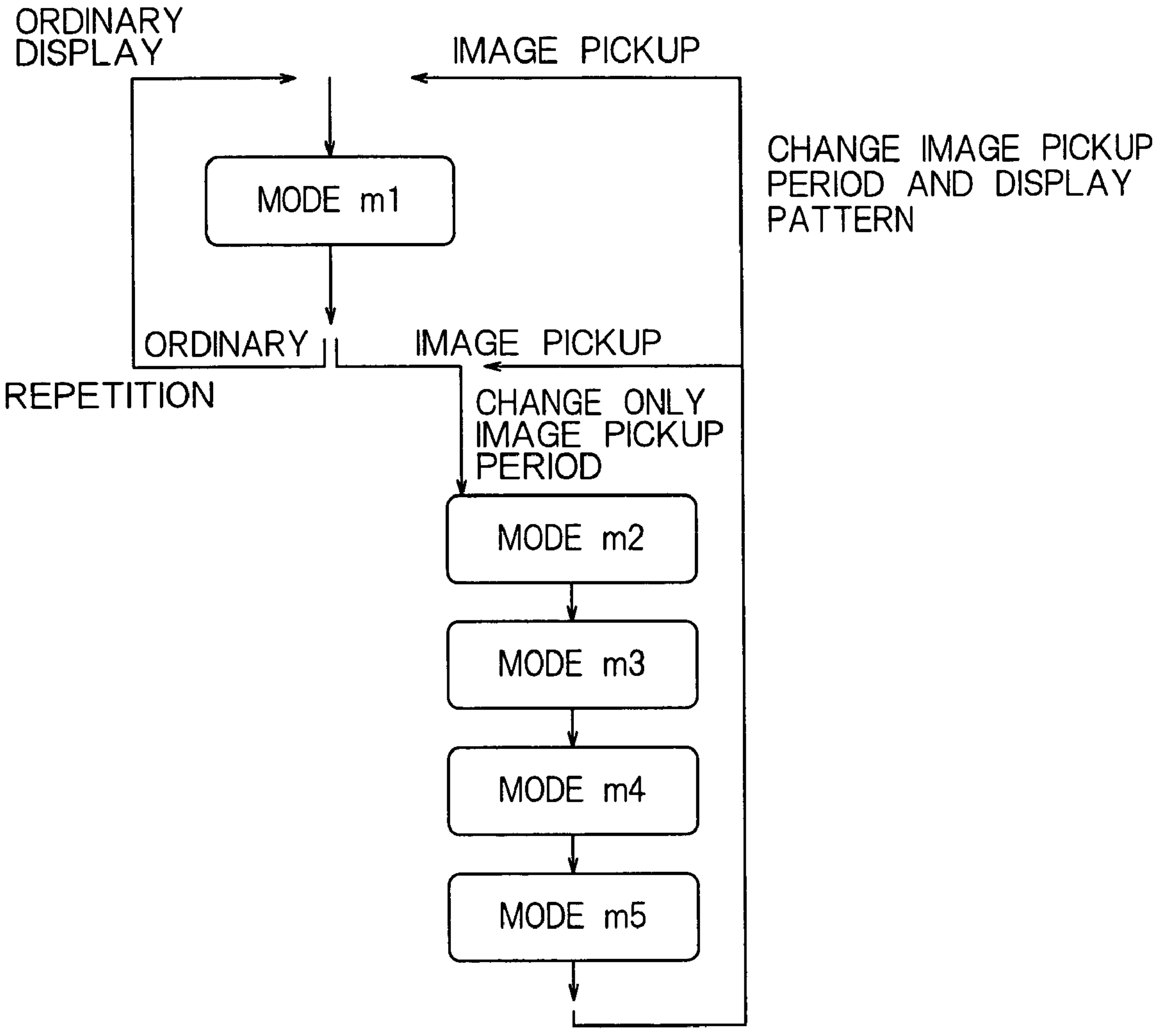
FIG. 30 is a view explaining an operation of the display device of the embodiment.

FIG. 30 is a view explaining an operation of the display device of the embodiment. In an ordinary display, an operation is executed in a mode m1. In contrast, when an image is captured by the sensors 12, first, an operation is executed in the mode m1 to thereby set the luminance of all the pixels to a predetermined value. Next, the capacitors C3 of all the pixels are precharged (accumulation of the initial charge) in a mode m2. Next, an image of a red component for one picture is captured in a mode m3. Next, an image of a green component for the one picture is captured in a mode m3. Next, an image of a green component for the one picture is captured in a mode m4. Finally, an image of a blue component for the one picture is captured in a mode m5.

Figure 31:
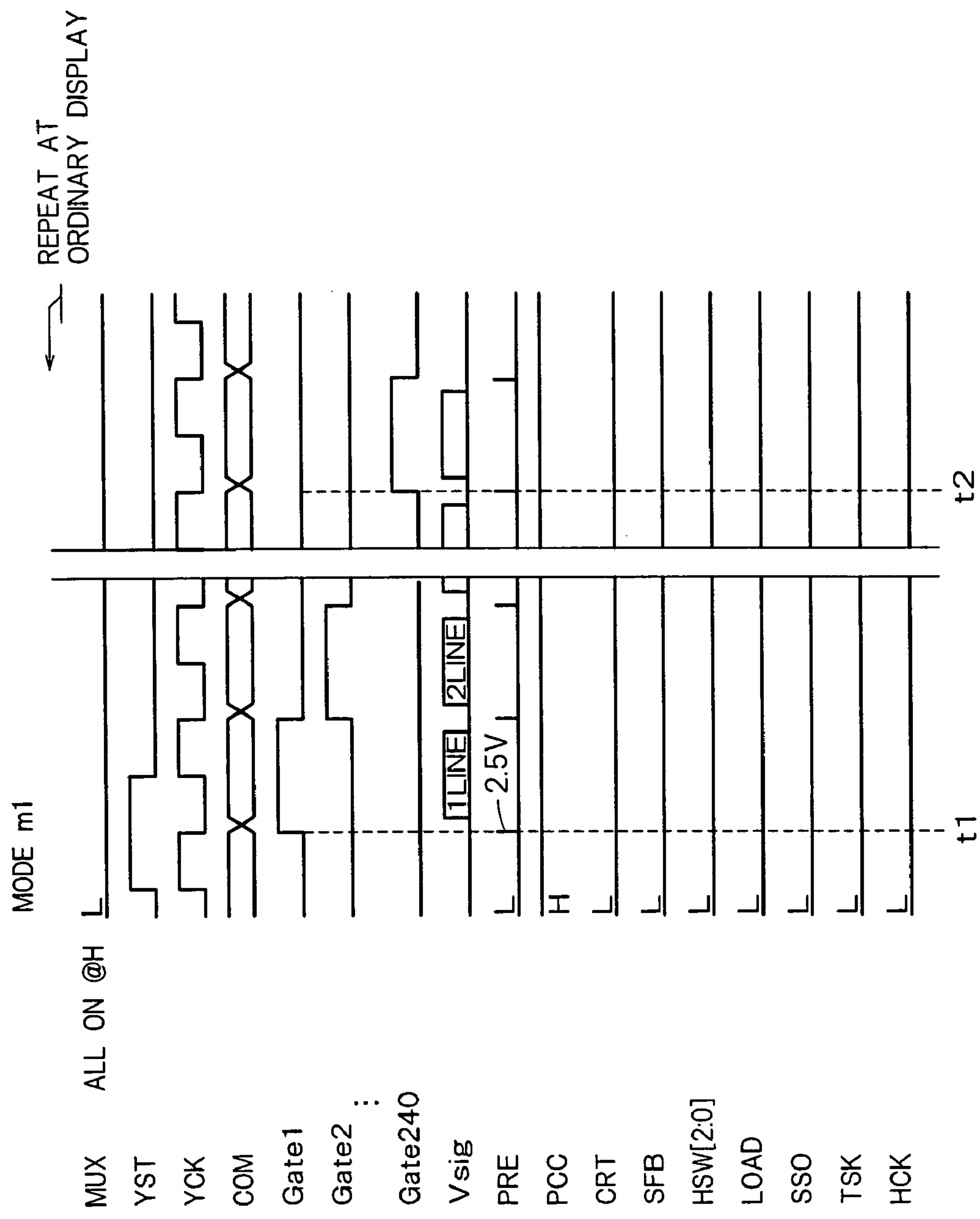
FIG. 31 is an operation timing chart of a mode m1.
Figure 32:
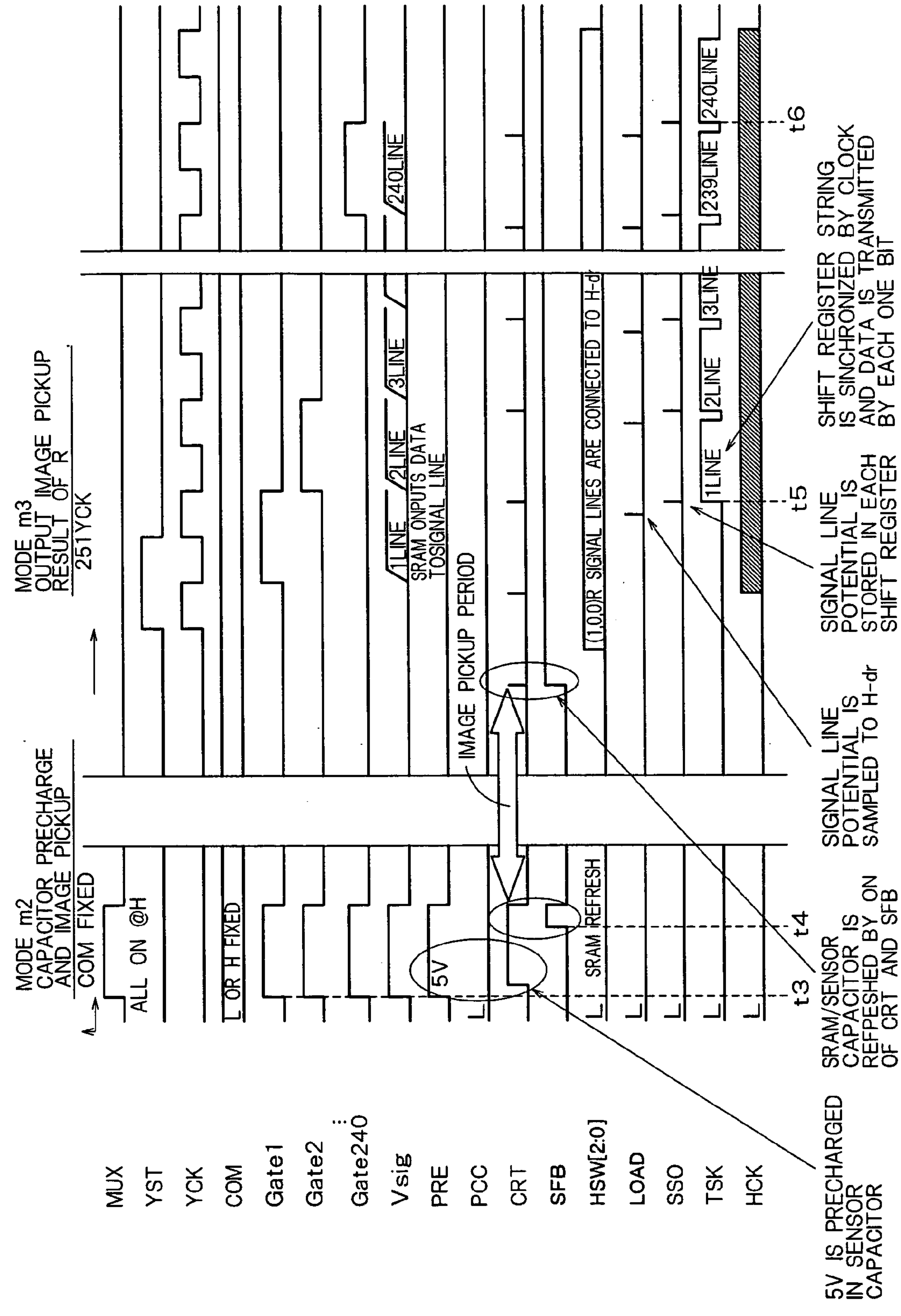
FIG. 32 is an operation timing chart of modes m2 and m3.
Figure 33:
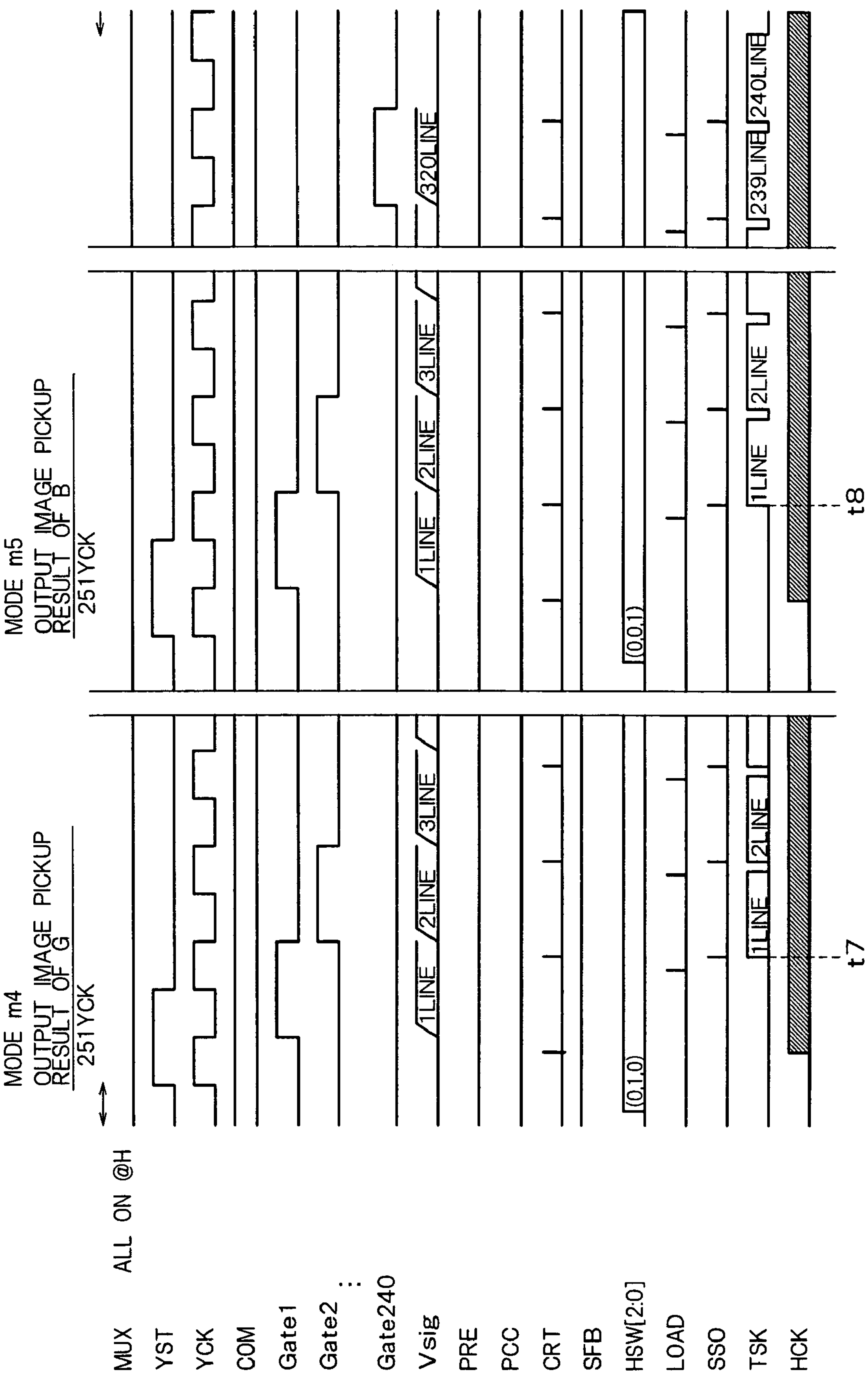
FIG. 33 is an operation timing chart of modes m4 and m5.

FIGS. 31 to 33 show operation timing charts in the modes m1 to m5. The operation timing in the modes m1 to m5 will be sequentially explained below using the figures.

In the mode m1, the scan line drive circuit 3 sequentially drives the scan lines as shown at times t1 to t2 of FIG. 31, and the signal line drive circuit 2 supplies analog pixel data to the signal line of each horizontal line in accordance with the timing at which the signal line is driven and displays pixels. The analog pixel data is obtained by converting the digital pixel data outputted from the control IC 55 by a known D/A conversion circuit. The D/A conversion circuit is composed of a signal line drive circuit formed by depositing a thin film on the glass substrate by a known art (refer to Japanese Unexamined Patent Application Publication No. 2000-305535).

In the mode m2, the scan line drive circuit 3 drives all the scanning signals at the same timing as shown at a time t3 of FIG. 32. A precharge voltage (5 V) is accumulated in the sensor capacitors C3 of all the pixels. At a time t4, both the initialization TFT 84 and the data holding TFT 85 are turned on, and the SRAM 83 executes a refresh operation. Even if the sensor capacitors C3 have not been precharged during the period from the time t3 to the t4, the precharge voltages of all the capacitors C3 are matched to the power supply voltage (5 V) of the SRAM by the refresh operation of the SRAM 83.

In the mode m3, the image pickup data of the red component is supplied to the signal line of each horizontal line as shown at a time t5 to a time t6 of FIG. 32. The image pickup data of the red component supplied to the respective signal lines is converted into serial data by the P/S conversion circuits 72 shown in FIG. 22 and outputted to the outside through eight data lines.

In the mode m4, green image pickup data is supplied to the signal line of each horizontal line as shown at a time t7 of FIG. 33. In the mode m5, blue image pickup data is supplied to the signal line of each horizontal line as shown at a time t8 of FIG. 33.

The control IC 55 of FIG. 18 divides a display region of 320×240 pixels into blocks (8 blocks in horizontal direction×8 blocks in horizontal direction) each composed of 40 pixels×30 pixels. Then, the sensors 12 executed picking up in a state in which a display luminance is individually set to each of the blocks. This is one of features of the present invention. Different from a conventional CMOS image sensor, it is possible to compensate the in-plane variation of the characteristics of the sensors and the TFTs and to improve the quality a picked-up picture (securement of uniformity and the like) by not only simply forming a sensor but also by positively making use of a luminance control means of each pixel in image pickup.

FIG. 35 is a flowchart showing an example of a processing operation executed by the control IC 55 of FIG. 18. First, image pickup is executed a plurality of times by changing a picking up period of time while displaying the pixels of the respective blocks so that the respective blocks are set to a predetermined reference luminance (for example, 80% of maximum luminance) (step S21). The image pickup (trial pickup) is executed, for example, 9 times here while changing the picking up period of time from 10 msec to 50 msec in a unit of 5 msec.

Next, a image pickup period of time t (m, n) is determined for each block so that the average gradation of each block is set to approximately a medium value (the value of 128 gradations when 256 gradations are employed) based on a result of the trial picking up (using a graph of image pickup period of time versus average gradation) (step S22). The image pickup period of time t (m, n) is variously changed by the variation of the leak current of the sensors, the variation of the characteristics of the TFTs, the light reflecting characteristics of an image pickup object, the color of the image pickup object, the distribution of density of the line segments of a figure and a letter, and the like.

Figure 36:
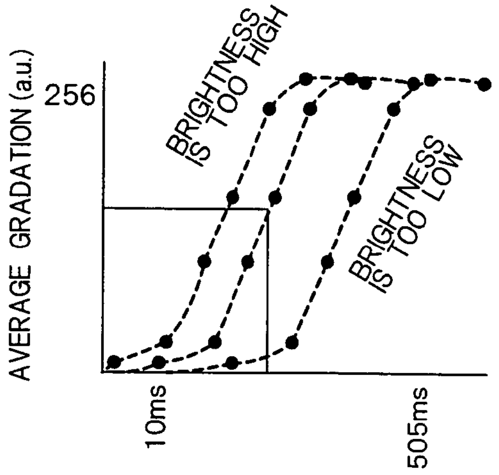
FIG. 36 is a view showing the relationship between a picking up period of time and an average gradation.

Since the average gradation is greatly changed by changing the picking up period of time as shown in FIG. 36, an optimum picking up period of time is determined for each block at step S22 described above.

The average gradation of each block is detected based on a result of count of the number of "0" (low level) or "1" (high level) included in the serial data showing the picked-up result.

Next, it is determined whether the thus determined picking up period of time t (m, n) of each block is less than a reference period of time (for example, 30 msec) (step S23). The display luminance Y of the blocks, in which the picking up period of time is shorter than the reference period of time, is set lower than the reference luminance (for example, 80% of the maximum luminance) (step S24), and the display luminance Y of the blocks, in which the picking up period of time is equal to or longer than the reference period of time, are set higher than the reference luminance (step S25). That is, the variation of an optimum picking up period of time is compensated by the luminance of the display pixels (quantity of light irradiated to the image pickup object). This compensating method cannot be developed from the art of a conventional CMOS image sensor. Note that it is not practical to change the picking up period of time of each block because a control is made complex.

More specifically, the display luminance Y of each block is set based on, for example, the following expression (1).

$$Y(m,\ n)=80\%\cdot t(m,\ n)/30 \qquad (1)$$

where, m shows a row and n shows a column

When a result of calculation of the expression (1) exceeds 100%, Y (m, n) is set to 100%. It should be noted that the expression (1) is only an example and must be modified according to the characteristics of the display pixels, the characteristics of the sensors, and the characteristics of the image pickup object. In short, any expression may be employed as long as it guarantees the variation of the optimum picking up period of time in plane by the display luminance.

Next, 81 pictures are picked-up by setting the picking up period of time from 10 msec to 50 msec while increasing it by, for example, 0.5 msec stepwise (step S26, final picking up).

Figure 37:
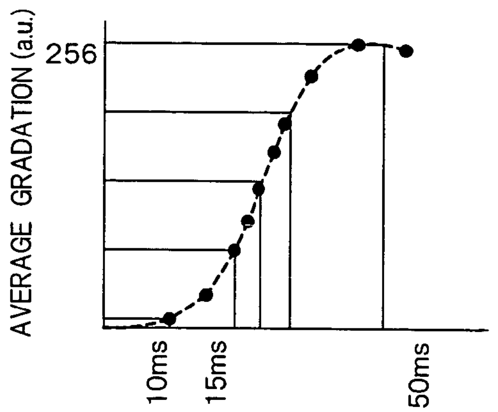
FIG. 37 is a view showing an example of image pickup data obtained at step S7.
Figure 38:
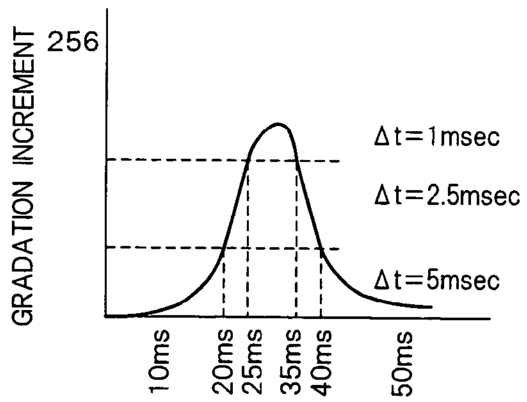
FIG. 38 is a view explaining an increased average gradation.
Figure 39:
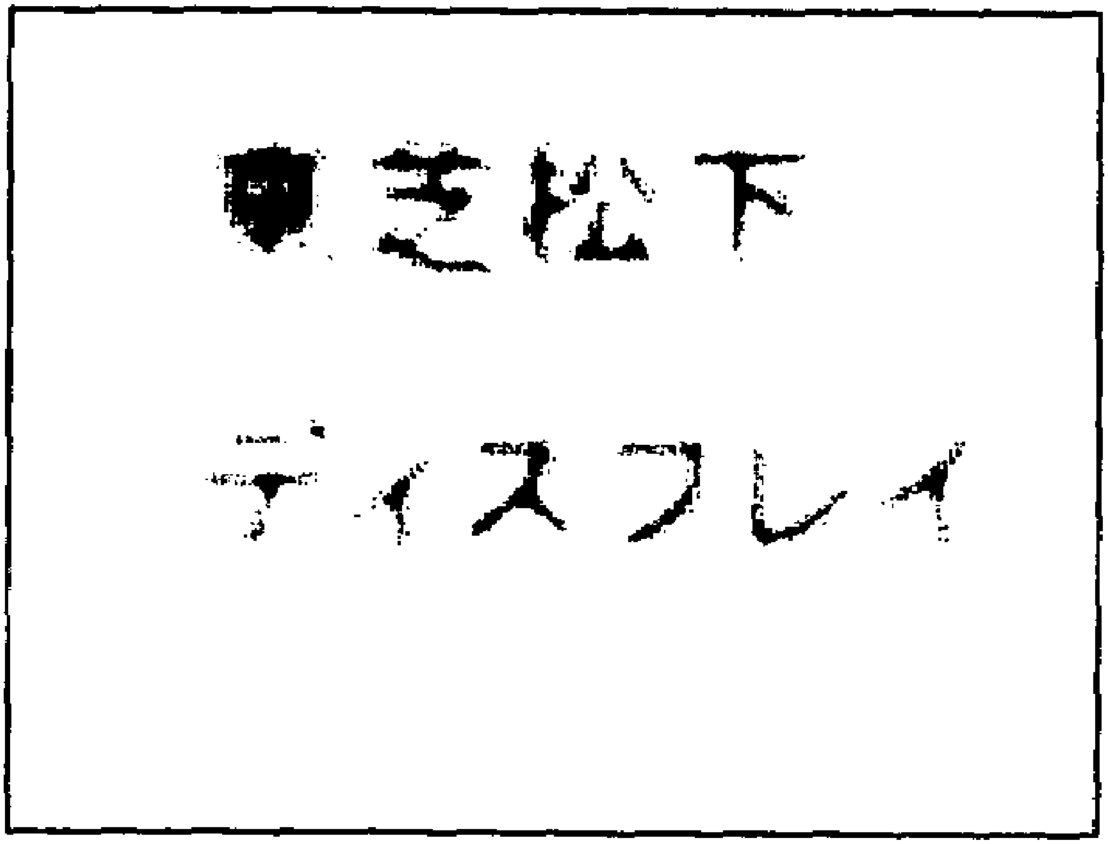
FIG. 39 is a view showing an example of a picked-up result of the embodiment.

Next, a final image pickup data is obtained by calculating the average value of a picked-up result of the 81 pictures (step S27). For example, FIG. 37 shows an example of the image pickup data obtained at step S27. At this time, the average value may be calculated using a picked-up result of pictures obtained at the number of times less than 81 times by assigning a weight by picking up a larger number of pictures in the vicinity of 30 msec as shown in FIGS. 37 and 38, in place of picking up pictures while changing the picking up period of time at the same interval, thereby an overall processing time can be shortened. Alternatively, a weight may be assigned to each picked-up result when the average value is calculated.

Figure 34:
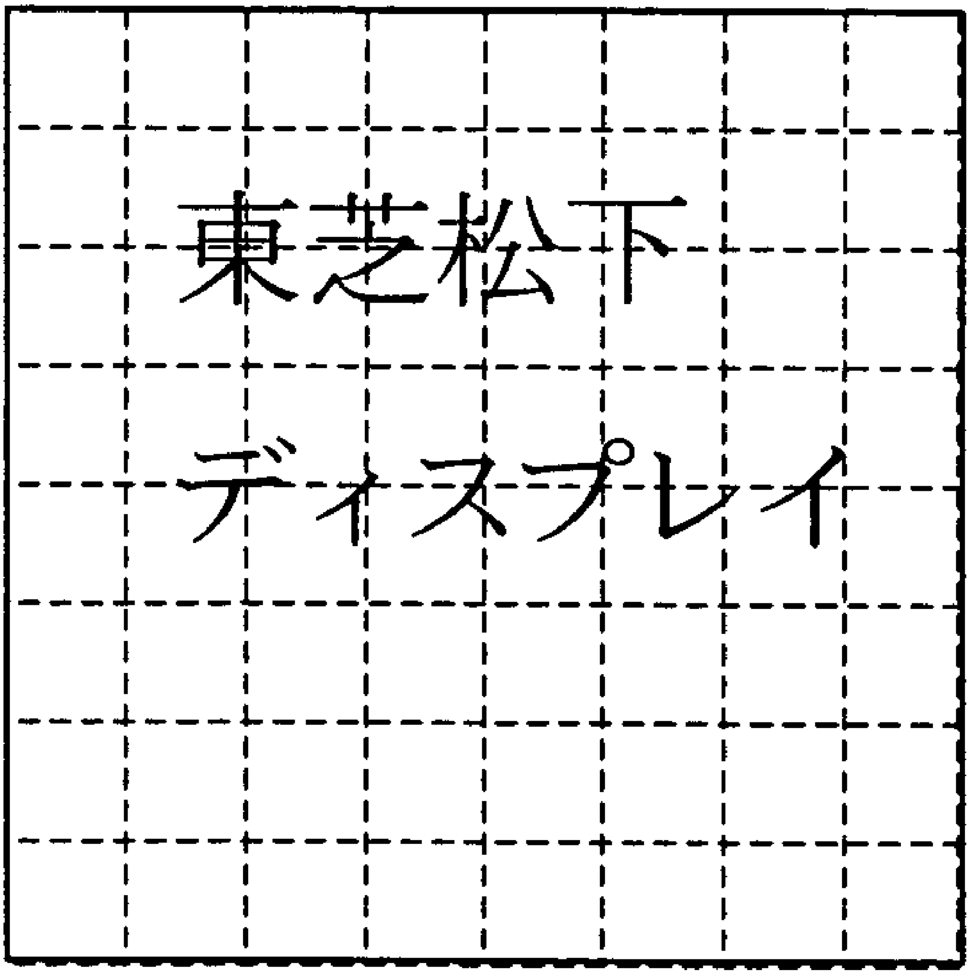
FIG. 34 is a view explaining block division.

When the processing shown in FIG. 35 is executed, even if the black density of the image pickup object is varied as shown in FIG. 34, a good picked-up result without partial portions made entirely black and imperceptible or made faint or faint can be obtained.

As described above, in the second embodiment, after the black density of an image pickup object is previously examined (by the trial picking up), the sensors 12 execute picking up in the state in which a display luminance suitable for each block of the image pickup object is set, thereby a picked-up image having uniform quality without portions made entirely black and imperceptible or made faint or faint can be obtained.

Although this embodiment explains the method of eliminating the portions made entirely black and imperceptible of a picked-up result which is caused by the deviated distribution of the black density of an image pickup object, this method can also achieve the same effect as a means for improving the deteriorated quality of a picked-up result that is caused by the deviation of the leak current of the sensors and the deviated variation of the characteristics of the TFTs.

Further, after the trial picking up is executed, the final picking up may be executed by the following sequence.

(R1) The mode m1 of FIG. 30 is executed, and the liquid crystal is entirely display in red. However, the gradation of each block is changed based on the trial picking up.

(R2) The mode m2 is executed, and all the sensor capacitors are precharged.

(R3) The modes m3, m4, and m5 are executed, and the image pickup data of the pixels belonging to red signal lines, green signal lines, and blue signal lines is also outputted.

(G1) The mode m1 is executed, and the liquid crystal is entirely display in green. However, the gradation of each block is changed based on the trial picking up.

(G2) The mode m2 is executed, and all the sensor capacitors are precharged.

(G3) The modes m3, m4, and m5 are executed, and the image pickup data of the pixels belonging to the red signal lines, the green signal lines, and the blue signal lines is also output.

(B1) The mode m1 is executed, and the liquid crystal is entirely display in blue. However, the gradation of each block is changed based on the trial picking up.

(B2) The mode m2 is executed, and all the sensor capacitors are precharged.

(B3) The modes m3, m4, and m5 are executed, and the image pickup data of the pixels belonging to the red signal lines, the green signal lines, and the blue signal lines is also outputted.

When image pickup is executed making an overall display red, although it may be seemingly presumed that the data of the sensors of the green and blue pixels is nonsense, this is not correct. This data is meaningful particularly when the light emitted from a light source (backlight disposed on the back surface of a liquid crystal layer) is diffused light and irradiated onto a image pickup surface from various angles as well as the sensor array is disposed on the observing surface side of a liquid crystal cell as shown in FIG. 5. The sensors cannot come into intimate contact with the image pickup object and is apart therefrom in an interval of about d (0.2 to 0.7 mm that is the thickness of the glass substrate+the thickness of an optical film such as a polarized sheet and the like) different from a conventional CMOS image sensor. Although it is certain that backlight is emitted only from the red pixels, the light reflected from the image pickup object is appropriately diffused. A range of diffusion is about d, and a pixel pitch is about d or smaller than d. Accordingly, the light based on the image pickup object is also incident on the sensors of the green and blue pixels. A picked-up result, which has a higher resolution in a horizontal direction, can be obtained by executing the processing steps in (R1) to (R3) described above. Since the processes for averaging gradations by repeating image pickup a plurality of times while changing the picking up period of time is the same as those of the embodiment described above in detail, the description thereof is omitted.

When attention is paid to that it is adequate only to find the average gradations of the respective blocks in the trial image pickup, a result of calculation of the average gradations of the respective blocks obtained by the counter may be output. This arrangement can save power consumption for driving the external load by interrupting eight data output circuits.

Further, in this embodiment, although the SRAM disposed in each pixel (1) amplifies the weak current of the sensor and (2) holds data until it is output after the completion of image pickup, the device used here is not limited to the SRAM. That is, the current (1) may be amplified by a source follower. When the data cannot be held until it is output after the completion of image pickup due to a leak and the like, a control circuit and a sequence for outputting the data just after the completion of image pickup may be prepared. It is an important point that a mean for outputting binary data is provided.

The example in which the display screen is partitioned and the display luminance of each block is adjusted in picking up has been explained. However, this example may be applied without partitioning the screen (number of division=1) when a display device has a relatively small diagonal screen size (display device having a size of about 2 inches or less and used in a mobile phone and the like) and when the characteristics of the sensors and the TFTs are less varied in a chip. In this case, image pickup may be executed as described below without dividing it into the trial image pickup and the final image pickup.

That is, (1) first, image pickup data is outputted and an average gradation is calculated by setting first the picking up period of time to $t0=10$ msec (during which a picture made to entirely black can be obtained from any image pickup object without causing almost any light leak in the sensors). The first image pickup data is stored in the memory of the control IC 55, and the like.

(2) Second image pickup is executed by setting the picking up period of time to $t=t0+\Delta t$ (for example, $\Delta t=0.5$ msec) and an average gradation is calculated.

(3) When the average value is less than a predetermined value, image pickup data is not outputted, and picking up and calculation of the average gradation are executed by setting the picking up period of time to $t=t+2t0$.

(4) When a result of calculation is equal to or more than a predetermined value, the image pickup data is outputted and added to the memory of the control IC 55 and the like.

(5) The processes of (2) to (4) are repeated until the average gradation is made to about 256 gradations while appropriately increasing the picking up period of time t.

It can be contemplated that an image completed on the memory by the above processes (1) to (5) is a picked-up result whose quality is as high as that of the result obtained by the embodiment described above. Moreover, the memory for executing the arithmetic operation of an image requires only about one frame. Accordingly, this is particularly effective to a mobile phone whose hardware resource is restricted.

(Third Embodiment)

In the second embodiment, since the display luminance is set to each block, there may be a case in which adjacent blocks have a greatly different display luminance.

Figure 40:
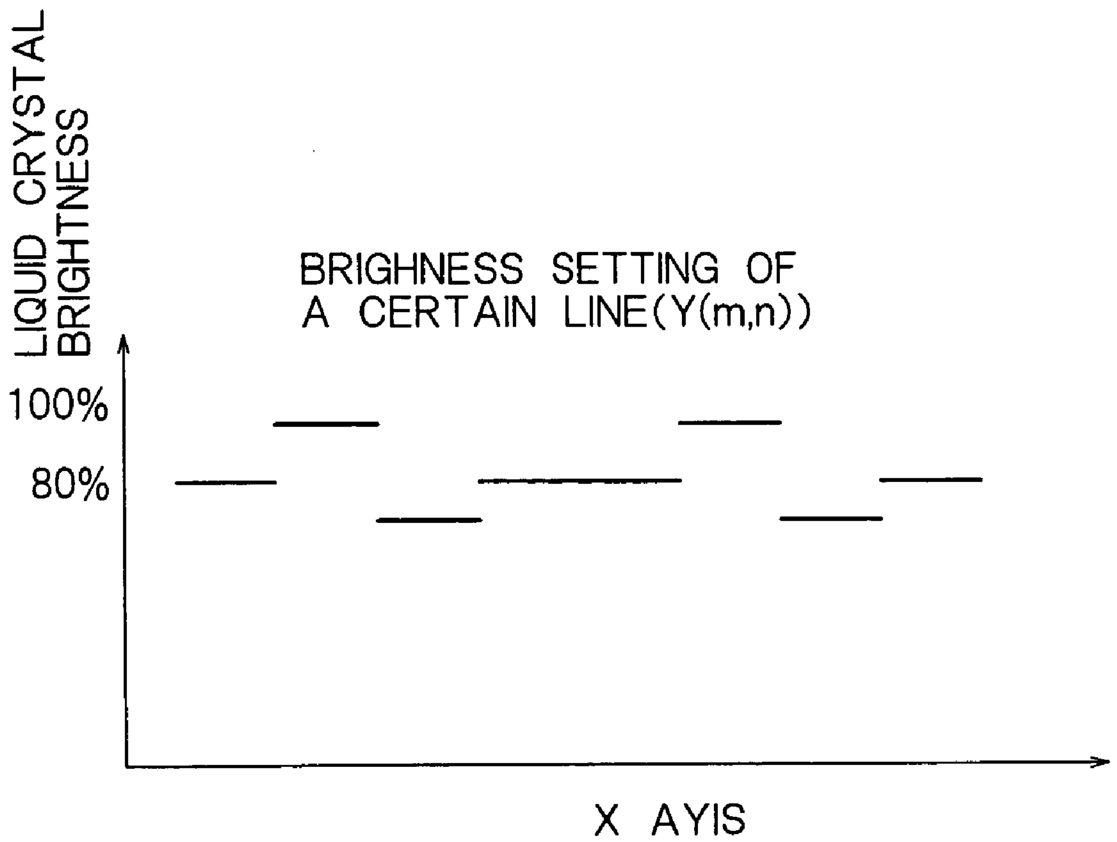
FIG. 40 is a view showing an example of the display luminance of respective blocks in the second embodiment.
Figure 41:
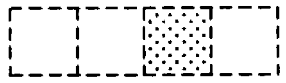
FIG. 41 is a view showing picked-up images of four adjacent blocks in the second embodiment in diagrammatic form.

FIG. 40 is a view showing an example of display luminances of the respective blocks in the second embodiment, wherein a horizontal axis shows the positions of the blocks and a vertical line shows the display luminances. For the purpose of easy understanding, blocks belonging to a particular row is extracted. FIG. 41 is a view showing the picked-up images of four adjacent blocks in diagrammatic form in the second embodiment. As shown in these figures, the display luminances of the adjacent blocks change discontinuously. Accordingly, if adjacent blocks have a large difference of luminance, when an image pickup object having a large white density is picked up, there is a possibility that an irregular color occurs as shown in FIG. 41. For example, there may be occurred a phenomenon, for example, that the same white background seems to have a different degree of white in the respective checkered blocks thereof as a picked-up result.

To cope with the above problem, a third embodiment is arranged such that the display luminance of the pixels disposed at the center of each block is set by the same processing as that of FIG. 35 and the display luminance of each block is gradually changed from display luminance set to the center pixels so that a great difference of luminance does not occur in the vicinity of the boundary between adjacent blocks.

Figure 42:
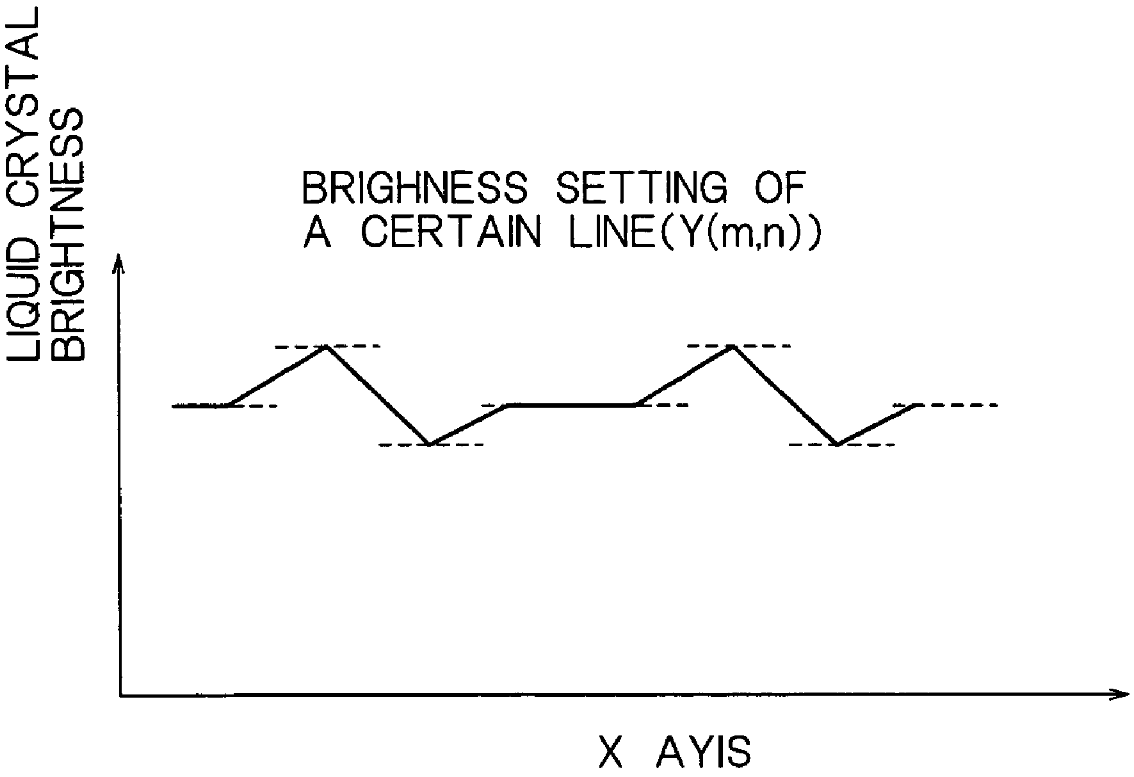
FIG. 42 is a view showing a result of processing of a third embodiment when picking up is executed under the same conditions as those of FIG. 40.
Figure 43:
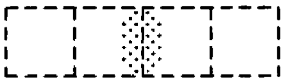
FIG. 43 is a view showing picked-up images of four adjacent blocks in the third embodiment in diagrammatic form.

FIG. 42 is a view showing a result of processing of the third embodiment when picking up is executed under the same condition as that of FIG. 40, and FIG. 43 is a view showing a picked-up image of four adjacent blocks in the third embodiment in diagrammatic form. As shown in these figures, a difference of luminance does not greatly change between adjacent blocks.

As described above, in the third embodiment, since the luminance is gradually changed from the center pixels of each block toward the pixels located around of each block so that the luminance does not greatly change between adjacent blocks, thereby the irregular color of a picked-up image due to the difference of luminance between blocks can be eliminated.

(Fourth Embodiment)

In a fourth embodiment, a picked-up result obtained by sensors 12 is matched to a previously prepared reference pattern.

Figure 44:
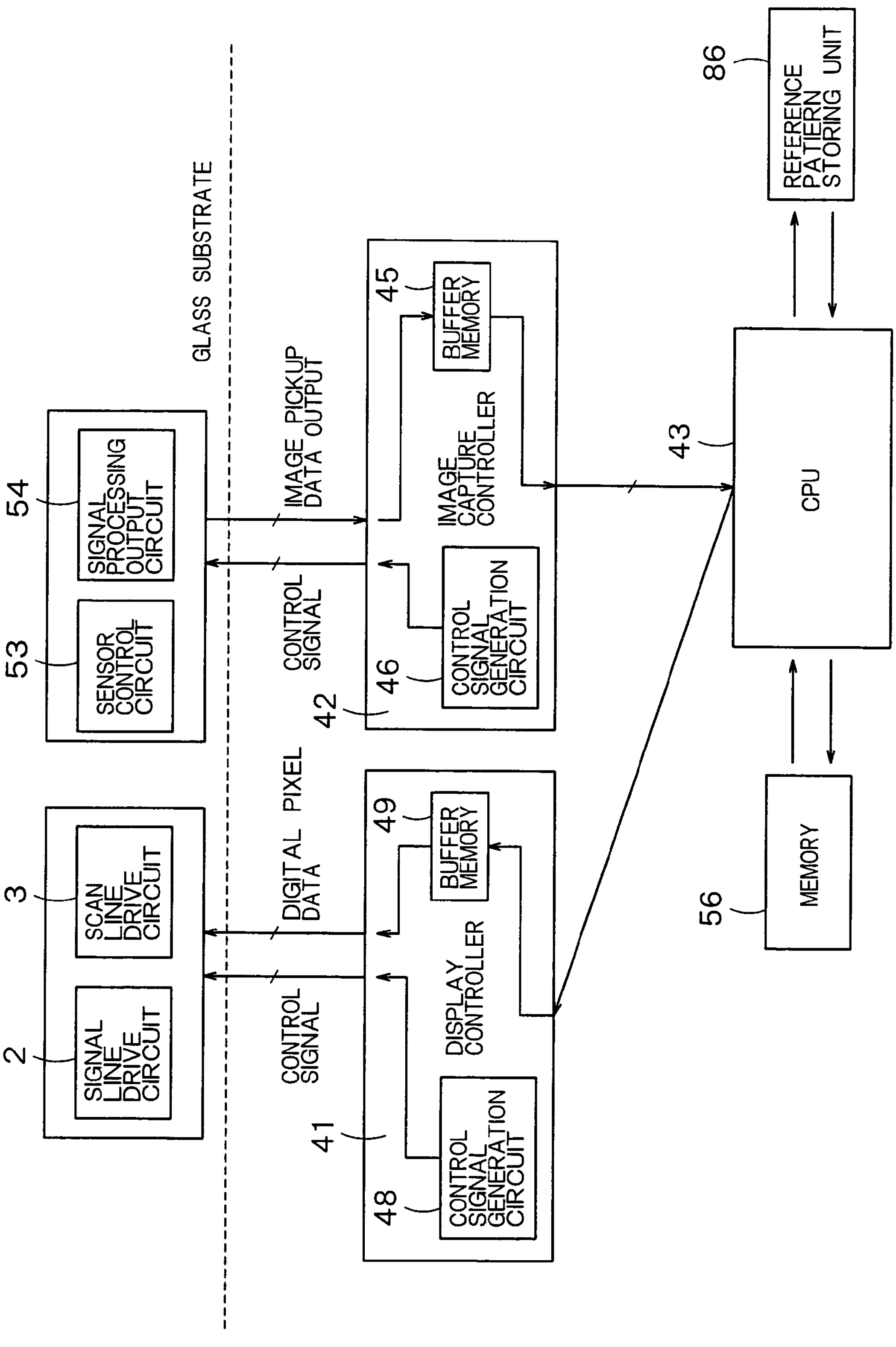
FIG. 44 is a block diagram showing a schematic arrangement of a fourth embodiment of the display device according to the present invention.

FIG. 44 is a block diagram showing a schematic arrangement of the fourth embodiment of the display device according to the present invention. A display device shown in FIG. 44 includes a reference pattern storing unit 86 for storing a plurality of reference patterns, in addition to the arrangement shown in FIG. 19.

Figure 45:
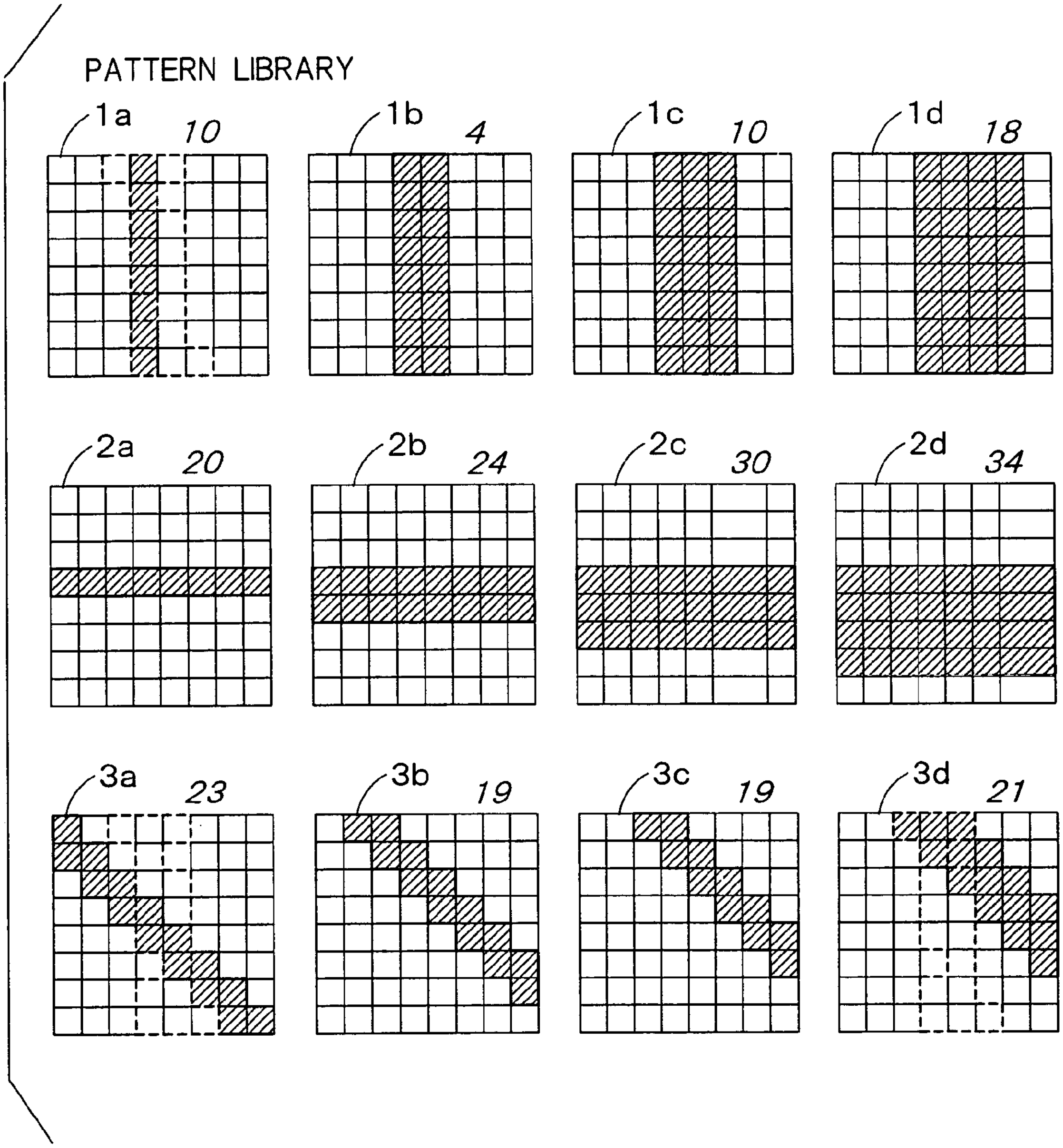
FIG. 45 is a view showing examples of reference patterns stored in a reference pattern storing unit.

FIG. 45 shows examples of the reference patterns stored in the reference pattern storing unit 86. Each of reference patterns 1*a*, 1*b*, 1*c*, 1*d*, 2*a*, 2*b*, 2*c*, 2*d*, 3*a*, 3*b*, 3*c*, 3*d* has a size of 8 pixels×8 pixels, and the portions thereof illustrated by black show patterns. Note that the size and type of the reference patterns are not limited to those of the illustrated patterns.

Figure 46:
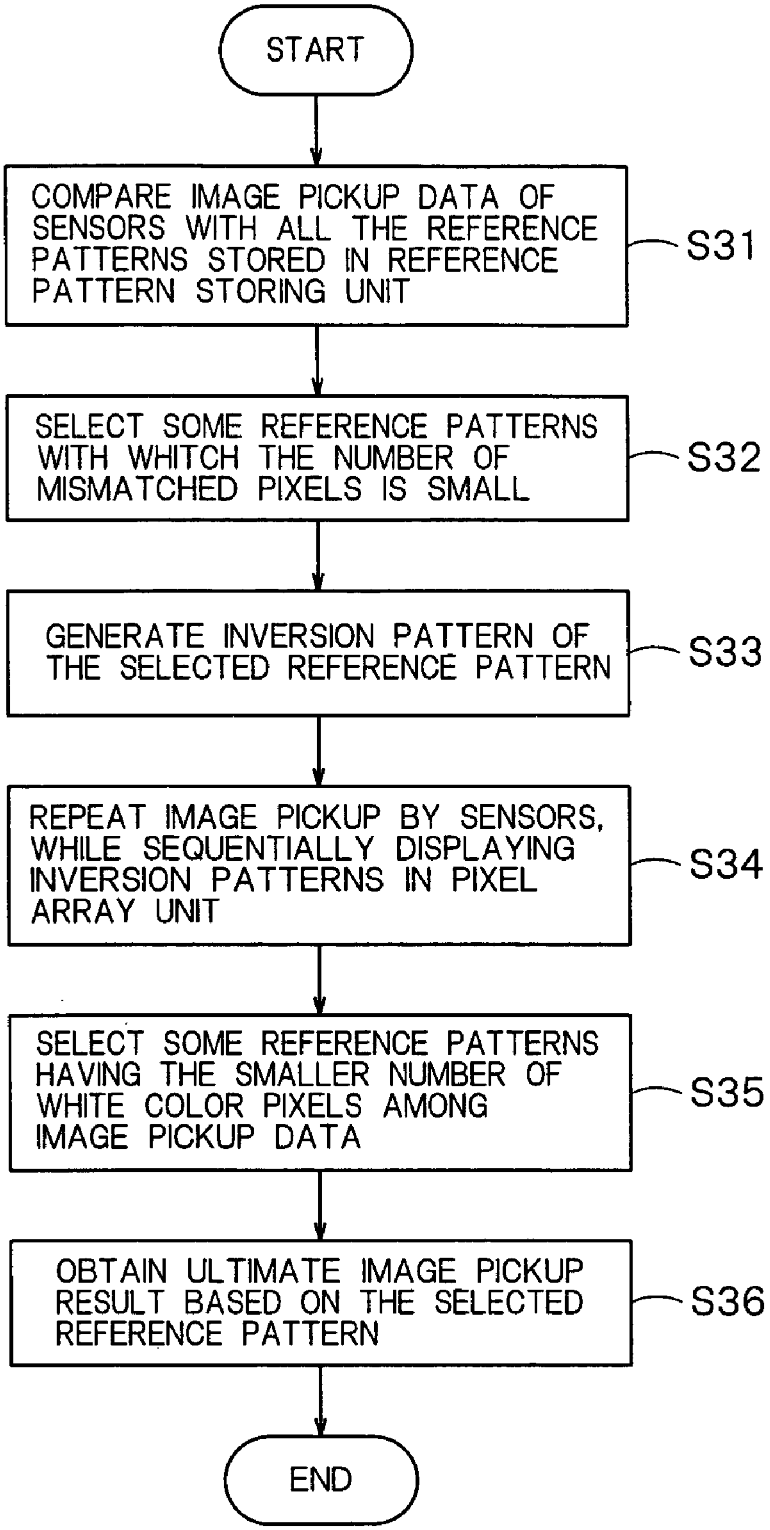
FIG. 46 is a flowchart showing a processing operation executed by a control IC 55 of the embodiment.
Figure 47:
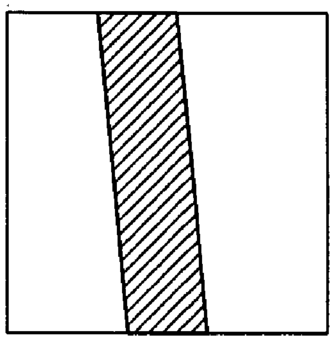
FIG. 47 is a view showing an example of an image pickup object.

FIG. 46 is a flowchart showing a processing operation executed by a control IC 55 of the fourth embodiment. In the following description, the processing operation of the flowchart of FIG. 46 will be explained assuming that image pickup data shown in FIG. 48 is obtained as a result that an image pickup object as shown in FIG. 47 is picked up by sensors 12.

The control IC 55 of the embodiment compares the image pickup data obtained by the sensors 12 with all the reference patterns stored in the reference pattern storing unit 86 (step S31).

Figure 48:
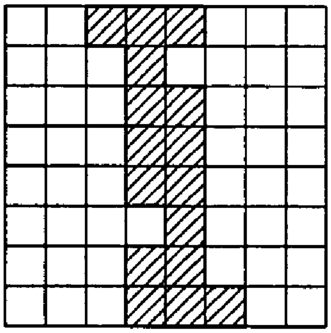
FIG. 48 is a view showing an example of a picked-up result.

The numerals added to the upper portions of the respective reference patterns show the number of pixels that disagree with the image pickup data of FIG. 48. The control IC 55 selects some reference patterns having a smaller number of pixels that disagree with the image pickup data (step S32). It is assumed that the control IC 55 selects, for example, the four patters 1*a*, 1*b*, 1*c*, 1*d* of FIG. 45.

Figure 49:
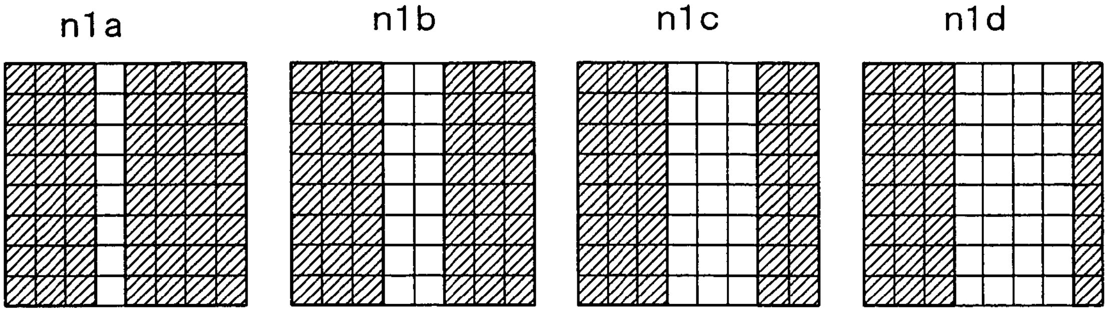
FIG. 49 is a view showing examples of inverted patterns.
Figure 50:
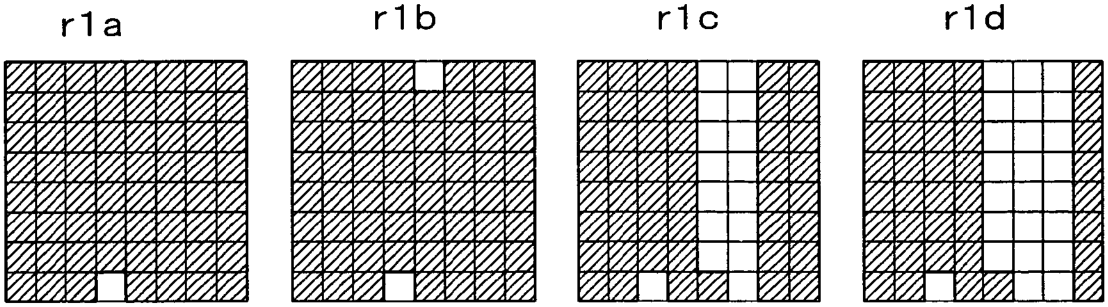
FIG. 50 is a view showing an example of data picked-up by a sensor.

Next, the control IC 55 generates patterns obtained by inversing the bright and dark portions of the selected reference patterns (inverted patterns n1*a*, n1*b*, n1*c*, n1*d* shown in FIG. 49) (step S33), and the sensors 12 repeat picking up while sequentially displaying the inverted patterns on a pixel array unit 1 (step S34). In this case, since only the white portions of the inverted patterns n1*a*, n1*b*, n1*c*, n1*d* of FIG. 49 pass light, the image pickup data obtained by the sensors 12 is as shown in FIG. 50. Image pickup data r1*a* corresponds to the reference pattern 1*a* and the inverted pattern n1*an* image pickup data r1*b* corresponds to the reference pattern 1*b* and the inverted pattern n1*b*, image pickup data r1*c* corresponds to the reference pattern 1*c* and the inverted pattern n1*c*, and image pickup data r1*d* corresponds to the reference pattern 1*d* and the inverted pattern n1*d*.

Next, some reference patterns each having smaller number of white pixels from the image pickup data are selected (step S35). For example, the two reference patterns 1*a* and 1*b* are selected in the example of FIG. 50.

Figure 51:
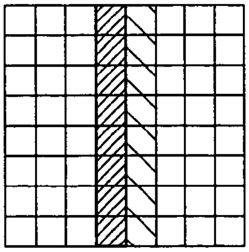
FIG. 51 is a view showing an example of a finally picked-up result.

Next, a final picked-up result is obtained based on the selected reference patterns (step S36). In this case, a final picked-up result shown in FIG. 51 is obtained by averaging the selected reference patterns and the image pickup data obtained at first.

As described above, in the fourth embodiment, since the plurality of types of reference patterns are previously prepared, and final image pickup data is generated by comparing the image pickup data obtained by the sensors 12 with the reference patterns, image pickup data of high quality can be obtained without excessively increasing the resolution of the sensors 12. In particular, this embodiment is particularly effective when an image pickup object whose shape is previously arranged as a pattern is picked up.

(Fifth Embodiment)

FIG. 52 is a block diagram showing a part of a pixel array unit 3, wherein each portion surrounded by a dotted line shows one pixel. Each pixel includes a pixel TFT 11, a liquid crystal capacitor C1 and an auxiliary capacitor C2 each connected to an end of the pixel TFT 11, and an image capture sensor 12. The sensor 12 is connected to a power supply line and a control line (both not shown) in FIG. 52.

Note that, although only one pixel TFT 11 is shown in each pixel in FIG. 52, actually, three pixels TFT 11 for red, green, and blue are located in each pixel, and each pixel TFT 11 has the sensor 12.

FIG. 53 is a circuit diagram showing an arrangement of one pixel in detail. One pixel includes one sensor 12 composed of a photodiode in correspondence with each of the pixel TFTs 11. The anode terminal of each sensor 12 is connected to a power supply line JVSS, and the cathode terminal thereof is connected to a control line L1. These components may be formed on the same substrate (array substrate) or a part of them may be formed on a confronting substrate. For example, the pixel TFTs 11 may be disposed on a confronting substrate. In this case, a signal line and a scan line are also formed on the confronting substrate. A manufacturing cost can be reduced by integrating the pixel TFTs 11 and the like and a sensor circuit and the like on the same substrate. When the pixel TFTs and the like and the sensor circuit and the like are integrated on a separate substrate, a power consumption of a backlight can be reduced by increasing an aperture ratio (for example, the pixel TFTs formed on the confronting substrate are disposed in confrontation with the sensors and the capacitors formed on the array substrate).

In addition to the above, each pixel includes a capacitor C3 connected between the power supply line JVSS and the control line L1, an SRAM 13 for storing binary data according to the charge accumulated in the capacitor C3, a transistor Q3 for controlling write to the SRAM 13, a reset transistor Q4 for initializing the SRAM 13 and the capacitor C3, an amplifier (AMP) 14 for amplifying the output from the SRAM 13, and a transistor Q5 for switching whether or not the output from the amplifier 14 is supplied to a signal line Sig according to the logic of a control signal line OUT.

The SRAM 13 is composed of two inverters IV1 and IV2 connected in series and a transistor Q6 connected between the output terminal of the latter inverter IV2 and the input terminal of the former inverter IV1.

When a signal SFB is at a high level, the transistor Q6 is turned on and the two inverters IV1 and IV2 execute a holding operation. When a control signal line OUT(m) is at a high level, the data being held is output to the signal line Sig.

Figure 54:
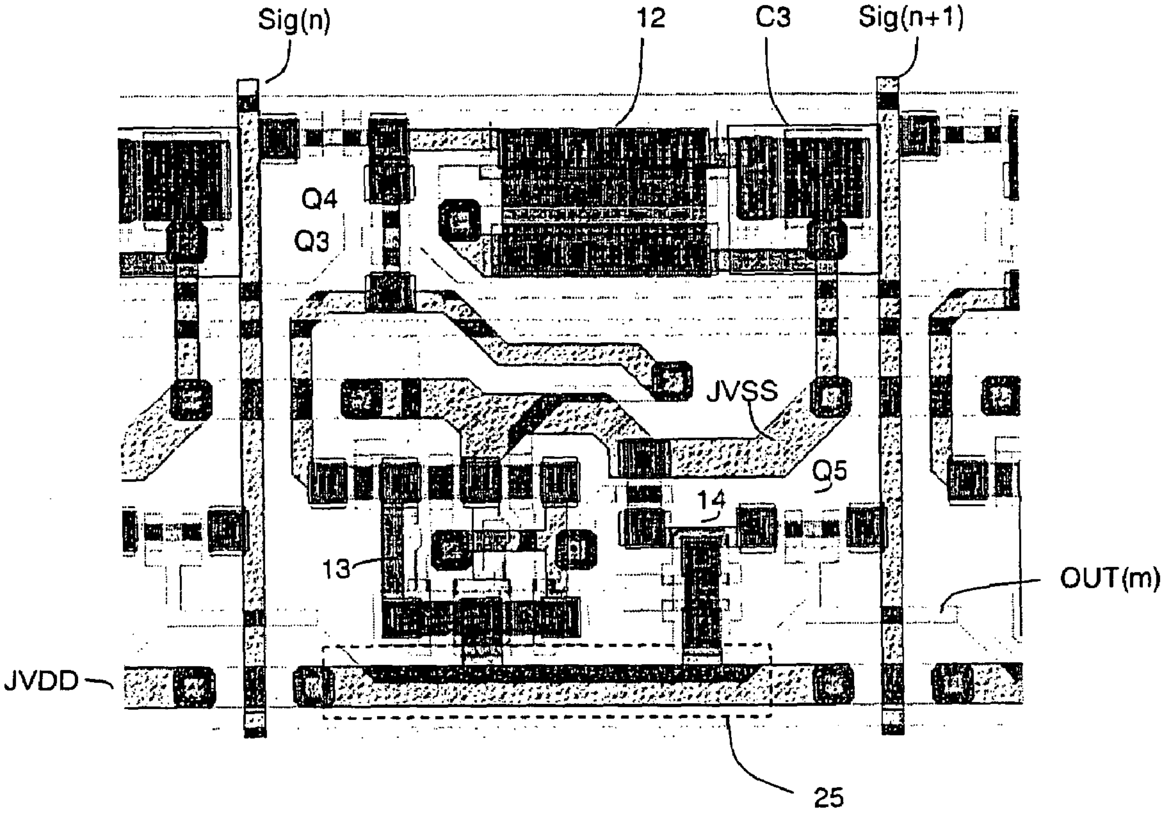
FIG. 54 is a plan view of a layout corresponding to a circuit diagram shown in FIG. 53.

FIG. 54 is a plan view of a layout corresponding to the circuit diagram of FIG. 53. As shown by a dotted line 25 of FIG. 54, the control signal line OUT(m) is disposed such that at least a part thereof is laid on a power supply line JVDD of the SRAM 13 and the amplifier 14 vertically in this embodiment. With this disposition, capacitance coupling is occurred between the power supply line of the SRAM 13 and the amplifier 14 and the control signal line OUT(m) as shown in the dotted line of FIG. 54, thereby the wiring capacitance of the control line OUT(m) is increased. As a result, the transistor Q5 is slowly turned on, and a write current in the signal Sig also slowly changes. Accordingly, the voltage drop of the power supply JVDD of the SRAM 13 and the amplifier 14 can be prevented, and there is not a possibility that data obtained by capturing an image disappears on the signal line Sig. Accordingly, there can be prevented a problem that even if a result of a captured image can be normally output to the signal line at a portion near to a power supply end at the edge of a screen, it cannot be normally output to the signal line at a portion far from the power supply end such as the center of the screen.

It is also contemplated to explicitly connect a capacitor between the control line OUT(m) and the power supply line JVDD, in addition to vertically superimpose at least a part of the control line OUT(m) on the power supply line JVDD of the SRAM 13 and the SRAM 13. In this arrangement, however, the aperture ratio is reduced by the newly provided capacitor and thereby display quality is deteriorated. In this embodiment, since it is not necessary to explicitly provide the capacitor, there is not a possibility that the aperture ratio is reduced.

As described above, in the fifth embodiment, since at least a part of the control line OUT(m) is superimposed on the power supply line JVDD of the SRAM 13 and the amplifier 14, the voltage drop of the power supply line JVDD can be prevented, and thus there is not a possibility that the data obtained by capturing the image disappears on the signal line Sig.

(Sixth Embodiment)

In a sixth embodiment, the resistance of a power supply line JVDD of an SRAM 13 and an amplifier 14 is made lower than that of a signal line Sig.

The sixth embodiment of the display device according to the present invention is composed of the same circuit as that of FIG. 53. If the resistance of the power supply line JVDD of the SRAM 13 and amplifier 14 is higher than that of the signal line Sig, the voltage drop on the signal line Sig is larger than that on the power supply line JVDD, and thus there is a possibility that the data obtained by capturing an image disappears.

To cope with this problem, in this embodiment, the resistance of the power supply line JVDD of the SRAM 13 and the amplifier 14 is made lower than that of the signal line Sig.

FIG. 55 is a plan view of a layout of one pixel in the sixth embodiment of the display device. As shown in the figure, it is possible to make the resistance of the power supply line JVDD lower than that of the signal line Sig by making the width of the power supply line JVDD larger than that of the signal line Sig.

Alternatively, the signal line Sig may be arranged in a multi-layered structure. When the signal line Sig is arranged in the multi-layered structure, the resistance thereof is increased thereby. Thus, it is possible to make the resistance of the signal line Sig higher than that of the power supply line JVDD without changing the thickness of a pattern.

When the resistance of the power supply line JVDD is lower than that of the signal line Sig, even if the data obtained by capturing an image of one horizontal line is simultaneously written to the signal line Sig, there is not a possibility that a current flowing in the signal line Sig abruptly increases, and a voltage of the power supply line JVDD does not abruptly drop. Accordingly, the voltage drop of the power supply line JVDD is restricted and the disappearance of data can be prevented.

As described above, in the sixth embodiment, since the width of the power supply line JVDD can be made larger than that of the signal line Sig, the resistance of the power supply line JVDD can be made lower than that of the signal line Sig. As a result, even if the data obtained by capturing the image of one horizontal line is simultaneously written to the signal line Sig, there is not a possibility that a signal on the signal line Sig disappears.

(Seventh Embodiment)

FIG. 56 is a circuit diagram showing a part of the pixel array unit 3 in FIG. 52 in detail. As shown in FIG. 56, each of sensors 12*a* includes a photodiode D1 and a sensor switching transistor Q1, and each of sensors 12*b* includes a photodiode D2 and a sensor switching transistor Q2. The photodiodes D1 and D2 output electric signals according to the quantities of light received thereby. The sensor switching transistors Q1 and Q2 are alternately turned on and off, thereby any one of the plurality of photodiodes D1 and D2 in one pixel is alternately selected.

Each pixel includes the two sensors 12*a* and 12*b*, a capacitor C3, which is commonly used by the two sensors 12*a* and 12*b* in the same pixel, a detection circuit 91 for subjecting the charge accumulated in the capacitor C3 to A/D conversion, a transistor Q3 for controlling write to the detection circuit 91, and a reset transistor Q4 for initializing a buffer 13 and the capacitor C3. The charge accumulated in the capacitor C3 is supplied to the detection circuit 91 through the transistor Q3 and a detection line. The detection circuit 91 is disposed in an outside frame portion of an array substrate.

In the case of a low temperature polysilicon device (LTPS device) formed on an insulation substrate using a low temperature polysilicon process, the variation of the threshold value voltage Vth of the characteristics of a device may be about 1 V even on the same chip, different from a transistor circuit formed on a silicon substrate. Accordingly, a differential circuit (operational amplifier), which is often used in an A/D conversion circuit on a silicon substrate, cannot be used as it is, and an A/C conversion circuit having a threshold value voltage variation compensating means is necessary. This is because when the operational amplifier is used in an ordinary manner, the output voltage of a certain sensor is converted into a high level in a certain detection circuit due to the variation of the threshold value voltage and the like of the characteristics of the device and converted into a low level in another detection circuit, and thus the operation amplifier cannot be practically used.

In the following description, the detection circuit 91 having an A/D conversion circuit, which is provided with a threshold value voltage variation compensating means and particularly effective when it is formed integrally on the array substrate of the display device using the LTPS device, will be described.

Figure 58A:
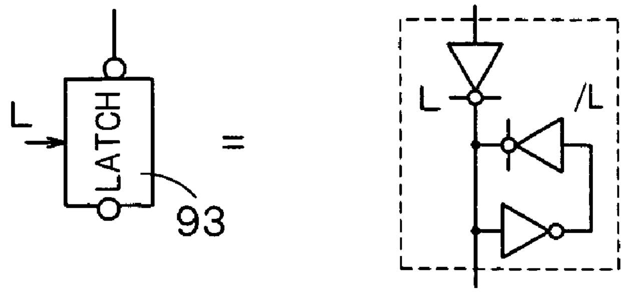
FIG. 58A is a detailed circuit diagram of a latch.
Figure 58B:
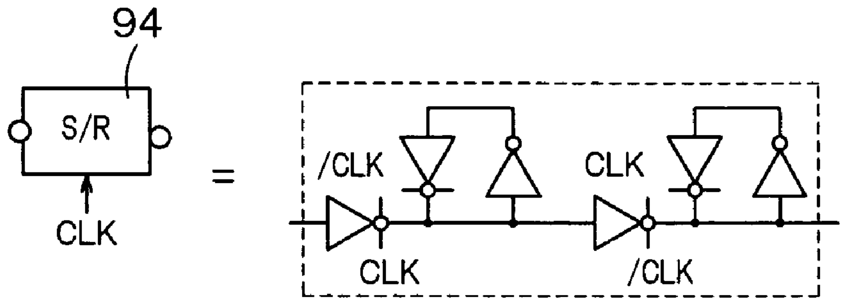
FIG. 58B is a detailed circuit diagram of a shift resister.

FIG. 57 is a circuit diagram showing a detailed arrangement of the detection circuit 91. The detection circuit 91 shown in FIG. 57 includes transistors Q7 and Q8, an amplifier 92 composed of a capacitor C4 and an inverter IV3, a transistor Q9, and a shift resister 95 composed of a transistor Q10 and a resister circuits 94, these components being connected to each of detection lines. The latch 93 is composed of, for example, a circuit as shown in FIG. 58A, and the resister circuit 94 is composed of, for example, a circuit as shown in FIG. 58B.

A signal /PRC is input to the gate of each transistor Q7, and a signal PRC is input to the gate of each transistor Q8. First, the signal PRC is set to a high level for a predetermined period. With this operation, each transistor Q8 is turned on, and the input terminal of each amplifier 92 is initialized to a voltage $V_{PRC}$. The voltage $V_{PRC}$ is set to a voltage between the detection line voltage when a high level output is applied from each sensor to each corresponding detection line and the detection line voltage when the high level output is applied from each sensor to each corresponding detection line. A switch SW1 is connected between the input and output terminals of the inverter IV3 of each amplifier 92, and when a voltage PRC is at a high level, the switch SW1 is turned on thereby. Accordingly, the operation threshold value of the inverter is held at the input terminal (=lower end of the capacitor C4) of the inverter IV3. At this time, each amplifier 92 does not execute an amplifying operation. With this operation, the variation of the threshold value voltage is canceled. Thus, even if the threshold value voltage varies, the operation threshold value of the inverter IV3 is held at the input terminal thereof.

Next, when the signal /PRC is set to a high level (the signal PRC is set to a low level), whether or not the voltage of each detection line is higher than the voltage $V_{PRC}$ is input to the input terminal of each corresponding inverter IV3 as it is through each corresponding capacitor C4 so that this voltage is replaced with a voltage that is whether higher or not than the operation threshold value, thereby an inverted amplified output is reliably supplied to the output terminal of each corresponding inverter IV3. With the above operation, A/D conversion can be reliably executed even if the variation of the threshold value voltage is about 1 V.

Thereafter, each latch 93 executes a latch operation at a predetermined timing. Thereafter, when a signal A is set to a high level, the output from each latch 93 is written to the resister circuit 94 of each corresponding shift resister 95. Thereafter, when the signal A is set to a low level, each transistor Q10 is turned on and respective corresponding resister circuits 94 are connected in series. Thus, data shifts right step by step in synchronism with a clock CLK and is supplied to a CPU from respective right end resister circuits 94.

Note that the each latch 93 may be omitted according to circumstances. In this case, the output from each detection line is directly applied to each shift resister 95. However, the output from each detection line must be supplied to each corresponding shift resister 95 at good timing at which each corresponding shift resister 95 has just supplied data to the CPU. This is for the purpose of not changing the output from each detection circuit 91 until the data has been stored in each corresponding shift resister 95.

In contrast, when the latches 93 are provided as shown in FIG. 57, the A/D converted output can be held in the latches 93 regardless of the operation of the shift resisters 95, which is advantageous in that a next detecting operation can be stated promptly.

Figure 59:
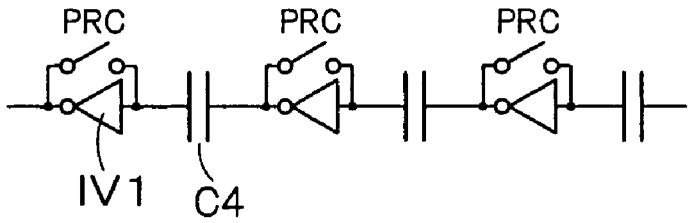
FIG. 59 is circuit diagram showing a modification of an amplifier.

Although the amplifier 92 is composed of each one of the capacitor C4 and the inverter IV3 in FIG. 57, it may be composed of a plurality of capacitors C4 and inverters IV3 connected in series as shown in FIG. 59. With this arrangement, the accuracy of the gain control of the amplifier 92 can be improved. A larger number the capacitors C4 and the inverters IV3 connected in series can more reduce a minimum amplitude of each detection line that can be subjected to A/D conversion, thereby the sensitivity of an A/D converter can be improved.

Further, the A/D converter is not limited to convert data into binary and may convert it to a higher state.

Although a circuit for amplifying the value of each sensor is not disposed in each pixel in FIG. 56, any type of an amplification circuit may be disposed therein as explained using FIGS. 4, 28, and 53. The amplification circuit disposed in each pixel can reduce a signal line drive time. Since the drive time of each signal line driven by the circuit in each corresponding pixel is not sufficiently long, even if the drive of the signal line is interrupted at timing at which a voltage changes only minutely, data is unlike to be erroneously transmitted because a signal amplitude is amplified with a pinpoint accuracy in an outside frame portion. As a result, there is an effect that a period of time for reading a multi-gradation image can be shortened.

In FIG. 57, a buffer and a level conversion circuit (both not shown) may be connected to the latter stage of each shift resister 95. The buffer is an inverter, which is composed of a PMOS-TFT and a NMOS-TFT connected between a power supply terminal and a ground terminal in series, and shapes a waveform. A reason why the level conversion circuit is necessary is as described below. Since a polysilicon TFT formed on an insulation substrate such as a glass substrate and the like has a large absolute value of a threshold value voltage Vth such as 1 to 3V as compared with that of a TFT and the like formed on a silicon substrate, a relatively high voltage (5V in this embodiment) is necessary as a power supply voltage. In contrast, a CPU formed on the silicon substrate is ordinarily driven by a power supply voltage of 1 to 3 V. When a signal having an amplitude of 5V is input to the CPU, an excessive voltage is applied to an interface circuit on the CPU side, thereby malfunction may be occurred. To avoid the malfunction, it is desirable to provide a level conversion circuit so that a signal amplitude is converted from the amplitude of 5 V to a smaller amplitude that can be accepted by the CPU. The level conversion circuit may be composed of a known circuit.

Figure 60:
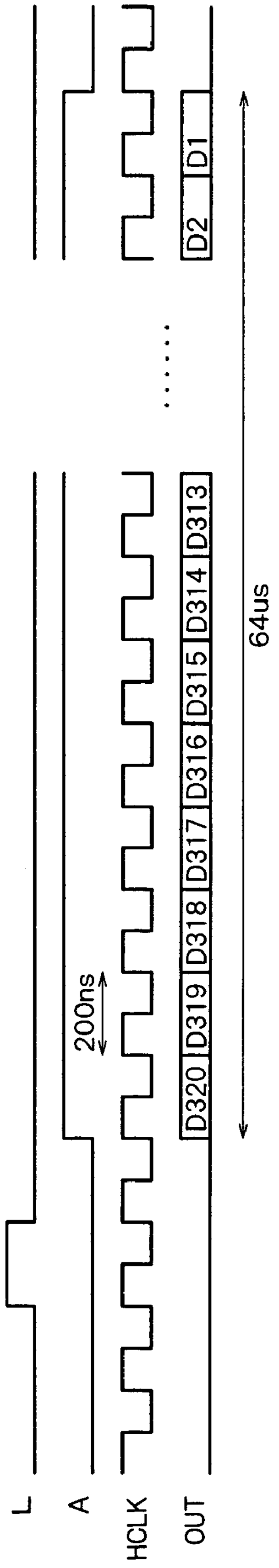
FIG. 60 is an operation timing chart of image data transmitted from a shift resister 95 to a CPU.

FIG. 60 is an operation timing chart of image data transmitted from each shift resister 95 to the CPU. As shown in the figure, the data D320 of a 230th detection line to the data D1 of a first detection line are sequentially transmitted in this order. Note that data D1 of the first detection line to the data D320 of the 320th detection line may be transmitted in an order opposite to that of FIG. 60.

Figure 70:
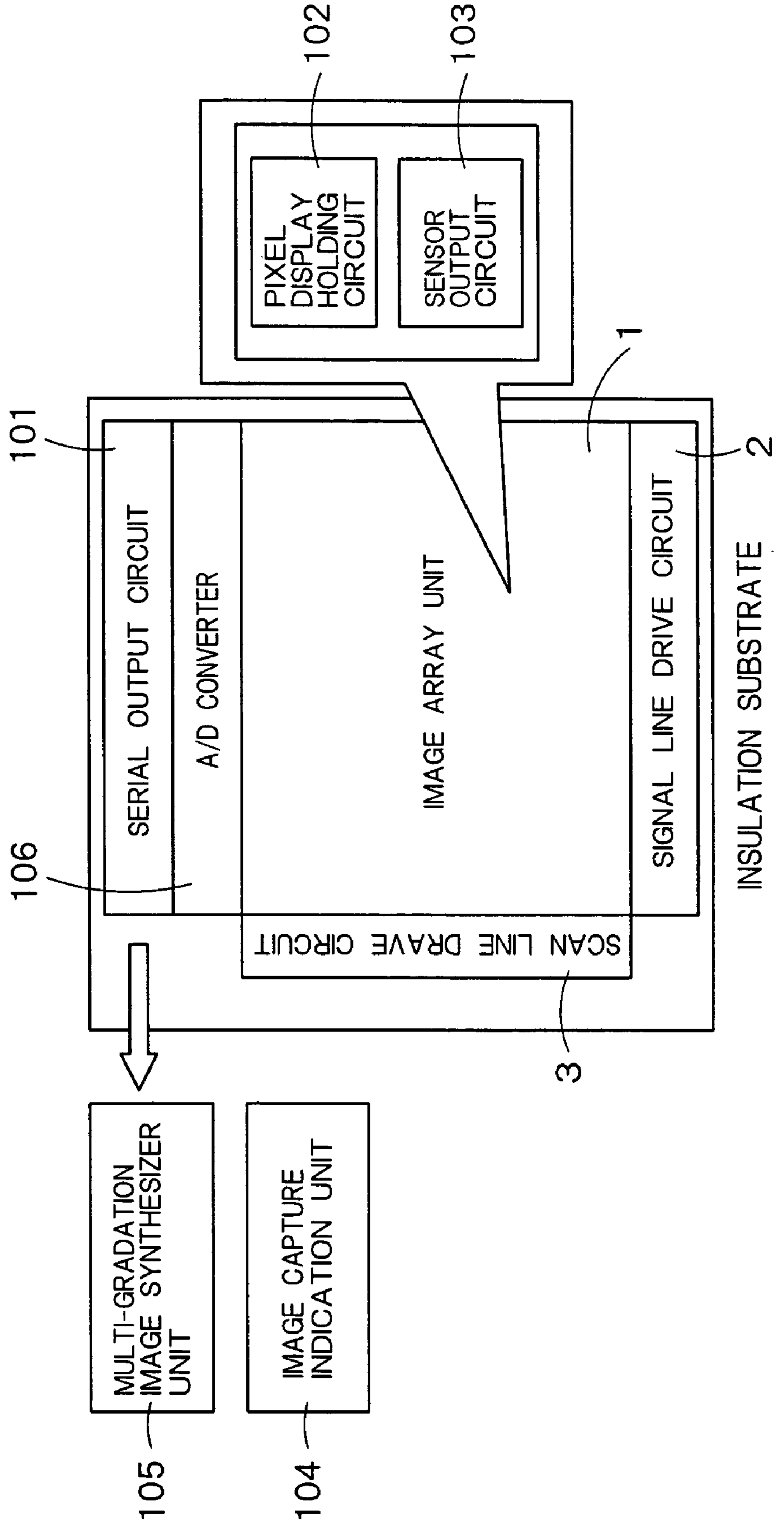
FIG. 70 is a block diagram of a display device of a modified example of FIG. 69.
Figure 71:
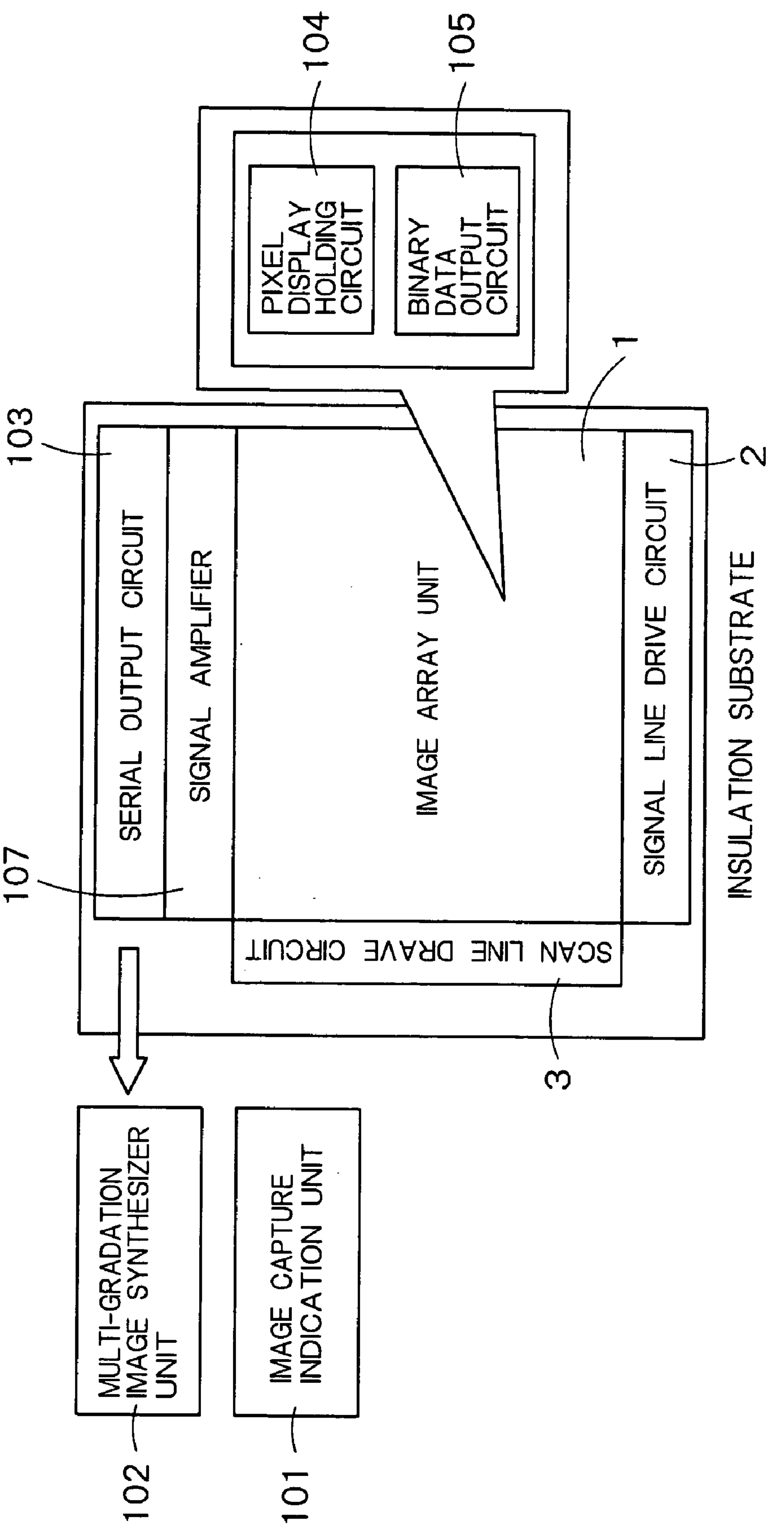
FIG. 71 is a block diagram of a display device of a modified example of FIG. 70.

FIG. 70 is a block diagram which summarizes characteristic portions of the above-mentioned first embodiment. As shown in FIG. 70, the pixel array unit 1 for converting output of the sensor for each pixel, the signal line drive circuit 2, the scan line drive circuit 3, an A/D converter 106 for converting the output of the sensors into digital data, and a serial output circuit 101 for converting the output of the A/D converter 106 into serial data. A pixel display holding circuit 102 and a sensor output circuit 107 are provided for each pixel of the pixel array unit 1. An image capture indication unit 104 for indicating image capture at a plurality of conditions, and a multi-gradation image synthesizer unit 105 for synthesizing multi-gradation image based on a plurality of binary image are provided in an external logic IC of the insulation substrate.

With the above arrangement, it is possible to read a good multi-gradation image even if the in-plane variation of the sensor outputs and TFT characteristics is relatively large and further an image can be read in a short time.

Furthermore, a binary data output circuit 103 for converting the output of the sensor into binary data may be provided in the pixels. In this case, instead of the A/D converter 106, the signal amplifier 107 for amplifying binary data from the pixels may be provided on the insulation substrate.

Figure 61:
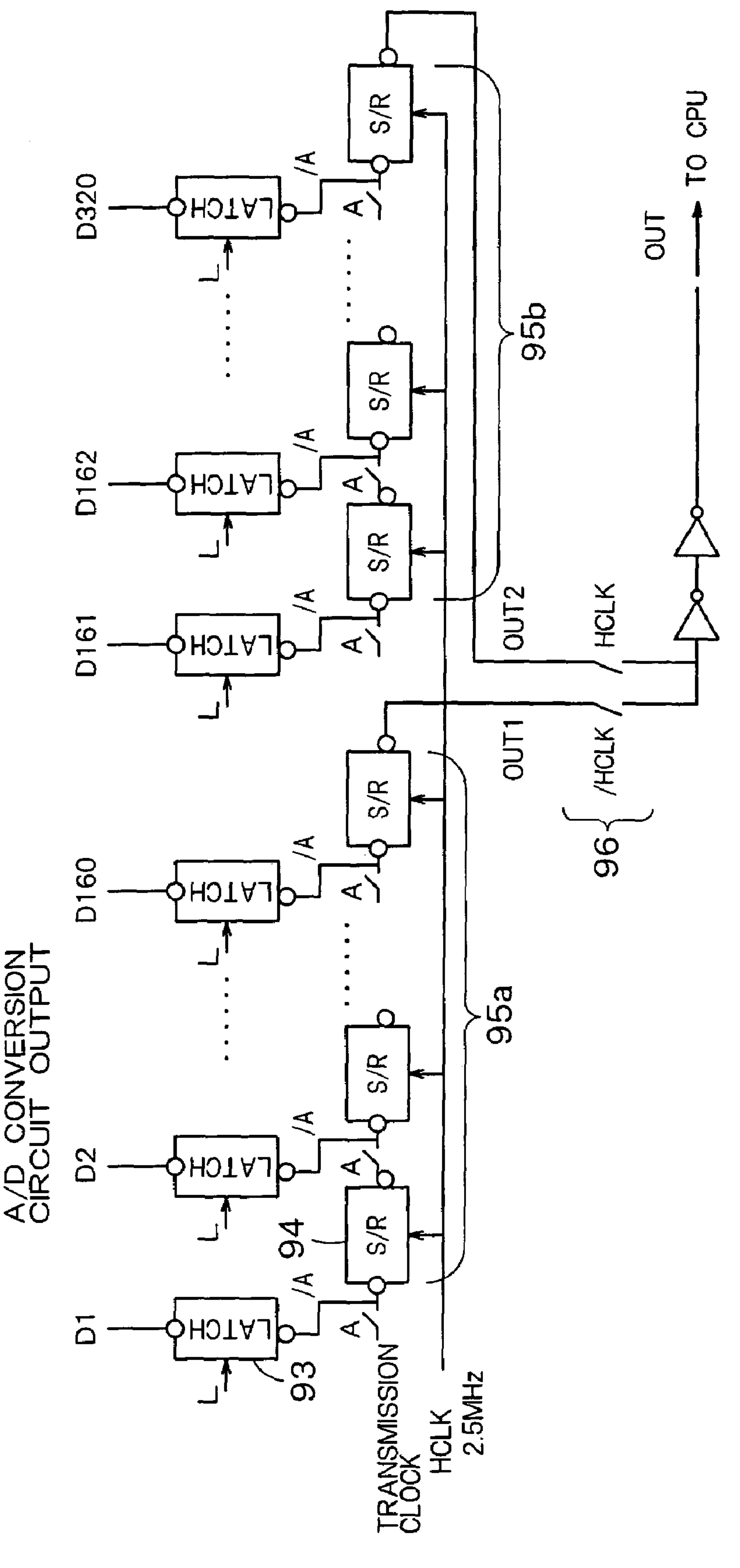
FIG. 61 is a block diagram showing a circuit arrangement capable of lowering the operation frequency of the shift resister 95.

In FIG. 60, a larger number of the detection lines require a higher output frequency of each shift resister 95, thereby timing is more restricted. Specifically, although each shift resister 95 transmits data of each stage to a next stage in synchronism with a clock, when the clock is too fast, each shift resister 95 cannot transmit the data normally. To cope with this problem, a circuit in FIG. 61 is arranged so as to lower the operation frequency of each shift resister 95. The circuit of FIG. 61 shows an example arranged such that the shift resisters 95 are divided into two groups of shift resisters 95*a* and shift resisters 95*b* as well as a P/S conversion circuit 96 is provided to select any ones of the outputs from the first shift resisters 95*a* and the outputs from the second shift resisters 95*b*, and the output from the P/S conversion circuit 96 is supplied to the CPU.

The first shift resisters 95*a* shift the image data of the detection lines D1 to D160, and the second shift resisters 95*b* shift the image data of the detection lines D161 to D320.

Figure 62:
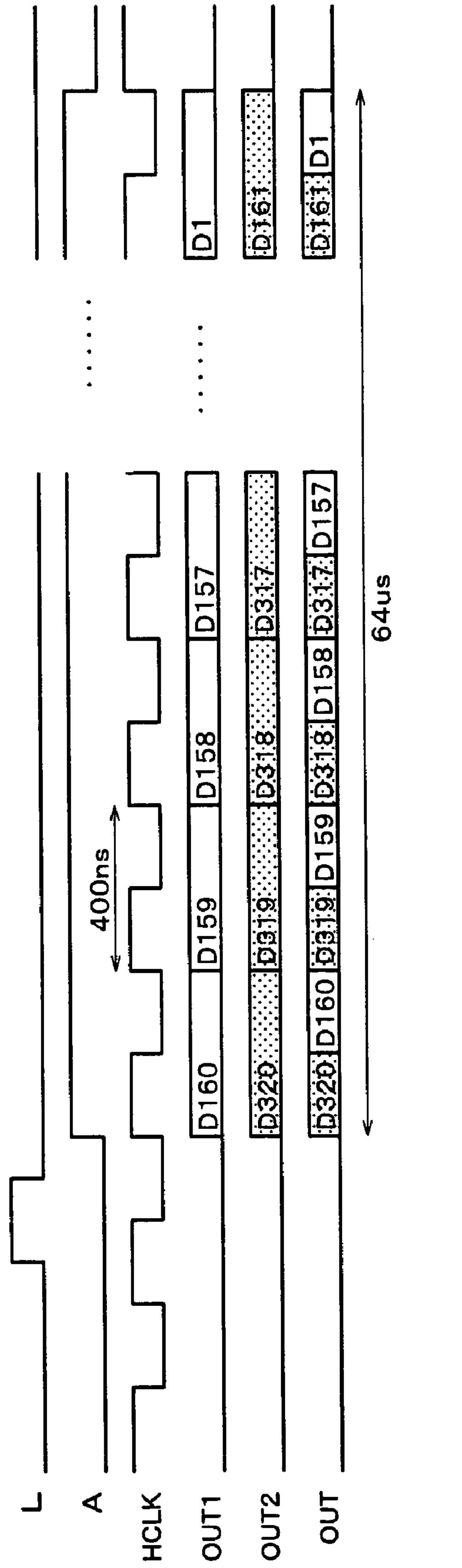
FIG. 62 is an output timing chart of a first shift resister 95*a*, a second shift resister 95*b*, and a P/S conversion circuit 96.

FIG. 62 is an output timing chart of the first shift resisters 95*a*, the second shift resisters 95*b*, and the P/S conversion circuit 96. As shown in the figure, the first shift resisters 95*a* sequentially output the image data D160 to D1, and the second shift resisters 95*b* sequentially output the image data D320 to D161. The P/S conversion circuit 96 alternately selects the outputs from the first shift resisters 95*a* and the outputs from the second shift resisters 95*b* and outputs the selected outputs.

As described above, in the circuit of FIG. 61, since the shift resisters 95 are divided into the first shift resisters 95*a* and the second shift resisters 95*b* and the outputs from the respective first and second shift resisters 95*a* and 95*b* are selectively transmitted to the CPU, the operation frequency of the shift resisters 95 can be reduced to ½ that of FIG. 57, thereby the restriction of timing can be eased.

Figure 63:
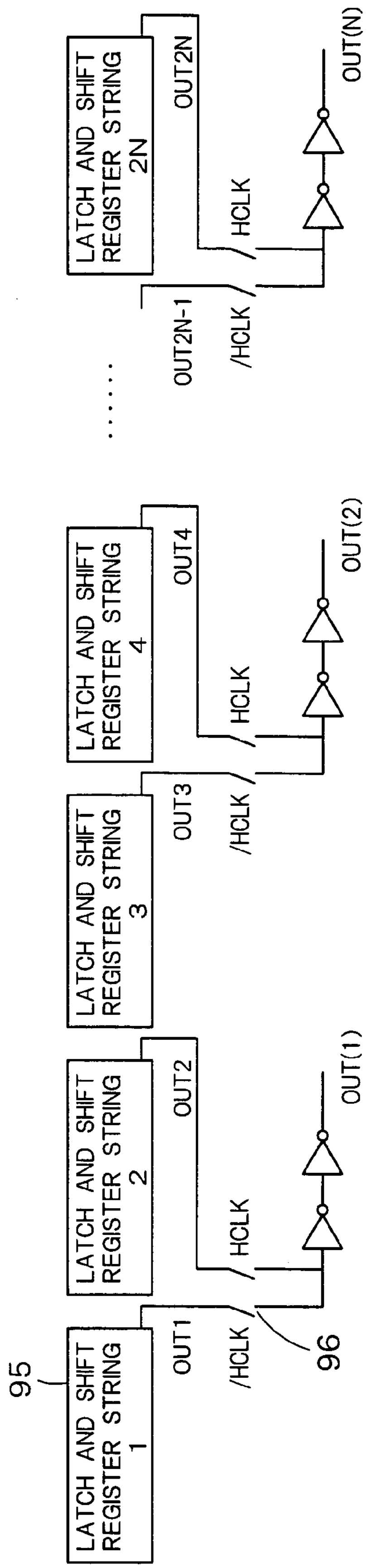
FIG. 63 is a block diagram showing a modification of the circuit shown in FIG. 61.

In contrast, FIG. 63 shows a modification of the circuit of FIG. 61 and shows an example in which the array substrate is divided into a 2*n* blocks ("n" is an integer of at least 1).

Figure 64:
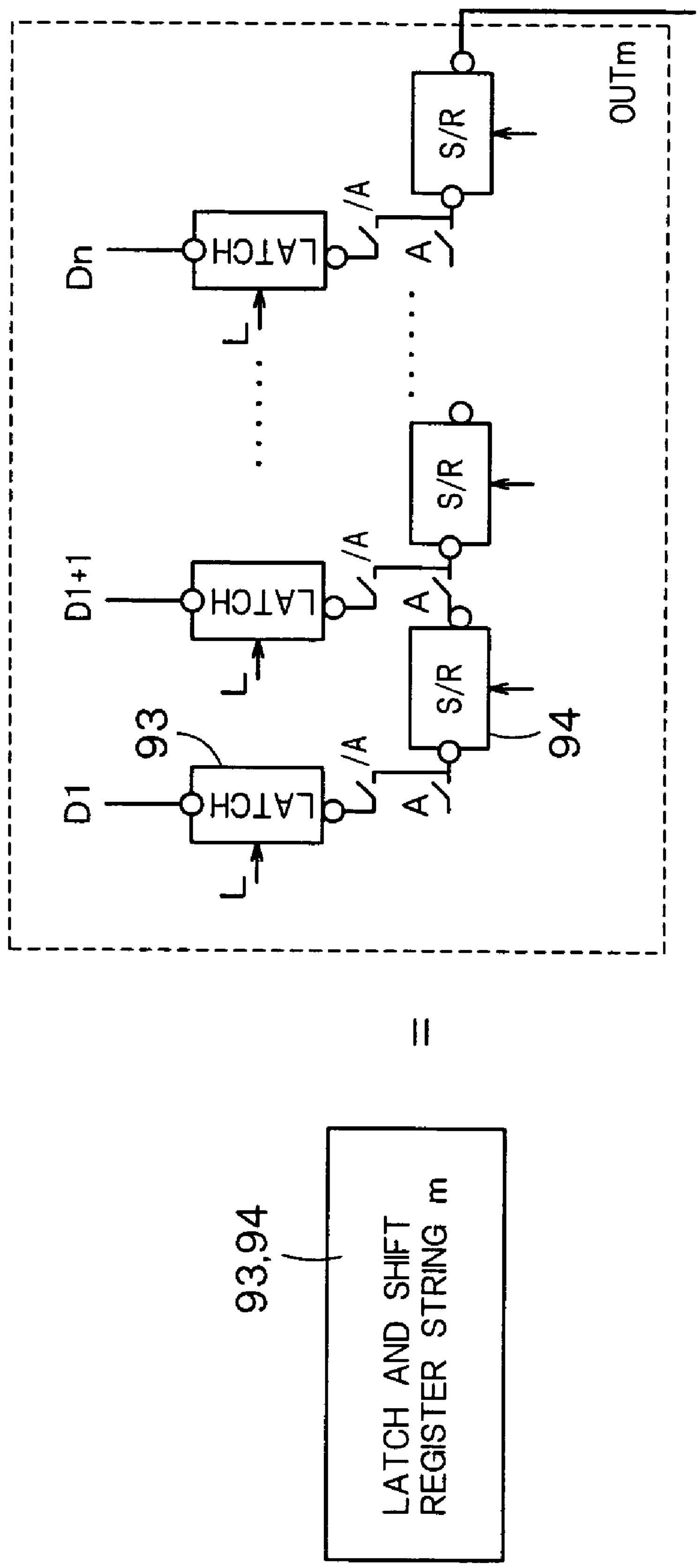
FIG. 64 is a block diagram showing an arrangement of a latch and a shift resister shown in FIG. 63.

In FIG. 63, a latch/shift resister 95 is disposed in each block, and further a P/S conversion circuit 96 is provided to select any one of the outputs from the two shift resisters 95 in adjacent blocks. The latch/shift resister 95 is composed of a circuit as shown in FIG. 64 similarly to those of FIGS. 58A and 58B.

In FIG. 63, a serial signal indicting a result of an image captured by sensors is supplied to the CPU from each two adjacent blocks.

As described above, in FIG. 63, since the image data output from each of the 2n blocks on the array substrate is transmitted to the CPU through n data lines, the operation frequency of the shift resister 95 can be reduced to ½n as compared with a case in which the image data is transmitted to the CPU through a single shift resister. Further, it is also possible to reduce the number of output lines to the CPU to n/2 by arranging each two data lines of n data lines as one set of data line. In this case, the output number of the data lines for transmitting the data to the CPU can be reduced to n/2 while maintaining the operation frequency of the shift resister 95 to ½n.

Incidentally, when the outputs from the plurality of shift resisters 95 are converted into the serial data by the P/S conversion circuit, the image data continuously arranged in correspondence to the disposition of the pixels in each shift resister is alternately mixed and made to discontinuous data. Thus, even if the CPU receives this data, it cannot process the image data.

As a method of coping with the above problem, there is contemplated a method of disposing a plurality of bit lines on the array substrate, in addition to the output data lines, and outputting the address information of the image data through the bit lines.

In this method, however, many signals are output from the insulation substrate, thereby power consumption and the number of connection pins are increased, and an IC cost is made expensive. Further, an IC must decode the addresses transmitted thereto and stores respective data in an appropriate memory one by one, thereby the number of gates and power consumption are increased.

Figure 65:
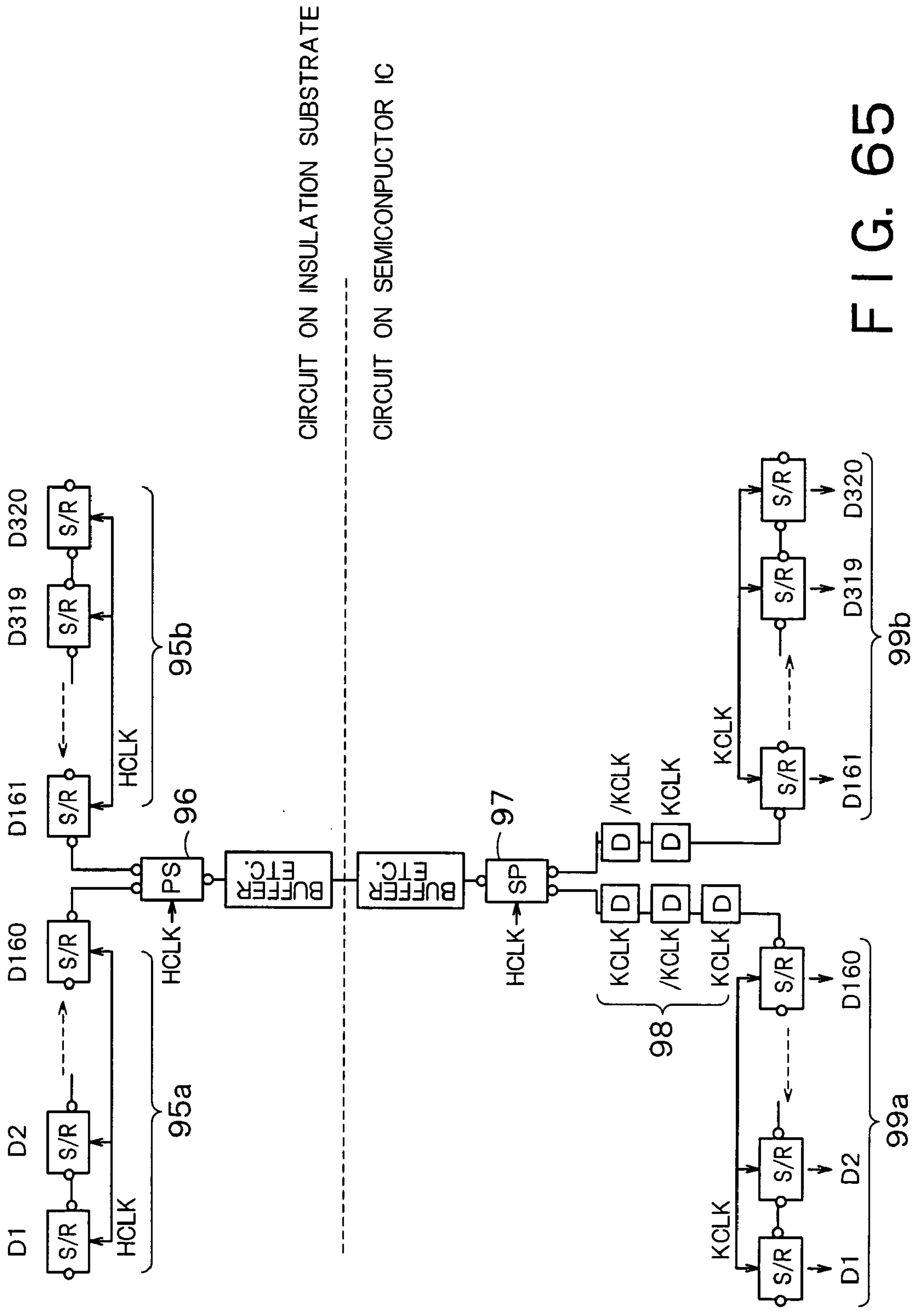
FIG. 65 is a block diagram of the latter stage of the shift resister 95 when image data is rearranged externally of an array substrate.

FIG. 65 is a block diagram of the latter stage of the shift resister 95 when the image data is rearranged externally of the array substrate. The circuit shown in FIG. 65 includes an S/P conversion circuit 97 for converting the serial signal output from the P/S conversion circuit 96 of the array substrate to a parallel signal, a timing adjustment circuit 98 for matching the phases of the respective signals constituting the parallel signal with each other, and shift resisters 99*a* and 99*b* for shifting the output signal from the timing adjustment circuit 98.

Figure 66A:
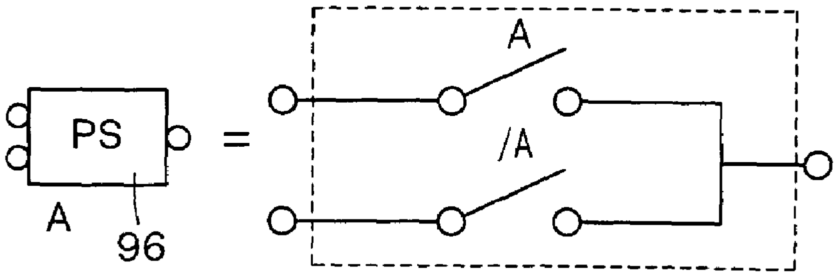
FIG. 66A is a block diagram of a P/S conversion circuit.
Figure 66B:
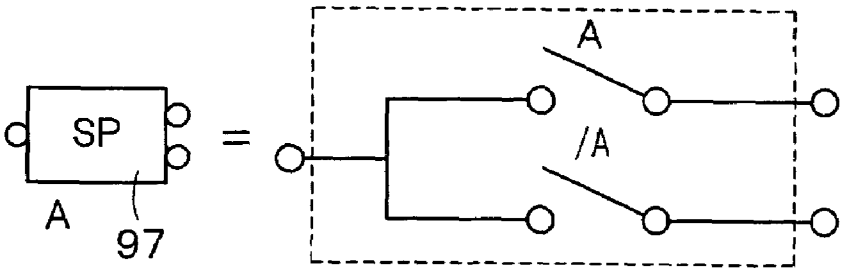
FIG. 66B is a block diagram of an S/P conversion circuit.

Each of the P/S conversion circuit 96 and the S/P conversion circuit 97 is composed of two analog switches. Specifically, the P/S conversion circuit 96 is arranged as a circuit shown in FIG. 66A, and the S/P conversion circuit 97 is arranged as a circuit shown in FIG. 66B. Any of the circuits can execute P/S conversion or S/P conversion by turning on one of the switches when the other switch is turned off.

Figure 67:
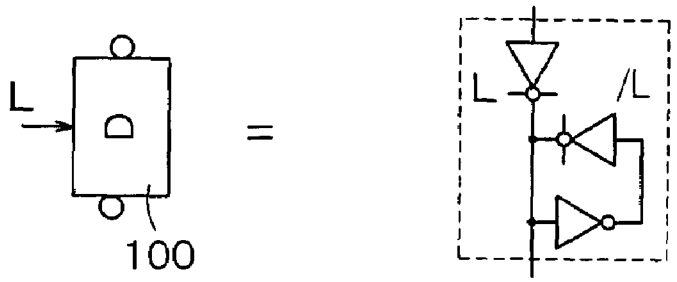
FIG. 67 is a circuit diagram showing an internal arrangement of a D latch.

The timing adjustment circuit 98 is composed of, for example, D latches 50. A reason why the number of stages of the D latches 50 disposed on a left side of FIG. 65 is different from that of the D latches 50 disposed on a right side thereof is that the phases of both the data must be matched with each other. Note that the interior of each D latch 50 is arranged as shown in FIG. 67.

Although the shift resisters 95 are connected to the latter stage of the timing adjustment circuit 98 for the convenience of processing executed by the CPU, the shift resisters 95 are not an essential arrangement, and line buffers, memories, and the like may be used. In any case, since data is output from the S/P conversion circuit shown in FIG. 66*b* in a forward sequence, the data can be easily processed by the CPU.

Figure 68:
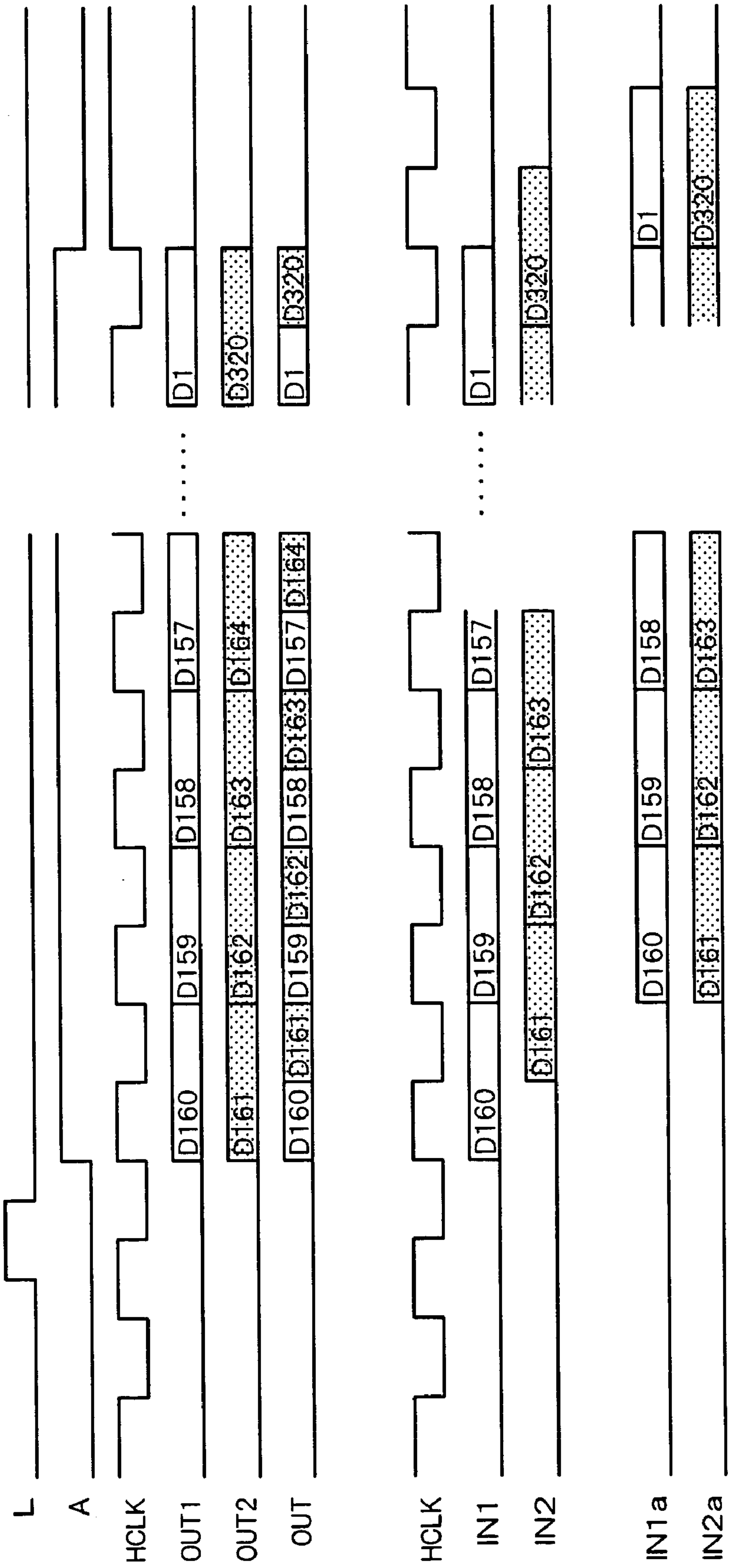
FIG. 68 is an operation timing chart of the circuit shown in FIG. 65.

FIG. 68 is an operation timing chart of the circuit shown in FIG. 65. A signal OUT1 of FIG. 68 is the output from each first shift resister 95*a*, a signal OUT2 is the output from each second shift resister 95*b*, a signal OUT is the output from the P/S conversion circuit 96, signals IN1 and IN2 are the outputs from the S/P conversion circuit 97, and signals IN1*a* and IN1*b* are the outputs from the timing adjustment circuit 98. As shown in FIG. 68, the phases of the two outputs from the timing adjustment circuit 98 are matched with each other.

As described above, the S/P conversion circuit 97, which is disposed externally of the array substrate in symmetry with the P/S conversion circuit 96, permits image data to be rearranged without transmitting the address information from the array substrate.

Although the examples, in which the display device according to the present invention is applied to the liquid crystal display device, has been explained in the respective embodiments described above, the present invention can be also applied to other display devices such as an electroluminescence (EL), plasma display panel (PDP) and the like.

What is claimed is:

1. A display device, comprising:

display elements formed in vicinity of intersections of signal lines and scan lines aligned vertically and horizontally;

sensors provided corresponding to said display elements;

A/D converters which convert output signals of said sensors into digital signals; and a shift register which converts said digital signals into serial signals and outputs the serial signals, wherein said shift register has:

a first shift register which converts said digital signal of m (m is an integer equal to or more than 2) bits into a first serial signal and outputs the first serial signal;

a second shift register which converts said digital signal of n (n is an integer equal to or more than 2) bits into a second serial signal and outputs the second serial signal; and a serial signal selector which selects either of said first or second serial signal and outputs the selected signal.

2. A display device, comprising:

display elements formed in vicinity of intersections of signal lines and scan lines aligned vertically and horizontally on an insulation substrate;

sensors provided on said insulation substrate, said sensors corresponding to said display elements, each picking up an image;

A/D converters formed on said insulation substrate which convert output signals of said sensors into digital signals;

a plurality of shift registers formed on said insulation substrate which convert said digital signals into a plurality of first serial signals and output said first serial signals;

a serial signal selector formed on said insulation substrate which selects one of said plurality of first serial signals outputted from said plurality of first shift registers and outputs the selected signal; and an S/P converter formed on a substrate different from said insulation substrate which converts the output signal of said serial signal into a plurality of second serial signals corresponding to said first serial signals.

3. A display device comprising:

display elements formed in vicinity of intersections of signal lines and scan lines aligned vertically and horizontally;

sensors provided corresponding to said display elements, each picking up an image;

A/D converters which convert output signals of said sensors into digital signals; and a serial output part which converts said digital signals into a serial signal to output the serial signal;

wherein said serial output part includes:

a first shift register which converts said digital signal of m (m is an integer equal to or more than 2) bits into a first serial signal and outputs the first serial signal;

a second shift register which converts said digital signal of n (n is an integer equal to or more than 2) bits into a second serial signal and outputs the second serial signal; and a serial signal selector which selects one of said first or second serial signal and outputs the selected signal.

* * * * *